US012544763B2

(12) United States Patent
Sundström

(10) Patent No.: US 12,544,763 B2
(45) Date of Patent: Feb. 10, 2026

(54) SYSTEM FOR CONTROLLING AN INTERNAL STATE OF A TUMBLING MILL

(71) Applicant: S.P.M. Instrument AB, Strangnas (SE)

(72) Inventor: Tim Sundström, Åkers Styckebruk (SE)

(73) Assignee: S.P.M. Instrument AB, Strangnas (SE)

( * ) Notice: Subject to any disclaimer, the term of this patent is extended or adjusted under 35 U.S.C. 154(b) by 368 days.

(21) Appl. No.: 17/995,474

(22) PCT Filed: Apr. 9, 2021

(86) PCT No.: PCT/SE2021/000004
§ 371 (c)(1),
(2) Date: Oct. 4, 2022

(87) PCT Pub. No.: WO2021/206600
PCT Pub. Date: Oct. 14, 2021

(65) Prior Publication Data
US 2023/0338962 A1    Oct. 26, 2023

(30) Foreign Application Priority Data

Apr. 9, 2020   (SE) .................................. 2050412-2

(51) Int. Cl.
*B02C 17/18*   (2006.01)
*B02C 25/00*   (2006.01)
*G01H 1/00*    (2006.01)

(52) U.S. Cl.
CPC .......... *B02C 17/1805* (2013.01); *B02C 25/00* (2013.01); *G01H 1/003* (2013.01)

(58) Field of Classification Search
CPC ...... B02C 17/1805; B02C 25/00; G01H 1/003
(Continued)

(56) References Cited

U.S. PATENT DOCUMENTS 2,824,700 A   2/1958   Weston
2,927,536 A   3/1960   Rhoades
(Continued)

FOREIGN PATENT DOCUMENTS

BR   PI 0603403-9 A   4/2008
CA       507503 A    11/1954
(Continued)

OTHER PUBLICATIONS

Extended European search report, dated Sep. 2, 2015; Application No. 13744257.0, in 4 pages.
(Continued)

*Primary Examiner* — Mohammad Ali
*Assistant Examiner* — Joshua T Sanders
(74) *Attorney, Agent, or Firm* — Knobbe, Martens, Olson & Bear, LLP

(57) ABSTRACT

A system for controlling an internal state of in a tumbling mill (10) having a shell (20) that rotates around an axis (60) at a speed of rotation ($f_{ROT}$) for grinding a charge of material (30) by tumbling the material in the rotating shell; said shell (20) having an internal shell surface (22) including a first number (L) of protrusions (310) configured to engage material as the shell (20) rotates about the axis (60), the system comprising a status parameter extractor (450) being configured to detect occurrence of an event signature ($S_p(r)$; Sp) in a time sequence of vibration sample values (Se(i), S(j), S(q)); said status parameter extractor (450) being configured to generate data indicative of a first temporal relation ($R_T(r)$; $T_D$; FI(r)) between said said event signature occurrence, and two other occurrences; and a regulator for controlling an angular toe position (FI(r), $A_{TOE}$) based on a toe position reference value ($FI_{REF}(r)$), said first temporal relation (Rr(r); $T_D$; FI(r)), and a toe position error value ($FI_{ERR}(r)$).

23 Claims, 32 Drawing Sheets

(58) Field of Classification Search
USPC .......................................................... 700/164
See application file for complete search history.

(56) References Cited

U.S. PATENT DOCUMENTS

| | | |
|---|---|---|
| 3,155,790 A | 11/1964 | Lemonnier |
| 3,482,523 A | 12/1969 | Morando |
| 3,554,012 A | 1/1971 | Sohoel |
| 3,705,516 A | 12/1972 | Reis |
| 3,802,634 A | 4/1974 | Mix |
| 3,806,278 A | 4/1974 | Grennan |
| 3,918,831 A | 11/1975 | Grennan |
| 4,070,132 A | 1/1978 | Lynch |
| 4,302,813 A | 11/1981 | Kurihara |
| 4,378,194 A | 3/1983 | Bandukwalla |
| 4,404,640 A | 9/1983 | Dumbeck et al. |
| 4,417,849 A | 11/1983 | Morris |
| 4,419,046 A | 12/1983 | Carlini |
| 4,528,852 A | 7/1985 | Sohoel |
| 4,744,242 A | 5/1988 | Anderson et al. |
| 4,828,454 A | 5/1989 | Morris et al. |
| 4,831,365 A | 5/1989 | Thomas et al. |
| 4,894,644 A | 1/1990 | Thomas |
| 4,912,661 A | 3/1990 | Potter |
| 4,988,979 A | 1/1991 | Saski et al. |
| 4,991,442 A | 2/1991 | Matsumoto |
| 5,109,700 A | 5/1992 | Hicho |
| 5,192,929 A | 3/1993 | Walker et al. |
| 5,201,292 A | 4/1993 | Grajski et al. |
| 5,258,923 A | 11/1993 | Imam et al. |
| 5,365,787 A | 11/1994 | Hernandez et al. |
| 5,386,945 A | 2/1995 | Nose et al. |
| 5,390,545 A | 2/1995 | Doan |
| 5,445,028 A | 8/1995 | Bianchi et al. |
| 5,548,540 A | 8/1996 | Staver et al. |
| 5,633,811 A | 5/1997 | Canada et al. |
| 5,752,665 A | 5/1998 | Wason |
| 5,825,657 A | 10/1998 | Hernandez |
| 5,852,793 A | 12/1998 | Board et al. |
| 5,870,699 A | 2/1999 | Canada et al. |
| 5,895,857 A | 4/1999 | Robinson et al. |
| 5,911,362 A | 6/1999 | Wood et al. |
| 6,041,339 A | 3/2000 | Yu et al. |
| 6,053,047 A | 4/2000 | Dister et al. |
| 6,155,790 A | 12/2000 | Pyotsia et al. |
| 6,260,004 B1 | 7/2001 | Hays et al. |
| 6,330,525 B1 | 12/2001 | Hays et al. |
| 6,332,116 B1 | 12/2001 | Qian et al. |
| 6,351,713 B1 | 2/2002 | Board et al. |
| 6,351,714 B1 | 2/2002 | Birchmeier |
| 6,496,782 B1 | 12/2002 | Claus et al. |
| 6,560,566 B1 | 5/2003 | Lysen |
| 6,591,682 B1 | 7/2003 | Lysen |
| 6,618,128 B2 | 9/2003 | Van Voorhis et al. |
| 6,801,864 B2 | 10/2004 | Miller |
| 6,874,364 B1* | 4/2005 | Campbell ............ G01N 29/046 73/659 |
| 6,874,366 B2 | 4/2005 | Magne Ortega et al. |
| 7,010,445 B2 | 3/2006 | Battenberg et al. |
| 7,027,953 B2 | 4/2006 | Klein |
| 7,133,801 B2 | 11/2006 | Song |
| 7,136,794 B1 | 11/2006 | Bechhoefer |
| 7,352,076 B1 | 4/2008 | Gabrys |
| 7,489,254 B2 | 2/2009 | Rodriguez et al. |
| 7,505,852 B2 | 3/2009 | Board |
| 7,640,139 B2 | 12/2009 | Sahara et al. |
| 7,699,249 B2* | 4/2010 | Jarvinen ............ B02C 17/1805 241/34 |
| 7,770,458 B2 | 8/2010 | Blanchard et al. |
| 7,949,496 B2 | 5/2011 | Lindberg et al. |
| 8,020,792 B2 | 9/2011 | Theberge et al. |
| 8,762,104 B2 | 6/2014 | Hedin |
| 8,810,396 B2 | 8/2014 | Hedin |
| 8,812,265 B2 | 8/2014 | Hedin |
| 9,091,259 B2 | 7/2015 | Tamminen et al. |
| 9,200,980 B2 | 12/2015 | Hedin |
| 9,213,671 B2 | 12/2015 | Hedin |
| 9,279,715 B2 | 3/2016 | Hedin |
| 9,341,512 B2 | 5/2016 | Shrivastav |
| 9,416,787 B2 | 8/2016 | Tamminen et al. |
| 9,441,776 B2 | 9/2016 | Byrne et al. |
| 9,772,219 B2 | 9/2017 | Hedin |
| 9,863,845 B2 | 1/2018 | Mesia et al. |
| 9,885,634 B2 | 2/2018 | Hedin |
| 9,964,430 B2 | 5/2018 | Hedin |
| 9,964,634 B2 | 5/2018 | Nikolov et al. |
| 10,133,257 B2 | 11/2018 | Hedin |
| 10,260,935 B2 | 4/2019 | Hedin |
| 10,330,523 B2 | 6/2019 | Hedin |
| 10,337,957 B2 | 7/2019 | Hedin |
| 10,670,176 B2 | 6/2020 | Byrne et al. |
| 10,788,808 B2 | 9/2020 | Hedin |
| 10,809,152 B2 | 10/2020 | Hedin |
| 10,852,179 B2 | 12/2020 | Hedin |
| 11,015,972 B2 | 5/2021 | Hedin |
| 11,054,301 B2 | 7/2021 | Hedin |
| 11,255,747 B2 | 2/2022 | Hedin |
| 11,561,127 B2 | 1/2023 | Hedin |
| 11,599,085 B2 | 3/2023 | Hedin |
| 11,614,357 B2 | 3/2023 | Hedin |
| 12,105,498 B2 | 10/2024 | Hedin |
| 2002/0017139 A1 | 2/2002 | Werner et al. |
| 2003/0040885 A1 | 2/2003 | Schoess et al. |
| 2003/0047008 A1 | 3/2003 | Gopalakrishnan et al. |
| 2003/0062025 A1 | 4/2003 | Samoto et al. |
| 2003/0129062 A1 | 7/2003 | Sabini et al. |
| 2003/0130811 A1 | 7/2003 | Boerhout |
| 2003/0133808 A1 | 7/2003 | Sabini et al. |
| 2003/0137648 A1 | 7/2003 | Van Voorhis et al. |
| 2003/0182071 A1 | 9/2003 | Ditommaso et al. |
| 2004/0025590 A1 | 2/2004 | Schaad et al. |
| 2004/0083009 A1 | 4/2004 | Curless et al. |
| 2004/0101048 A1 | 5/2004 | Paris |
| 2004/0107078 A1 | 6/2004 | Chiu et al. |
| 2004/0186680 A1 | 9/2004 | Jin et al. |
| 2004/0199348 A1 | 10/2004 | Hitchcock et al. |
| 2004/0246284 A1 | 12/2004 | Mura et al. |
| 2004/0255679 A1* | 12/2004 | Valderrama Reyes ...................... G01H 1/003 73/649 |
| 2004/0255680 A1* | 12/2004 | Ortega .................. B02C 25/00 73/649 |
| 2005/0011266 A1 | 1/2005 | Robinson et al. |
| 2005/0033501 A1 | 2/2005 | Liu et al. |
| 2005/0209811 A1 | 9/2005 | Lindberg et al. |
| 2005/0246150 A1 | 11/2005 | Shiromaru et al. |
| 2005/0252205 A1 | 11/2005 | Stavale et al. |
| 2006/0120854 A1 | 6/2006 | Wakeman et al. |
| 2006/0138258 A1 | 6/2006 | Jarvinen |
| 2006/0150738 A1 | 7/2006 | Leigh |
| 2007/0033785 A1 | 2/2007 | Kohring |
| 2007/0112443 A1 | 5/2007 | Latham et al. |
| 2007/0145168 A1 | 6/2007 | Theberge et al. |
| 2007/0212210 A1 | 9/2007 | Kernan et al. |
| 2007/0241920 A1 | 10/2007 | Rodriguez et al. |
| 2007/0282545 A1 | 12/2007 | Board |
| 2008/0033695 A1 | 2/2008 | Sahara et al. |
| 2008/0161959 A1 | 7/2008 | Jerard et al. |
| 2008/0223135 A1 | 9/2008 | Blanchard et al. |
| 2009/0035018 A1 | 2/2009 | Koga et al. |
| 2009/0164142 A1 | 6/2009 | Studer et al. |
| 2009/0193900 A1 | 8/2009 | Janssens et al. |
| 2009/0256874 A1 | 10/2009 | Samoto et al. |
| 2009/0259348 A1 | 10/2009 | Syu |
| 2010/0147627 A1 | 6/2010 | Lakomiak et al. |
| 2010/0288051 A9 | 11/2010 | Janssens et al. |
| 2010/0292937 A1 | 11/2010 | Hosny et al. |
| 2011/0285532 A1 | 11/2011 | Hedin |
| 2011/0295556 A1 | 12/2011 | Hedin |
| 2011/0295557 A1 | 12/2011 | Hedin |
| 2011/0297768 A1 | 12/2011 | Theberge et al. |
| 2012/0296582 A1 | 11/2012 | Hedin |
| 2012/0326443 A1 | 12/2012 | Vince et al. |
| 2012/0330580 A1 | 12/2012 | Fruh et al. |

(56) References Cited

U.S. PATENT DOCUMENTS

| | | |
|---|---|---|
| 2013/0064682 A1 | 3/2013 | Sun et al. |
| 2013/0108473 A1 | 5/2013 | Tamminen et al. |
| 2014/0365176 A1 | 12/2014 | Hedin |
| 2014/0372079 A1 | 12/2014 | Hedin |
| 2015/0032389 A1 | 1/2015 | Hedin |
| 2015/0086382 A1 | 3/2015 | Tamminen et al. |
| 2015/0375235 A1 | 12/2015 | Roitto et al. |
| 2017/0036213 A1 | 2/2017 | Pirttiniemi et al. |
| 2017/0219420 A1* | 8/2017 | Takahashi ............ G01M 7/025 |
| 2017/0225172 A1 | 8/2017 | Nower et al. |
| 2017/0356301 A1 | 12/2017 | Florindo |
| 2017/0356450 A1 | 12/2017 | Cheng et al. |
| 2018/0100480 A1 | 4/2018 | Duquette et al. |
| 2018/0126384 A1 | 5/2018 | Robles et al. |
| 2018/0369829 A1 | 12/2018 | Kaartinen et al. |
| 2019/0162748 A1 | 5/2019 | Haylock et al. |
| 2019/0203736 A1 | 7/2019 | Hambe et al. |
| 2021/0088368 A1 | 3/2021 | Sheth |
| 2021/0199523 A1 | 7/2021 | Sheth et al. |
| 2021/0223094 A1 | 7/2021 | Hedin |
| 2022/0042513 A1 | 2/2022 | Sarkar et al. |
| 2022/0341815 A1 | 10/2022 | Hedin |
| 2023/0297066 A1 | 9/2023 | Hedin |
| 2023/0302460 A1 | 9/2023 | Sundström |
| 2023/0304849 A1 | 9/2023 | Hedin |
| 2023/0324216 A1 | 10/2023 | Hedin |
| 2024/0189829 A1 | 6/2024 | Sundström |
| 2024/0253053 A1 | 8/2024 | Sundström |
| 2024/0318667 A1 | 9/2024 | Sundström |

FOREIGN PATENT DOCUMENTS

| | | |
|---|---|---|
| CA | 2456566 A1 | 7/2004 |
| CA | 2456608 A1 | 7/2004 |
| CN | 1926413 A | 3/2007 |
| CN | 101173868 A | 5/2008 |
| CN | 101266197 B | 9/2008 |
| CN | 109635847 A | 4/2019 |
| CN | 208873487 A | 5/2019 |
| CN | 107159435 | 7/2019 |
| CN | 110285045 U | 9/2019 |
| CN | 110374869 A | 10/2019 |
| CN | 209943103 U | 1/2020 |
| CN | 114555292 A | 5/2020 |
| CN | 111618659 A | 9/2020 |
| CN | 109331984 B | 10/2020 |
| CN | 112621382 A | 4/2021 |
| CN | 212898882 U | 4/2021 |
| CN | 112834142 A | 5/2021 |
| CN | 114689298 A | 7/2022 |
| DE | 3424692 A1 | 2/1986 |
| DE | 4218799 A1 | 12/1993 |
| DE | 10135674 A1 | 2/2003 |
| EP | 0107178 A2 | 5/1984 |
| EP | 1226414 A2 | 7/2002 |
| EP | 1477783 A2 | 11/2004 |
| EP | 1513254 A1 | 3/2005 |
| EP | 2296724 A1 | 3/2011 |
| EP | 2810027 A1 | 12/2014 |
| EP | 3 1 44 070 A1 | 3/2017 |
| EP | 4060436 A1 | 9/2022 |
| FI | 20030078 A | 1/2003 |
| FI | 20146166 A | 7/2016 |
| FR | 1093003 | 4/1955 |
| GB | 2190198 A | 11/1987 |
| GB | 2451310 A | 1/2009 |
| GB | 2559541 A | 8/2018 |
| GB | 2599702 A | 4/2022 |
| IN | 201721025862 | 1/2019 |
| JP | S60195426 A | 10/1985 |
| JP | H01127934 A | 5/1989 |
| JP | H01178814 A | 7/1989 |
| JP | H04279826 A | 10/1992 |
| JP | 11179636 A | 7/1999 |
| JP | 2000-141275 A | 5/2000 |
| JP | 2003-141275 | 5/2000 |
| JP | 2020-015106 A | 1/2020 |
| KR | 101638623 B1 | 7/2016 |
| KR | 20200056635 A | 5/2020 |
| RU | 94006918 A | 4/1996 |
| SU | 1389847 A1 | 4/1988 |
| WO | WO 1995/13655 A1 | 5/1995 |
| WO | WO 1995/27183 A1 | 10/1995 |
| WO | WO 1996/05486 A1 | 2/1996 |
| WO | WO 1998/01831 A1 | 1/1998 |
| WO | WO 2000/04361 A1 | 1/2000 |
| WO | WO 2001/003840 A1 | 1/2001 |
| WO | WO 2001/31309 A2 | 5/2001 |
| WO | WO 2002/073150 A2 | 9/2002 |
| WO | WO 2002/090267 A1 | 11/2002 |
| WO | WO 2003/062766 A1 | 7/2003 |
| WO | WO 2004/065014 | 8/2004 |
| WO | WO 2004/065014 A1 | 8/2004 |
| WO | WO 2007/124528 A1 | 11/2007 |
| WO | WO 2007/137132 A2 | 11/2007 |
| WO | WO 2010/020287 A1 | 2/2010 |
| WO | WO 2010/074643 A1 | 7/2010 |
| WO | WO 2010/074645 A1 | 7/2010 |
| WO | WO 2010/074646 A1 | 7/2010 |
| WO | WO 2010/074648 A1 | 7/2010 |
| WO | WO 2010/128928 A1 | 11/2010 |
| WO | WO 2011/087440 A1 | 7/2011 |
| WO | WO 2011/160069 A1 | 12/2011 |
| WO | WO 2013/112713 A1 | 8/2013 |
| WO | WO 2015/077735 | 5/2015 |
| WO | WO 2016/022663 A2 | 2/2016 |
| WO | WO 2016/107988 | 7/2016 |
| WO | WO 2016/176788 A1 | 11/2016 |
| WO | WO 2017/093608 A1 | 6/2017 |
| WO | WO 2017/093609 A1 | 6/2017 |
| WO | WO 2019/070544 A1 | 4/2019 |
| WO | WO 2019/204882 | 10/2019 |
| WO | WO 2019/232511 A1 | 12/2019 |
| WO | WO 2021/055879 A1 | 3/2021 |
| WO | WO 2021/206600 A1 | 10/2021 |
| WO | WO 2022/000072 A1 | 1/2022 |
| WO | WO 2022/109126 A1 | 5/2022 |
| WO | WO 2022/216218 A1 | 10/2022 |
| WO | WO 2022/216219 A1 | 10/2022 |
| WO | WO 2024/080915 A1 | 4/2024 |

OTHER PUBLICATIONS

International Search Report, dated May 15, 2013, from PCT/SE2013/050079, in 5 pages.

Extended European search report, dated Sep. 16, 2015; Application No. 12810816.4, in 6 pages.

Autocorrelation—Wikipedia, the free encyclopedia, Dec. 12, 2008, p. 2-6, http://en.wikipedia.org/wik+B160+B151:D154+B160+B+B151:D159.

Chang, et al., "A Novel Envelop Detector for High-Frame Rate, High-Frequency Ultrasound Imaging", IEEE Transactions on Ultrasonics, Ferroelectrics, and Frequency Control, 2007, vol. 54, No. 9, pp. 1792-1801.

Das et al., "Interpretation of mill vibration signal via wireless sensing" in Minerals Engineering, vol. 24, No. 3, dated Sep. 15, 2019, pp. 245-251.

Doguer et al., "New Time Domain Method for the Detection of Roller Bearing Defects" Proceedings of International Conference on Condition Monitoring & Machinery Failure Prevention Technologies CM 2008, Edinburgh, Jul. 2008.

Mais, Jason, Spectrum Analysis—The key features of analyzing spectra, https://www.skf.com/binaries/pub12/Images/0901d1968024acef-CM5118-EM-Spectrum-Analysis_tcm_12-113997.pdf, viewed online on Apr. 20, 2022, published on May 2002 (Year: 2002).

Milman, Andrew, "Mathematical Principles of Remote Sensing: Making Inferences from Noisy Data", Sleeping Bear Press, Michigan, 1999. pp. 215-233.

Renwick, John, Condition Monitoring of Machinery Using Computerized Vibration Signature Analysis, IEEE Transactions on Industry Applications, vol. IA-20, No. 3, May/Jun. 1984, pp. 519-527 (Year: 1984).

(56) References Cited

OTHER PUBLICATIONS

Robinson, et al., "How Advanced Analysis Identifies Lubrication Problems", Machinery Health, Pumps & Systems, 2007, pp. 66-67.
Robinson, James C., "Autocorrelation as a Diagnostic Tool", 2007, pp. 1-22.
Rouse, What is Nyquist Theorem, Whatis.com, Sep. 2005.
Dominick, Joe, "PeakVue as a Part of a Reliability Based Maintenance Program", Emerson Process Management—CSI, DoctorKnow® Application Paper, 2010 pp. 1-15.
Elliot, et al., "13.2 Correlation and Autocorrelation Using the FFT", Fast Transforms: Algorithms, Analyses, Applications (New York: Academic Press), 1982, pp. 545-547.
Autocorrelation from Wikipedia, 2009, http:// en.wikipedia.org/wiki/autocorrelation, pp. 1-6.
Lundy, James, "Detecting Lubrication Problems Using Shock Pulse", Lubrication & Fluid Power, Feb. 2006.
European Search Report for International App. No. 19154113.5, dated Jun. 6, 2019, in 7 pages.
European Search Report for European App. No. 21210020.0, dated Jun. 7, 2022, in 10 pages.
European Search Report for European App. No.21822089.5, dated Mar. 12, 2024, in 10 pages.
Supplemental Partial European Search Report for EP Application No. 13837138, mailed May 4, 2016, in 4 pages.
International Search Report, dated Jun. 7, 2011, from corresponding PCT Application No. PCT/SE2011/050035.
International Search Report for International App. No. PCT/SE2013/051062, dated Feb. 21, 2014, in 6 pages.
Banks, Jeffrey et al., "Lubrication Level Diagnosis using vibration analysis", 2004 IEEE Aerospace Conference proceedings, vol. 6, Mar. 6, 2004, pp. 3528-2534.
International search report dated Sep. 11, 2012 from corresponding PCT Application No. PCT/SE2012/050827.
Extended European Search Report for International App No. 19162332.1 dated Jul. 18, 2019 in 10 pages.
European Search Report for Application No. EP10772330 dated Oct. 20, 2017.
International search report dated Jul. 7, 2010 from corresponding PCT Application PCT/SE2010/050257.
European Search Report for Application No. 17292870.6 dated Mar. 14, 2018.
European Search Report in European Application No. 22199346.2 dated Jan. 16, 2023 in 8 pages.
International Search Report and Written Opinion in PCT/SE2021/000006 dated Jul. 1, 2021 in 11 pages.
International Search Report and Written Opinion mailed Jun. 15, 2022 in Application No. PCT/SE2022/050362 in 11 pages.
International Preliminary Report on Patentability for International PCT Application No. PCT/SE2022/050914 dated Jan. 12, 2024 in 14 pages.
International Search Report and Written Opinion for International PCT Application No. PCT/SE2022/050914 dated Jul. 7, 2022 in 14 pages.
International Preliminary Report on Patentability for International PCT Application No. PCT/SE2022/050915 dated Jan. 12, 2024 in 15 pages.
International Search Report and Written Opinion for International PCT Application No. PCT/SE2022/050915 dated Dec. 7, 2022 in 14 pages.
International Search Report and Written Opinion received in International Application No. PCT/SE2023/050332, mailed May 24, 2023, in 19 pages.
International Search Report and Written Opinion received in International Application No. PCT/SE2023/050333, mailed May 24, 2023, in 20 pages.
Chinese Search Report received in Corresponding Chinese Application No. 2021800707603 dated Jun. 3, 2024.
International Search Report in PCT/SE2021/000004 dated Jul. 15, 2021 in 4 pages.
Maleki-Moghaddam et al. 'A method to predict shape and trajectory of charge in industrial mills', In: Minerals Engineering, vol. 46, pp. 157-166, 2013-05-09; Section 3.1.1. Toe position.
Extended Eureopean Search Report received in corresponding EP Application No. 21783733.5 dated Jul. 19, 2024.
"Affinitetslagarna," Wikipedia SE, 2021, 1 pg.
"Affinity Laws," Intro to Pumps, 2023, pp. 1-5.
Aka et al., "Numerical investigation of volute tongue design on hemodynamic characteristics and hemolysis of the centrifugal blood pump," SN Applied Sciences, 2021, 3:49, pp. 1-9.
Alatalo, "Charge Dynamics in Tumbling Mills Simulation and Measurement with an In-Mill Sensor," Licentiate Thesis, 2011, 66 pgs.
"Attrition (erosion)," Wikipedia, 2020, pp. 1-3.
"Axis," Wiktionary, 2021, pp. 1-5.
"A smart mill liner package that provides maximum productivity to your operation," FLSmidth, 2021, p. 2.
"Axis of rotation," Wiktionary, 2021, 1 pg.
"Back pressure," Wikipedia, 2023, pp. 1-2.
Bernoulli, "Bernoulli's principle," Wikipedia, 2021, pp. 1-12.
"Bernoullis ekvation," Wikipedia SE, 2021, pp. 1-3.
Bowles, "Effects and Control of Pulsation in Gas Measurement," 2021, pp. 1-11.
"Brittleness," Wikipedia, 2020, pp. 1-4.
Campbell et al., "Sag Mill Monitoring Using Surface Vibrations," Proceedings Internatioanl Autogenous and Semiautogenous Grinding Tecnology, 2001.
"Centrifugal force," Wikipedia, 2020, pp. 1-9.
"Centrifugal force," Wikipedia, 2023, pp. 1-13.
"Centrifugal pump," Wikipedia, 2021, pp. 1-8.
"Centripetal force," Wikipedia, 2020, pp. 1-10.
Cheah et al., "Numerical Flow Simulation in a Centrifugal Pump at Design and Off-Design Conditions," International Journal of Rotating Machinery, vol. 2007, Article ID: 83641, 2007, pp. 1-9.
"ChipperEKG," Andritz, Pulp & Paper, 2013, pp. 1-8.
Cui et al., "Analysis of Radial Force and Vibration Energy in a Centrifugal Pump," Mathematical Problems in Engineering, vol. 2020, Article ID 6080942, 2020, pp. 1-12.
"Compressive strength," Wikipedia, 2020, pp. 1-5.
"Control Theory," Wikipedia, 2021, pp. 1-18.
Corbo et al., "Practical Design Against Pump Pulsations," Proceedings of the Twenty-Second International Pump Users Symposium, 2005, pp. 138-177.
"Crusher," Wikipedia, 2022, pp. 1-11.
"Den teoretiska pumpkurvan," 2021, pump hand boken, pp. 1-3.
Donker, S., "On-Line Sensors for Measuring the Total Ball and Charge Level in Tumbling Mills," University of Cape Town, Centre for Minerals Research, Apr. 2014.
"Draft tube," Wikipedia, 2020, pp. 1-3.
Dynamic Image Analysis, https://www.sympatec.com/en/particle-measurement/sensors/dynamic-image-analysis/, printed Jul. 1, 2025.
Elsey, "The Silent Pump Killer: Radial Thrust," Pump & Systems, 2021, pp. 1-8.
"Eulers ekvation," Pumphandboken 3.2.3, pp. 1-3 2021.
Evans, "Calculating Radial Thrust," Pump & Systems, 2011, pp. 1-5.
"Fictitious force," Wikipedia, 2023, pp. 1-11.
Fluid Engineering Inc. "Minimizing Pressure Pulsations by Pump," Infomedia, 2010, pp. 1-11.
"Francis turbine," Wikipedia, 2021, pp. 1-6.
"Frequency," Wikipedia, 2023, pp. 1-8.
"Forluster och verkningsgrad i centrifugalpumpar," Masosine Process Pumps, 2021, pp. 1-3.
Gugel, "Optimal Sag mill Control Using Vibration & Digital Signal Processing Techniques," SAG Conference, 2015, pp. 1-8.
Gülich, "Centrifugal Pumps," Springer, 2008.
"Granite," Wikipedia, pp. 1-7 2020.
"Hematite," Wikipedia, 2020, pp. 1-6.
Henshaw, "The Function of the Volute," Pump & Systems, 2012, pp. 1-4.
Holmes et al., "An On-line Surface Vibration Monitoring System for AG/SAG Mills," Conference Paper, 2006.
"IMPELLER," Wikipedia, 2021, pp. 1-5.

(56) References Cited

OTHER PUBLICATIONS

Samotics, powerpoint 2023, p. 1.
"Instance-based learning," Wikipedia, 2021, pp. 1-2.
"Introduktion till kapitlet om pumpar," Chesterton Connect, pp. 1-3 2021.
"Iron oxide," Wikipedia, 2020, pp. 1-7.
"Kalman filter," Wikipedia, 2021, pp. 1-39.
Kernan, "Pumps 101: Operation, Maintenance and Monitoring Basics," ITT, 2010, pp. 1-10.
"KSB Radial Thrust," KSB, 2023, pp. 1-7.
"KSB Specific Speed," KSB, 2023, pp. 1-7.
Karesvuori, et al., " Integrated Approach to Monitoring and Control of Mineral Grinding rocesses," IFAC, 2006, pp. 1-6.
Kongas et al., "New Particle Size Analysis System for Mineral Slurries," IFAC New Technologies for Automation of Metallurgical Industry, 2003, pp. 309-314.
Laser Scattering Particle Size Distribution Analyzer, https://www.horiba.com/usa/products/detail/action/show/Product/partica-la-960v2-1944/, printed Jul. 1, 2025.
"Least mean squares filter," Wikipedia, 2022, pp. 1-7.
"Liquid-ring pump," Wikiepdia, 2023, pp. 1-3.
"LoadIQ Mill Scanning Technology," FLSmidth, 2021, pp. 1-8.
"LoadIQ Smart sensor Technology," FLSmidth, 2022, pp. 1-6.
Löfdahl, "Estimeringsmetoder for vibrationsbaserade kvarnfyllnadsmätningar," 2008:228 CIV, 46 pgs.
"Magnetite," Wikipedia, 2020, pp. 1-10.
Mastersizer for Particle Size Measurement, https://www.mining-technology.com/products/mastersizer/, printed Jul. 1, 2025.
McClure, "Overload Detection in Semi-Autogenous Grinding: A Nonlinear Process Monitoring Approach," 9th International Symposium on Advanced Control of Chemical Processes, IFAC, 2015, 6 gs.
"Mill (grinding)," Wikipedia, 2019, pp. 1-6.
"Mill race," Wikipedia, 2021, pp. 1-3.
"Mill Vibration Analysis," MillSlicer, 2019, pp. 1-5.
"Natural frequency," Wikipedia, 2023, pp. 1-2.
"Newton's laws of motion," Wikipedia, 2021, p. 1-8.
Orhan et al., "Tool wear evaluation by vibration analysis during end milling of Aisi D3 cold work tool steel with 35 HRC hardness," NDT&E International 40, 2007, pp. 121-126.
Outotec, "Outotec MillSense mill charge sensor system," https://www.outotec.com/products/analyzers-and-automation/millsense-mill-charge-s , printed on Oct. 29, 2019, 4 pgs.
Particle size analyzers, https://www.malvernpanalytical.com/en/products/category/particle-size-analyzers, printed Jul. 1, 2025.
"Pelton wheel," Wikipedia, 2021, pp. 1-6.
"Perth-based company Process IQ, ideal partner for United States revolutionary mining technology," 2017, 2 pgs.
"Phase (waves)," Wikipedia, 2023, pp. 1-7.
"Piston pump," 2023, Wikipedia, pp. 1-2.
"Polar coordinate system," Wikipedia, 2020, pp. 1-9.
"Pump," Wikipedia, 2021, pp. 1-6.
"Pump," Wikipedia, 2023, pp. 1-19.
"Pump cavitation and how to avoid it," Xylem, Jun. 2017, pp. 1-12.
"PSI 300i particle size analyzer," Metso:Outotec, 2021, pp. 1-6.
PSI® 500i particle size analyzer, https://www.metso.com/portfolio/psi-500i-particle-size-analyzer/, printed Jul. 1, 2025.
"Reactive centrifugal force," Wikipedia, 2023, pp. 1-4.
"Reciprocating pump," Wikipedia, 2023, pp. 1-3.
"Regression analysis," Wikipedia, 2023, pp. 1-12.
"Rheology," Wikipedia, 2022, pp. 1-10.
"Rotary vane pump," Wikipedia, 2023, pp. 1-3.
"Rotordynamisak pumpars grunder," Chesterton Connect, 2021, pp. 1-3.
"Specific speed," Wikipedia, 2021, pp. 1-5.
Spencer et al., "Prediction of AG/SAG Mill Variables from Surface Vibrations," Research Gate, 2006, pp. 1-7.
Stebler, "Fluid Mekanik,", Fysika Institutionen CTH 1985, pp. 1-39.
Tahir et al., "The Correlation Between Tool Wear and Vibration Signals from Piezoelectric in End Milling of AISI P20+NI," Journal of Mechanical Engineering, vol. SI3(2), 2017, pp. 49-62.
"Tenacity (mineralogy)," Wikipedia, 2020, 1 pg.
"TriSlicer Mill Vibration Analysis," Process IQ, 2022, pp. 1-6.
"Turbine," Wikipedia, 2021, pp. 1-7.
"Uppfordringshöjd," Masosine Process Pumps, 2021, pp. 1-3.
"Vacuum Pump," 2023, Wikipedia, pp. 1-12.
Venturi, "Venturi Effect," Wikipedia, pp. 1-7 2021.
Vogel, "The Importance of Best Efficiency Point (BEP)," Efficient Plant, 2013, pp. 1-111.
"Volute (pump)," Wikipedia, 2021, pp. 1-2.
"Water horn," Wikipedia, 2021, pp. 1-12.
Wnek, "Pressure Pulsations Generated by Centrifugal Pumps," Warren Pumps, 1987, pp. 1-7.
Yin et al., " Impact Load Behavior between Different Charge and Lifter in a Laboratory-Scale Mill," MDPI, 2017.
Swedish Search Report received in Sweden Application No. 2450329-4 mailed Oct. 18, 2024.
International Preliminary Report on Patentability in PCTSE2023051006 dated Apr. 15, 2025.
International Search Report and Written Opinion in PCTSE2023051006 dated Dec. 20, 2023.
International Search Report & Written Opinion received in International Application No. PCT/SE2023/000010 dated Jan. 15, 2024.
European Search Report received in EP application No. 22785077.3 dated Apr. 17, 2025.
European Search Report received in EP application No. 22785076.5 dated Apr. 29, 2025.
Swedish Search Report received in SE Application No. 2351161-1 date Apr. 29, 2024.
Swedish Search Report received in SE Application No. 2351160-3 date May 2, 2024.
International Search Report and Written Opinion received in International Application No. PCT/SE2024/000003 dated Jun. 10, 2024.

* cited by examiner

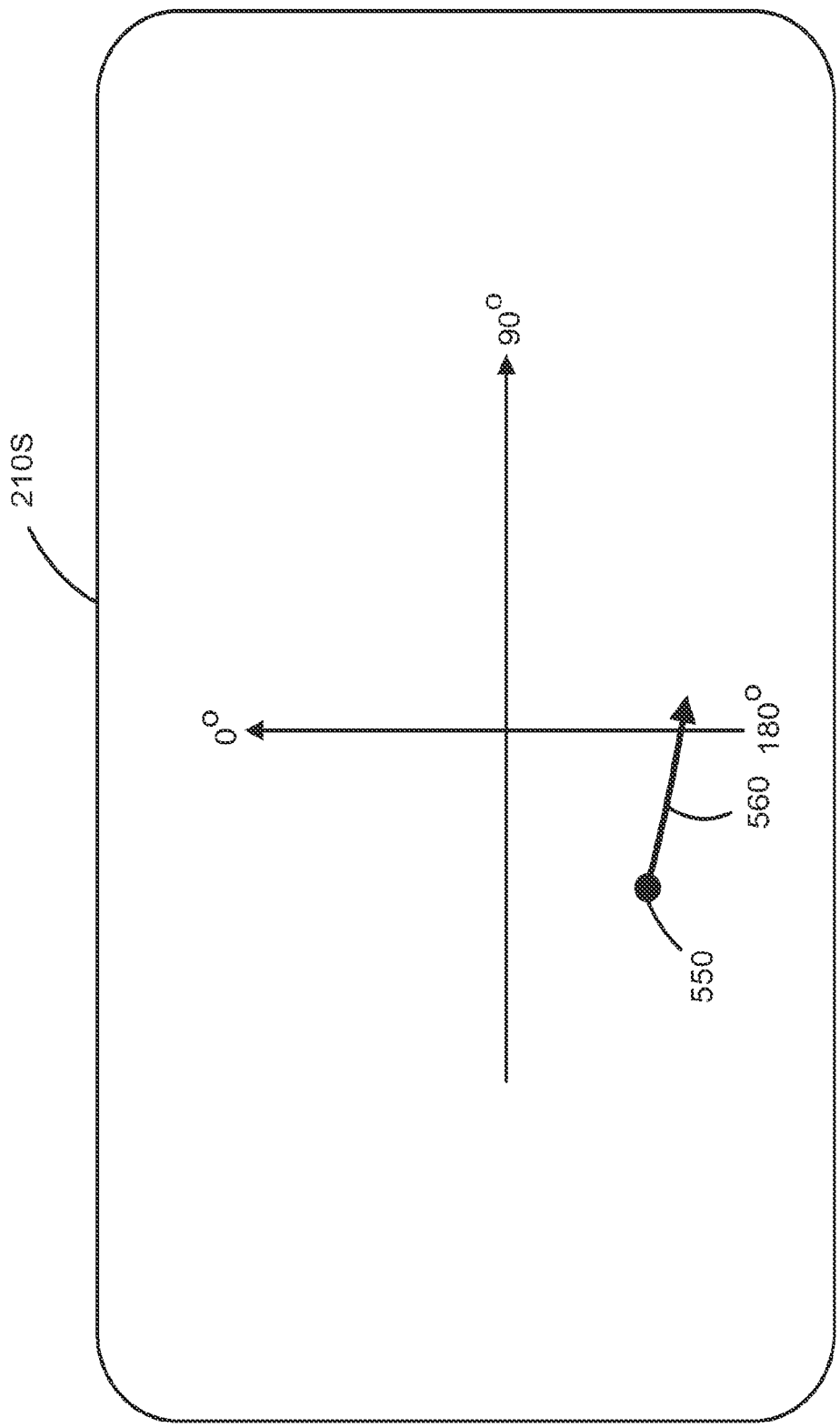

SYSTEM FOR CONTROLLING AN INTERNAL STATE OF A TUMBLING MILL

TECHNICAL FIELD

The present invention relates to the field of a tumbling mill and to the monitoring of a tumbling mill. The present invention also relates to the field of control of a tumbling mill. The present invention also relates to an apparatus for monitoring of an internal state of a tumbling mill. The present invention also relates to an apparatus for controlling an internal state of a tumbling mill. The present invention also relates to a computer program for monitoring of an internal state of a tumbling mill. The present invention also relates to a computer program for controlling an internal state of a tumbling mill.

DESCRIPTION OF RELATED ART

In some industries, such as in the mining industry, there is a need to grind material that comes in large pieces to reduce the size of individual pieces of the received material. A tumbling mill can achieve grinding of material.

A tumbling mill includes a shell that contains a charge of material to be tumbled and ground when the shell rotates. US 2017/0225172 A1 discloses that grinding in tumbling mills may be inefficient particularly where energy is wasted by impact that does not break particles, and that autogenous (AG) and semi-autogenous (SAG) mills sometimes operate in an unstable state because of difficulty in balancing the rate of feed of large particles into the tumbling mill with the consumption of the charge. According to US 2017/0225172 A1 it is essential that real-time information be provided as to the current state of the charge in the tumbler in order to control this process. US 2017/0225172 A1 discloses using rotor dynamics to determine characteristics of the moving charge within the tumbling mill. According to US 2017/0225172 A1 a monitoring apparatus is provided for monitoring a tumble mill. The apparatus includes vibration sensors mounted on the two main bearings of the tumble mill and on a thrust bearing of the mail producing vibration signals corresponding to the bearings on which the sensors are mounted. These vibration signals are transmitted to an analyzer that analyzes the signals and displays an operating condition of the tumble mill either numerically or graphically.

In FIG. 5 of US 2017/0225172 A1 there is disclosure of two orbit plots, one orbit plot generated time 1 and another orbit plot generated at time 2. By observing the change in the orbit plot from time 1 to time 2, the operator of the mill will observe that the magnitude of vibrations has decreased dramatically and that orbit parameters or frequencies or phases or precessions or other characteristic changes in orbit plots has likewise decreased dramatically, according to US 2017/0225172 A1. This information will, according to US 2017/0225172 A1, tell the operator that something very significant has changed regarding overall operation of the mill rotor and the composite material charge being processed.

SUMMARY

In view of the state of the art, a problem to be addressed is how to improve the efficiency of the grinding process in a tumbling mill.

The above problem is addressed by a method for generating information relating to an internal state of a tumbling mill (10) having a shell (20) that rotates around an axis (60) at a speed of rotation ($f_{ROT}$) for grinding a charge of material (30) by tumbling the material in the rotating shell; said shell (20) having an internal shell surface (22) including a first number (L) of protrusions (310) configured to engage material as the shell (20) rotates about the axis (60), the method comprising generating a position signal (E, P, P(i), P(j), P(q)) indicative of a rotational position of said rotating shell (20), said position signal including a time sequence of position signal sample values (P(i), P(j), P(q));

detecting a first occurrence of a first reference position signal value (1; 1C, 0%) in said time sequence of position signal sample values (P(i), P(j), P(q));

detecting a second occurrence of a second reference position signal value (1; 1C; 100%) in said time sequence of position signal sample values (P(i), P(j), P(q));

generating a vibration signal ($S_{EA}$, Se(i), S(j), S(q)) dependent on mechanical vibrations ($V_{IMP}$) emanating from rotation of said shell, said vibration signal ($S_{EA}$, Se(i), S(j), S(q)) including a time sequence of vibration sample values (Se(i), S(j), S(q));

detecting a third occurrence of an event signature ($S_P(r)$; Sp) in said time sequence of vibration sample values (Se(i), S(j), S(q));

generating data indicative of a first temporal relation ($R_T(r)$; $T_D$; FI(r)) between
said third occurrence i.e. said event signature occurrence, and
said first and second occurrences.

The above problem is also addressed by an electronic tumbling mill monitoring system for generating and displaying information relating to an internal state of a grinding process in a tumbling mill (10) having a shell that rotates around an axis (60) at a speed of rotation ($f_{ROT}$) for grinding charge material (30) by tumbling the charge material in the rotating shell, the tumbling mill monitoring system comprising:
a status parameter extractor (450) for generating
a first internal status indicator data structure (550, $S_{P1}$, $T_{D1}$), indicative of said internal state of said grinding process, said first internal status indicator data structure (550, $S_{P1}$, $T_{D1}$) including a first impact force indicator value ($S_{P1}$) and a first temporal indicator value (P; $T_{D1}$);
said first impact force indicator value ($S_{P1}$) being indicative of an impact force ($F_{IMP}$) generated when a projection on an internal shell surface of the rotating shell interacts with a toe portion of the charge material, and
said first temporal indicator value ($T_{D1}$) being indicative of a temporal duration ($T_{D1}$) between occurrence of said impact force ($F_{IMP}$) and occurrence of a rotational reference position of said rotating shell; wherein
said status parameter extractor (450) includes
a shell speed detector (500) configured to generate a value indicative of a tumbling mill shell speed of rotation ($f_{ROT}(j)$) based on a digital position signal (P(i)), said shell speed detector (500) being configured to associate said value indicative of a tumbling mill shell speed of rotation ($f_{ROT}(i)$) with a point of time (i).

DESCRIPTION OF DRAWINGS

FIG. 18 is an illustration of additional example of a visual indication of an analysis result.

DETAILED DESCRIPTION

Figure 1:
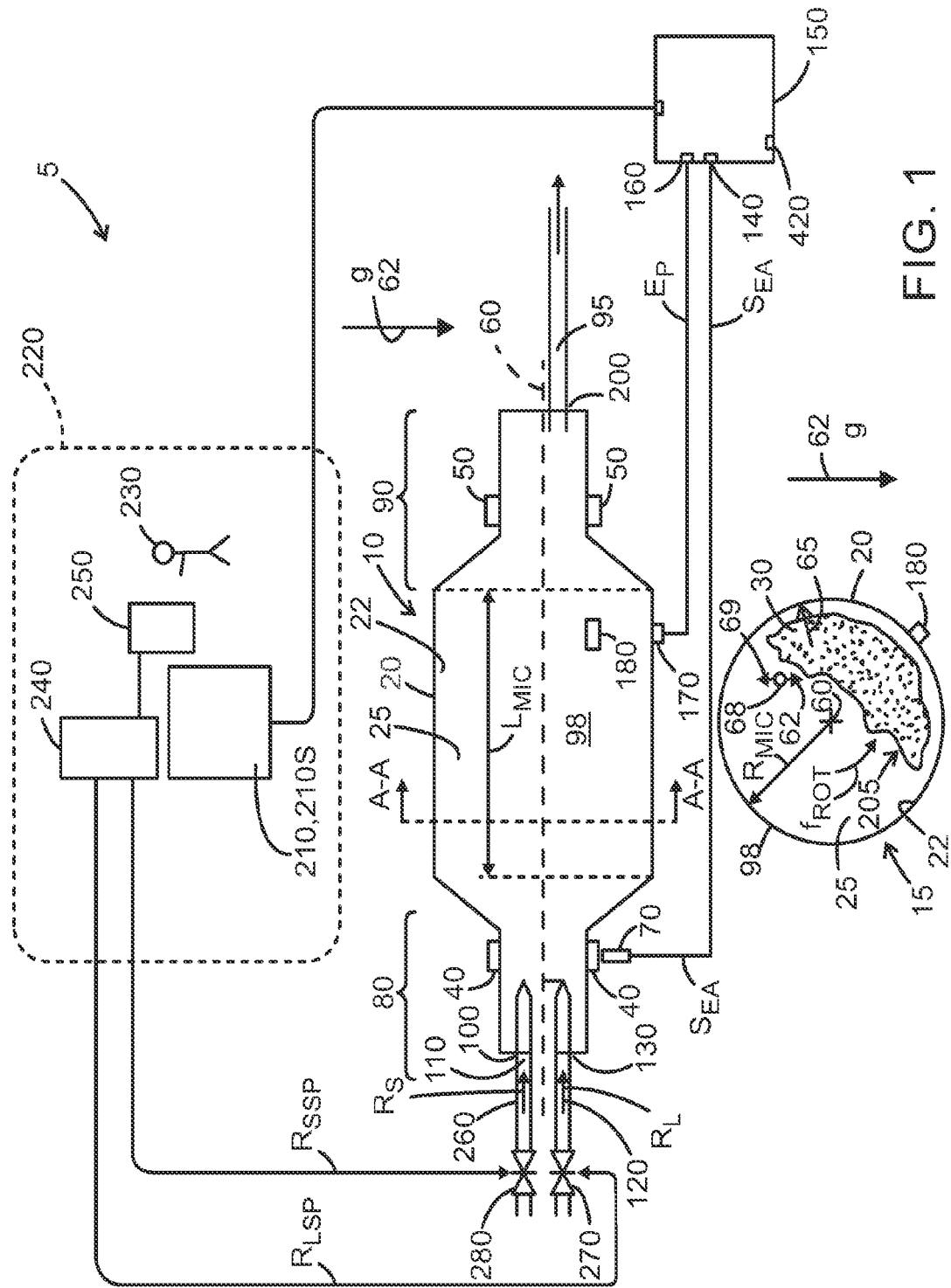
FIG. 1 shows a diagrammatic and schematic side view of a system 5 including a tumbling mill 10.

In the following text similar features in different examples will be indicated by the same reference numerals.

FIG. 1 shows a somewhat diagrammatic and schematic side view of a system 5 including a tumbling mill 10. The tumbling mill 10 may be an autogenous (AG) mill, for example. Alternatively, the tumbling mill 10 may be a semi-autogenous (SAG) mill, for example. Another example tumbling mill 10 is a ball mill 10. FIG. 1 also shows a sectional view, section A-A. Section view A-A is also is also identified by the reference 15. The tumbling mill 10 includes a shell 20 having an internal shell surface 22 that forms a chamber 25 for grinding material.

The tumbling mill chamber 25, in operation, contains a charge 30 of material to be tumbled and ground. Grinding in a tumbling mill serves the purpose of reducing the size of particles of solid material. This may be achieved e.g. by causing pieces of solid material to fall onto other pieces of solid material. Hence, a tumbling mill utilizes a force of nature, gravity, for accelerating particles of the charge against other particles of the charge. According to some embodiments, the walls of the shell 20 comprise a sturdy material, such as for example steel, so as to withstand impact of heavy particles, e.g. large pieces of ore that are tumbled in the chamber 25.

According to some embodiments, a wall of the shell 20 comprises an elastic material so as to reduce wear of the wall. According to some embodiments, the elastic material comprises rubber. According to some embodiments, the elastic material comprises a polymer such as polyurethane. According to some embodiments, the internal shell surface 22 includes a surface coating of an elastic material, such as e.g rubber or polyurethane.

According to some embodiments, the shell 10 is supported on at least two bearings 40 and 50. The shell 20 is rotatable around an axis of rotation 60. In this connection it is noted that an axis is an imaginary line around which an object spins (an axis of rotation). The rotation of the shell is utilized to lift a part of the charge, including particles of solid material, so that some of the solid particles can fall back down, under the influence of gravity, onto another part of the charge. Hence, it is desirable to select the speed of rotation $f_{ROT}$ of the shell 20 to a suitable value in order to obtain a balance between the lifting action and the falling action of the charge 30. With reference to the sectional view 15 of FIG. 1, an arrow 62 indicates the direction of the force of gravity g in connection with the rotating shell 20 and its charge 30. Hence, an internal state of the tumbling mill 10 depends, in part, on a balance between the force of gravity 62 and a centripetal force 65 acting to press that part of the charge 30 that is immobile with respect to the internal shell surface 22, in a radial direction from the center, i.e. from the axis of rotation 60. In other words, during operation of the tumbling mill 10, the centripetal force acts to press a part of the charge 30 towards the internal shell surface 22, the centripetal force being dependent on the speed of rotation $f_{ROT}$ of the shell 20. In this connection it is noted that the centripetal force, acting on a piece of solid material being in contact with the internal shell surface 22, is dependent on the inner radius of the shell 20. When the force of gravity 62, acting on a particular piece 68 of solid material, is larger than a part 69 of the centripetal force, acting on that piece 68 of solid material in the direction opposite to the direction of gravity, then that piece 68 of solid material will fall.

A vibration sensor 70 may be provided for producing a measuring signal $S_{EA}$. The measuring signal $S_{EA}$ may be dependent on mechanical vibrations or shock pulses generated when the shell 20 rotates.

An example of the system 5 is operative when a vibration sensor 70 is firmly mounted on or at a measuring point on the tumbling mill 10. The measuring point can comprise a connection coupling to which the sensor 70 is firmly attached, or removably attachable. In the example illustrated by FIG. 1, the sensor 70 is mounted on the bearing 40. Alternatively, the sensor 70 may be mounted elsewhere on the tumbling mill where the sensor 70 is capable of generating the measuring signal $S_{EA}$ dependent on mechanical vibrations or shock pulses generated when the shell 20 rotates.

The tumbling mill 10 has an input side 80 for receiving pieces of solid material, and an output side 90 for delivery of output material 95 that has passed through the tumbling mill 10.

The shell 20 may have a mid-portion 98 having a substantially cylindrical shape, the chamber 25 at the mid portion having an internal radius $R_{MIC}$. The internal radius $R_{MIC}$ may, for example, be in excess of 0.5 meter. Alternatively, the internal radius $R_{MIC}$ may, for example, be in excess of 3 meters. The tumbling mill 10 may alternatively have a chamber mid portion internal radius $R_{MIC}$ in excess of 8 meters. The mid-portion of the shell 20 has a length $L_{MIC}$ from the input side 80 to the output side 90. The mid-portion shell length $L_{MIC}$ may, for example, be in excess of 1 meter. According to an embodiment, the mid-portion shell length $L_{MIC}$ may be in excess of 8 meters. It is noted that any herein exemplified internal radius $R_{MIC}$ may be combined with any herein exemplified shell length $L_{MIC}$.

Moreover, it is noted that the shell 20 may have a mid-portion 98 having a polygonal shape. An example of such a polygonal shell shape is a shell that exhibits at least three shell wall portions that are joined to form the chamber 25 of the tumbling mill. In this context it is noted that, for the purpose of this disclosure, a tumbling mill shell having a mid-portion 98 having at least six shell wall portions that are joined to form the chamber 25a may be considered to have a substantially cylindrical shape. that exhibits at least three shell wall portions that are joined to form the chamber 25 Thus, for the purpose of this disclosure, a tumbling mill shell having a mid-portion 98 having a hexagonal shape may be considered to have a substantially cylindrical shape.

In the example illustrated by FIG. 1, the input side 80 includes a first input 100 for pieces of solid material 110. The solid material 110 may include pieces of rock and ore, the pieces having a variety of sizes. However, the solid material 110 fed into the first input 100 may have been treated so that there is a maximum solid material particle size. The maximum solid material particle size may be a certain maximum input solid particle volume $V_{ISPM}$. The solid material 110 may, for example include pieces of ore having a particle volume of up to ten (10) cubic decimeters, i.e. an individual input solid particle has a maximum input solid particle volume $V_{ISP}$ of less than, or at most, ten (10) cubic decimeters. Alternatively, the maximum solid material particle size may be a certain maximum input solid particle diameter $D_{ISPM}$. Hence, an individual input solid particle has a maximum input solid particle diameter $D_{ISP}$ of less than, or at most 250 mm.

The particles may include useful minerals as well as minerals considered less useful. The less useful minerals may be referred to as waste minerals. In order to enable separation of the useful minerals from the waste minerals the solid material 110 is ground in the tumbling mill 10. The ground output material 95 delivered from the tumbling mill 10 may include particles whose diameter is around 0.1 mm.

According to some embodiments, the tumbling mill 10 operates to perform dry grinding. According to an embodiment the tumbling mill 10 is a ball mill operating to perform dry grinding. According to an embodiment the tumbling mill 10 is a ball mill which is used for grinding particles of a hard substance into a powder referred to as cement. In this connection it is noted that Portland cement, a form of hydraulic cement, is made by heating limestone, i.e. calcium carbonate, with other materials, such as clay, in a process known as calcination that liberates a molecule of carbon dioxide from the calcium carbonate to form calcium oxide, or quicklime, which then chemically combines with the other materials in the mix to form calcium silicates and other cementitious compounds. According to an embodiment the resulting hard substance is then ground, with an amount of gypsum, into a powder, using the above mentioned ball mill 10 for dry grinding, to make cement.

According to some embodiments, the tumbling mill 10 operates to perform grinding of solid material 110. An example of a grinding process employing a tumbling mill 10 that operates to perform grinding of solid material 110 is a tumbling mill 10 in the mining industry. According to some embodiments, the mining industry tumbling mill 10 operates to perform grinding of solid material 110 including a mix of useful minerals and minerals considered less useful. According to some embodiments, the mining industry tumbling mill 10 is an autogenous (AG) mill. Alternatively, the mining industry tumbling mill 10 is a semi-autogenous (SAG) mill. According to some embodiments, the mining industry tumbling mill 10 is a ball mill 10.

According to some embodiments, the solid material 110 is an ore having a metal content. The average metal content in the solid material 110 may be, for example, higher than 0.1%. According to some embodiments, the solid material 110 has an average metal content of more than 5% of a desired metal.

Alternatively, the average metal content in the solid material 110 may be, for example, 50%. According to some embodiments, the solid material 110 has a content of of more than 40% of a desired metal. According to some embodiments, the solid material 110 has a content of more than 40% of a desired metal, the desired metal being iron. In this context it is noted that the content of a desired metal, in the solid material 110, may affect the density of the charge in the tumbling mill 10.

Thus, according to some embodiments, the density of the charge in the tumbling mill 10 may be indicative of a relation between a desired metal and waste minerals in the charge in the tumbling mill 10.

According to some embodiments, the grinding process may be facilitated by providing a liquid 120. An example of a grinding process facilitated by providing a liquid 120 is a tumbling mill for use in the mining industry. According to some embodiments, the liquid 120 enters the tumbling mill 10 at a second input 130 at the input side 80 of the tumbling mill 10.

In the rotating shell 20, the input pieces of solid material 110 are mixed with the input liquid 120 to form the charge 30.

When the density of the input liquid 120 differs from the density of the input solid material 110, the density of the charge 30 can be controlled by controlling the proportion of input liquid 120 and input solid material 110. Thus, when the input liquid 120 has a lower density than the density of the input solid material 110, the density of the charge 30 can be lowered by increasing the amount of input liquid 120.

The input liquid 120 may comprise water. Water has a density of about 997 kg per cubic metre. The pieces of input solid material typically has a higher density than the density of the input liquid. The pieces of input solid material typically has a density in excess of 1500 kg per cubic metre. The input solid material 110 may comprise ore that holds useful minerals mixed with other minerals.

An example of a useful mineral is a mineral that contains a metal, such as e.g. aluminium or iron. Aluminium has a density of about 2700 kg per cubic metre. Iron has a density of about 7870 kg per cubic metre. The "other mineral" mentioned above, may include e.g. granite or other pieces of rock. Granite has a density of about 2700 kg per cubic metre.

TABLE 1

Table 1 provides some examples of solid material and corresponding material properties.

| Solid material | Density (kg per cubic metre) | Tenacity | Compressive strength (MPa) |
|---|---|---|---|
| Aluminium | 2700 | Malleable | 30-280 |
| Granite | 2700 | Brittle | Above 200 |
| Hematite ($Fe_2O_3$) | 5150 | Brittle | Appr 155 |
| Magnetite ($Fe_3O_4$) | 5180 | Brittle | Appr 100 |
| Zinc | 7130 | Brittle | 75-160 |
| Iron | 7870 | Malleable | 110-220 |
| Silver | 10500 | Malleable | 45-300 |
| Gold | 19320 | Ductile | 20-205 |

In the field of mineralogy, the term tenacity describes a mineral's resistance to breaking, beading, cutting, or other forms of deformation.

A material is brittle if, when subjected to stress, it breaks with little elastic deformation and without significant plastic deformation. Brittle materials absorb relatively little energy prior to fracture, even those of high strength.

A malleable material is capable of being extended or shaped by beating or by pressure. A ductile material is capable of being pulled or stretched by mechanical force without breaking.

Compressive strength or compression strength is the capacity of a material or structure to withstand loads tending to reduce size. By contrast, tensile strength is the capacity of a material or structure to withstand loads tending to elongate. In other words, compressive strength resists compression (being pushed together), whereas tensile strength resists tension (being pulled apart).

The output side 90 of tumbling mill 10 may include a separator for delivery of output material 95 on an output 200 and for retaining pieces of material whose particle size exceeds a limit value. The separator may include a screen configured to sift out pieces of material that have a particle size smaller than a certain limit value for delivery as output material 95 on the output 200. The ground output material 95 delivered from the tumbling mill 10 may include particles whose diameter is smaller than a certain limit output particle diameter. The limit output particle diameter may be 0.1 mm.

One measure of a production quality of the tumbling mill 10 may be the proportion of output particles having an output particle diameter less than 45 μm (here μm means mikrometer), or the amount per hour of output particles having an output particle diameter less than 45 μm.

Moreover, it is desirable to obtain a high degree of efficiency of the grinding process. One aspect of grinding process efficiency is the amount of ground material per time unit. Hence, it is desirable to improve or optimize the number of kg/hour of ground solid material having a particle size smaller than a limit value. However, the magnitude is usually metric tons per hour of solid material being fed into a tumbling mill 10.

Another aspect of grinding process efficiency is the amount of ground material per energy unit, in order to minimize grinding process energy consumption. Hence, it is desirable to improve or optimize the throughput in terms of kg/kilowatthour of ground solid material, the ground solid material having a particle size smaller than a limit value. In this context it is noted that a tumbling mill typically may have a power consumption of more than 4 Megawatt. Some tumbling mills have a mean power consumption of 10 Megawatt, and some may require 20 Megawatt as peak consumption. In this context it is noted that when a tumbling mill has a mean power consumption of 10 Megawatt, then the energy consumption is 10 000 kWh per hour. Thus, when that tumbling mill is in operation 24 hours a day for a year, then even a small improvement of grinding process energy efficiency, such as a one percent (1%) improvement would render energy savings in the range of six million kWh per year.

The efficiency of the grinding process in a tumbling mill 10 depends on a number of variables affecting the internal state of the tumbling mill 10. One variable that has an impact on the efficiency of the grinding process in a tumbling mill 10 is the filling degree of the tumbling mill 10. Hence, it is desirable to control the inflow of input solid material 110 so as to achieve an optimal filling degree.

In order to maximise the amount of output material 95 from the tumbling mill 10 it is therefore desirable to control the inflow of input material 110 so as to maintain an optimal state of the tumbling mill process. The optimal internal state of the tumbling mill process may include a certain filling degree of the shell 20, i.e. a certain charge volume. Hence, one variable that has an impact on the efficiency of the grinding process in a tumbling mill 10 is the feed rate, i.e. the amount of solid material particles per time unit that is fed into the tumbling mill 10.

Another variable that has an impact on the efficiency of the grinding process in a tumbling mill 10 is the mineralogical properties of the input solid material particles 110. In this connection, it is noted that mineralogy is a subject of geology specializing in the scientific study of physical properties of minerals as well as the chemistry, and crystal structure of minerals. Moreover, the mineralogical properties of the particles in the charge 30 are not constant over time, since the composition of solid material 110, such as ore from a mine, typically varies over time. The variation of the mineralogical properties of the particles in the charge 30 may affect the efficiency of the grinding process of the tumbling mill 10. Hence, the efficiency of the grinding process may be variable over time due to the variation of the mineralogical properties of the particles in the charge 30. Thus, a decreased efficiency of the grinding process, during a certain time span, may lead to an increase of the charge volume in the mill 10 if the infeed of material is kept constant.

Thus, unless an operator of the tumbling mill is adequately informed about the current charge volume in the mill 10 there is also a risk of overload which may, in a worst case, lead to a complete stop of the grinding process.

Yet another variable that has an impact on the efficiency of the grinding process is the size distribution of the solid material particles 110 that are fed into the tumbling mill 10. According to some embodiments the infeed of solid material particles 110 is controlled so that a certain proportion of the solid material particles 110 provided on the first input 100 have individual volumes of more than one cubic decimeter so as to increase the efficiency of the grinding process. It has been concluded that control of the infeed of solid material particles 110 so that a certain proportion of the solid material particles 110 provided on the first input 100 have individual volumes of more than one cubic decimeter increases the efficiency of the grinding process, in particular when the tumbling mill is an AG mill or an SAG mill.

The shell 20 is typically opaque, i.e. it is not possible to visually inspect the charge in the shell during operation of the tumbling mill 10. Moreover, the movement of heavy ore that is tumbled during operation of the tumbling mill 10 prevents placing cameras or other sensitive detectors on the inside of the shell 20.

It is an object of this document to describe methods and systems for an improved monitoring of an internal state in a tumbling mill during operation. It is also an object of this document to describe methods and systems for an improved Human Computer Interface (HCI) relating to internal state in a tumbling mill during operation. It is also an object of this document to describe methods and systems for an improved Graphical User Interface relating to the grinding process in a tumbling mill 10.

The inventor realized that there may exist a mechanical vibration $V_{IMP}$ indicative of an impact between a protrusion, such as a lifter, on an internal surface of the rotating shell 20 and at least one particle in a toe portion 205 of the material charge 30 during operation of the tumbling mill 10. The inventor also contemplated that such a mechanical vibration $V_{IMP}$ may be indicative of a current internal state of the tumbling mill 10 and/or a current state of the grinding process. A mechanical vibration $V_{IMP}$ may be generated when a protrusion, such as a lifter, interacts with a particle in a toe portion 205 of a material charge 30 in the chamber 25. The impact force $F_{IMP}$ of the interaction between the rotationally moving lifter and the material charge 30 causes an acceleration of the at least one particle in the toe portion 205 of the material charge 30, the impact causing the mechanical impact vibration $V_{IMP}$. In fact, the impact force $F_{IMP}$ may cause a mechanical impact vibration $V_{IMP}$ which is indicative of a current internal state of the tumbling mill 10 and/or indicative of a current state of the grinding process.

The sensor 70 placed outside the chamber 25 may detect vibrations caused by interaction involving particles of the charge 30 in the chamber 25 during operation of the tumbling mill 10. Hence, with reference to FIG. 1, the sensor 70 is capable of generating the measuring signal $S_{EA}$ dependent on mechanical vibrations or shock pulses generated when the shell 20 rotates. Thus, the measuring signal $S_{EA}$ may be dependent on, and indicative of, the impact force $F_{IMP}$ between a protrusion, such as a lifter, and at least one particle in a toe portion 205 of the material charge 30 during operation of the tumbling mill 10.

The sensor 70 may, for example, be an accelerometer 70 configured to generate the measuring signal $S_{EA}$ having an amplitude that depends on the impact force $F_{IMP}$. The inventor concluded that there may exist a mechanical vibration $V_{IMP}$ indicative of a current internal state of the tumbling mill 10 and/or of a current state of the grinding process, but that conventional methods for measuring vibrations and/or for analysing and/or for visualising such vibrations may hitherto have been inadequate.

An analysis apparatus 150 is provided for monitoring of the tumbling mill process. The analysis apparatus 150 may generate information indicative of the internal state of the tumbling mill process dependent on the measuring signal $S_{EA}$. The sensor 70, generating the measuring signal $S_{EA}$, is coupled to an input 140 of the analysis apparatus 150 so as to deliver the measuring signal $S_{EA}$ to the analysis apparatus 150. The analysis apparatus 150 also has a second input 160 for receiving a position signal Ep dependent on the rotational position of the shell 20.

A position sensor 170 is provided to generate the position signal Ep dependent on the rotational position of the shell 20. As mentioned above, the shell 20 is rotatable around the axis of rotation 60, and thus the position sensor 170 may generate a position signal Ep having a sequence of shell position signal values $P_S$ for indicating momentary rotational positions of the shell 20. A position marker 180 may be provided on an outer surface of the shell 20 such that, when the shell 20 rotates around the axis of rotation 60, the position marker 180 passes by the position sensor 170 once per revolution of the shell, thereby causing the position sensor 170 to generate a revolution marker signal $P_S$. Such a revolution marker signal PS may be in the form of an electric pulse having an edge that can be accurately detected and indicative of a certain rotational position of the monitored shell 20. The analysis apparatus 150 may generate information indicative of a rotational speed $f_{ROT}$ of the shell 20 dependent on the position signal Ep, e.g. by detecting a temporal duration between revolution marker signals PS. The position marker 180 may be e.g. an optical device 180, such as a reflex 180, when the position sensor 170 is an optical device, such as e.g. a laser transceiver configured to generate a revolution marker signal $P_S$ when the intensity of laser reflection changes due to a laser beam impinging the reflex 180. Alternatively, the position marker 180 may be e.g. a magnetic device 180, such as strong magnet 180, when the position sensor 170 is a device 170 configured to detect a changed magnetic field. An example of a device configured to detect a changed magnetic field is a device including an inductive coil which will generate an electric current in response to a changed changed magnetic field. Thus, the device 170 configured to detect a changed magnetic field is configured to generate a revolution marker signal $P_S$ when passing by the magnetic device 180. Alternatively, the position sensor 170 may be embodied by an encoder 170 which is mechanically coupled to the rotating mill shell 20 such that the encoder generates e.g. one marker signal $P_S$ per revolution the rotating mill shell 20.

The system 5 may include a control room 220 allowing a mill operator 230 to operate the tumbling mill 10. The analysis apparatus 150 may be configured to generate information indicative of an internal state of the tumbling mill 10. The analysis apparatus 150 also includes an apparatus Human Computer Interface (HCI) 210 for enabling user input and user output. The HCI 210 may include a display, or screen, 210S for providing a visual indication of an analysis result. The analysis result displayed may include information indicative of an internal state of the tumbling mill process for enabling the operator 230 to control the tumbling mill.

A tumbling mill feed controller 240 is configured to deliver a solid material feed rate set point $R_{SSP}$, and it may also, optionally, deliver a liquid feed rate set point $R_{LSP}$. According to some embodiments, the set point value $R_{SSP}$ is set by the operator 230. According to some embodiments, also the set point value $R_{LSP}$ is set by the operator 230. Thus, the tumbling mill feed controller 240 may include a mill feed user input/output interface 250 enabling to operator to regulate a solid material feed rate $R_S$ and/or a liquid feed rate $R_L$.

As mentioned above, the input side 80 of the tumbling mill includes a first input 100 for pieces of solid material 110, and optionally the input side 80 may also have a second input 130 for entry of liquid 120, such as e.g. water, into the chamber 25. The solid material 110 may be transported to the first input 100 by a conveyer belt 260. The conveyer belt 260 runs at a conveyer belt speed to transport a solid material 110 to the first input 100 at the solid material feed rate $R_S$.

The solid material feed rate $R_S$ may be for example 10 000 kg per minute during operation of the tumbling mill 10 at a certain internal state of the tumbling mill 10. Similarly, the liquid feed rate $R_L$ may be for example 1000 kg per minute during operation of the tumbling mill 10 at the certain internal state of the tumbling mill 10.

Control of the liquid feed rate $R_L$ is diagrammatically shown in FIG. 1 by the symbol of a controllable valve 270, receiving the liquid feed rate set point $R_{LSP}$ from the tumbling mill feed controller 240. Similarly, control of the solid material feed rate $R_{SF}$ is diagrammatically shown in FIG. 1 by the symbol of a controllable valve 280, receiving the solid material feed rate set point $R_{SSP}$ from the tumbling mill feed controller 240.

Figure 2:
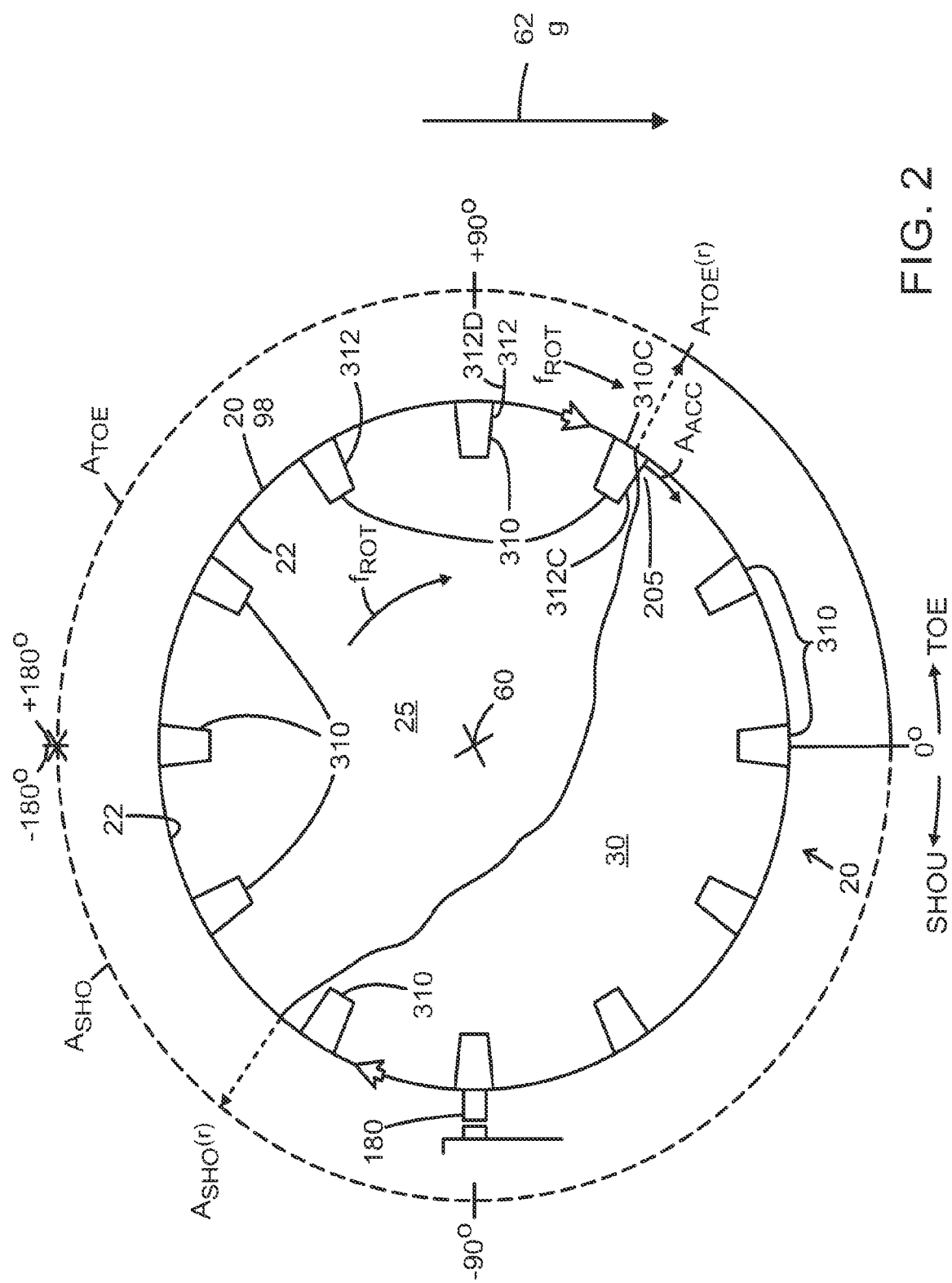
FIG. 2, being another example of a cross-sectional view taken along line A-A of FIG. 1.

FIG. 2, being another example of a cross-sectional view taken along line A-A of FIG. 1, shows a more detailed example of the mid-portion 98 of the shell 20. The shell 20 has an internal shell surface 22 facing the chamber 25, said internal shell surface 22 including a number of protrusions 310. According to some embodiments, there are provided at least two protrusions 310. The example shell 20, shown in FIG. 2, includes twelve protrusions 310 that are placed at equal distances from each other on the internal shell surface 22 of the shell 20. The protrusions 310 may be configured to engage and lift material 30 as the shell rotates about the axis 60. Thus, the protrusions 310 may be referred to as lifters 310.

In FIG. 2, the shell 20 is shown during rotation in a clockwise direction at a speed of rotation $f_{ROT}$. Lifters 310 comprise structures such as internal formations, veins, bars, projections and the like which project from internal shell surface 22 towards a center of shell 20. A lifter 310, also referred to as protrusion 310, has a leading edge 312 that engages and lifts the material charge 30 as tumbling mill 10 is rotated about axis 60 such that the material falls upon itself within the interior chamber 25. In one example, lifters 310 comprise elongate bars which are mounted to internal shell surface wall 22 so as to at least partially line the interior shell surface 22 of mill 10. In other examples, lifters 310 are integrally formed as part of a single unitary body with internal shell surface wall 22. According to some embodiments, the leading edges 312 of the protrusions 310 are equidistant. Thus, referring to the example shell 20 shown in FIG. 2, including twelve protrusions 310 wherein each protrusion 310 has a leading edge 312, the angular distance between any two adjacent leading edges 312 is 30 degrees. In this context it is noted that, when there are L protrusions 310 on an internal shell surface 22, the L protrusions 310 being positioned such that the leading edges 312 of the protrusions 310 are equidistant, then the angular distance between any two adjacent leading edges 312 is 360/L degrees.

In the example shown in FIG. 2, the position sensor 170 is mounted in a stationary manner so that it generates a position signal Ep having a sequence of position signal values PS for indicating momentary rotational positions of the shell 20. The position marker device 180 may be provided on an outer wall surface of the shell 20 such that, when the shell 20 rotates around the axis of rotation 60, the position marker 180 passes by the position sensor 170 once per revolution of the shell, thereby causing the position sensor 170 to generate a revolution marker signal value PS.

Figure 3:
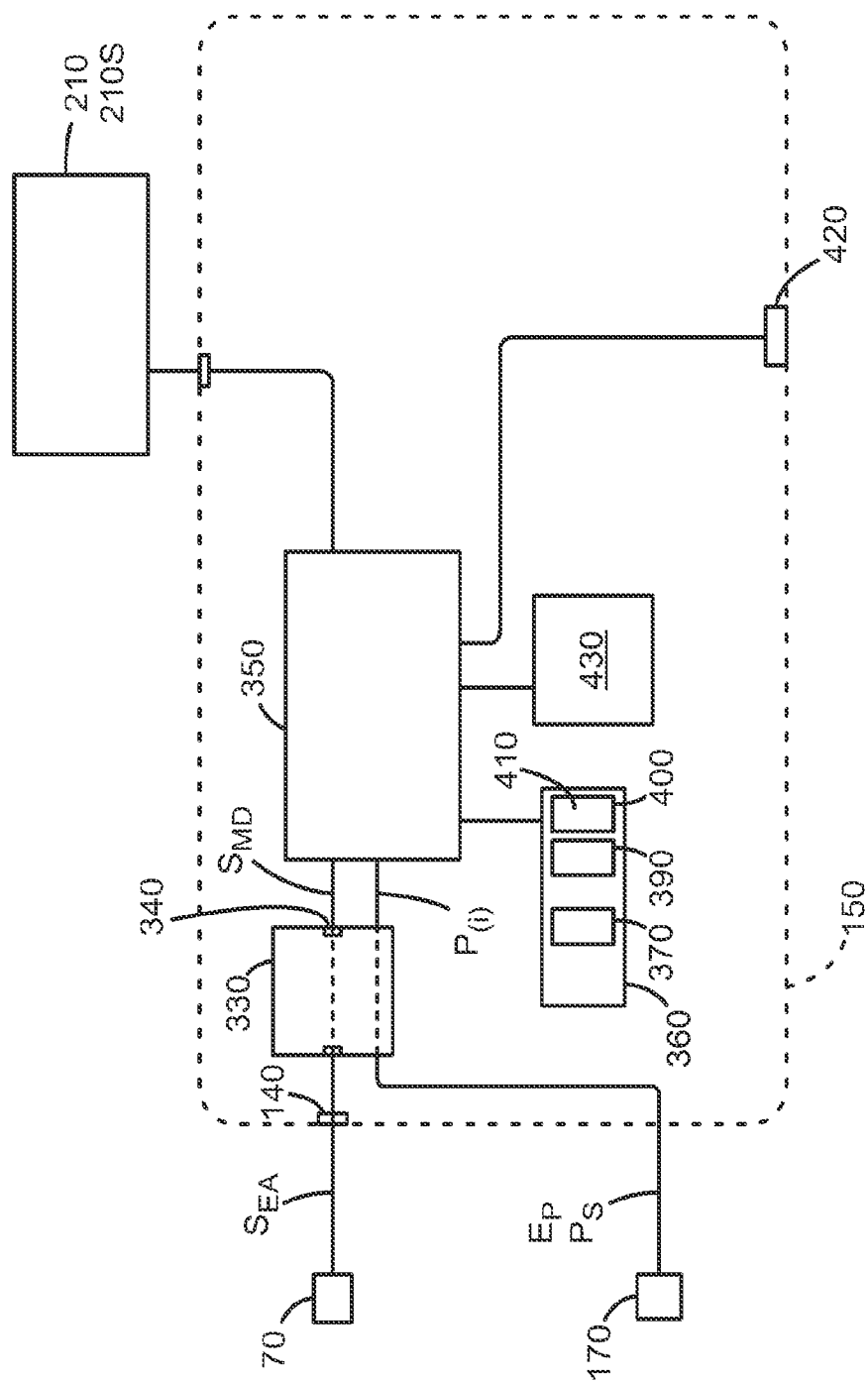
FIG. 3 is a schematic block diagram of an example of the analysis apparatus shown in FIG. 1.

FIG. 3 is a schematic block diagram of an example of the analysis apparatus 150 shown in FIG. 1. The analysis apparatus 150 has an input 140 for receiving the analogue vibration signal $S_{EA}$ from the vibration sensor 70. The input 140 is connected to an analogue-to-digital (A/D) converter 330. The A/D converter 330 samples the received analogue vibration signal $S_{EA}$ with a certain sampling frequency $f_S$ so as to deliver a digital measurement data signal $S_{MD}$ having said certain sampling frequency $F_S$ and wherein the amplitude of each sample depends on the amplitude of the received analogue signal at the moment of sampling. The digital measurement data signal $S_{MD}$ is delivered on a digital output 340 which is coupled to a data processing device 350.

With reference to FIG. 3, the data processing device 350 is coupled to a memory 360 for storing program code. The program memory 360 is preferably a non-volatile memory. The memory 360 may be a read/write memory, i.e. enabling both reading data from the memory and writing new data onto the memory 360. According to an example, the program memory 360 is embodied by a FLASH memory. The program memory 360 may comprise a first memory segment 370 for storing a first set of program code 380 which is executable so as to control the analysis apparatus 150 to perform basic operations. The program memory 360 may also comprise a second memory segment 390 for storing a second set of program code 394. The second set of program code in the second memory segment 390 may include program code for causing the analysis apparatus 150 to process a detected signal. The signal processing may include processing for generating information indicative of an internal state of a tumbling mill, as discussed elsewhere in this document.

Moreover, the signal processing may include control of the internal state of a tumbling mill, as discussed elsewhere in this document. Thus, the signal processing may include generating data indicative of an internal state of a tumbling mill, as disclosed in connection with embodiments of status parameter extractor 450 of e.g. FIGS. 5, 15 and/or 24.

The memory 360 may also include a third memory segment 400 for storing a third set of program code 410. The set of program code 410 in the third memory segment 400 may include program code for causing the analysis apparatus to perform a selected analysis function. When an analysis function is executed, it may cause the analysis apparatus to present a corresponding analysis result on user interface 210, 210S or to deliver the analysis result on a port 420.

The data processing device 350 is also coupled to a read/write memory 430 for data storage. Hence, the analysis apparatus 150 comprises the data processor 350 and program code for causing the data processor 350 to perform certain functions, including digital signal processing functions. When it is stated, in this document, that the apparatus 150 performs a certain function or a certain method, that statement may mean that the computer program runs in the data processing device 350 to cause the apparatus 150 to carry out a method or function of the kind described in this document.

The processor 350 may be a Digital Signal Processor. The Digital Signal Processor 350 may also be referred to as a DSP. Alternatively the processor 350 may be a Field Programmable Gate Array circuit (FPGA). Hence, the computer program may be executed by a Field Programmable Gate Array circuit (FPGA). Alternatively, the processor 350 may comprise a combination of a processor and an FPGA. Thus, the processor may be configured to control the operation of the FPGA.

Figure 4:
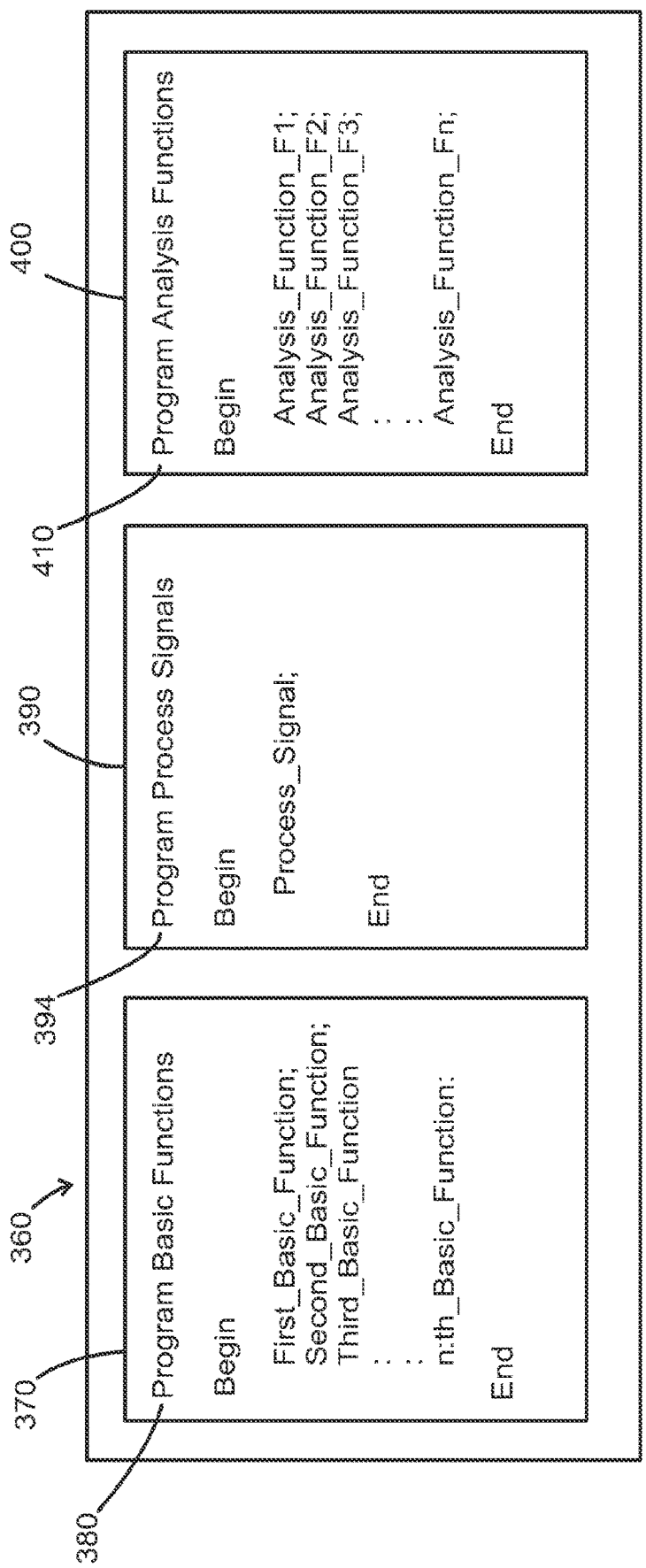
FIG. 4 is a simplified illustration of the program memory and its contents.

FIG. 4 is a simplified illustration of the program memory 360 and its contents. The simplified illustration is intended to convey understanding of the general idea of storing different program functions in memory 360, and it is not necessarily a correct technical teaching of the way in which a program would be stored in a real memory circuit. The first memory segment 370 stores program code for controlling the analysis apparatus 150 to perform basic operations. Although the simplified illustration of FIG. 4 shows pseudo code, it is to be understood that the program code may be constituted by machine code, or any level program code that can be executed or interpreted by the data processing device 350 (FIG. 3).

The second memory segment 390, illustrated in FIG. 4, stores a second set of program code 394. The program code 394 in segment 390, when run on the data processing device 350, will cause the analysis apparatus 150 to perform a function, such as a digital signal processing function. The function may comprise an advanced mathematical processing of the digital measurement data signal $S_{MD}$.

A computer program for controlling the function of the analysis apparatus 150 may be downloaded from a server computer. This means that the program-to-be-downloaded is transmitted to over a communications network. This can be done by modulating a carrier wave to carry the program over the communications network. Accordingly the downloaded program may be loaded into a digital memory, such as memory 360 (See FIGS. 3 and 4). Hence, a program 380 and/or a signal processing program 394 and/or an analysis function program 410 may be received via a communications port, such as port 420 (FIG. 1 & FIG. 3), so as to load it into program memory 360.

Accordingly, this document also relates to a computer program product, such as program code 380 and/or program code 394 and/or program code 410 loadable into a digital memory of an apparatus. The computer program product comprises software code portions for performing signal processing methods and/or analysis functions when said product is run on a data processing unit 350 of an apparatus 150. The term "run on a data processing unit" means that the computer program plus the data processing device 350 carries out a method of the kind described in this document.

The wording "a computer program product, loadable into a digital memory of a analysis apparatus" means that a computer program can be introduced into a digital memory of an analysis apparatus 150 so as achieve an analysis apparatus 150 programmed to be capable of, or adapted to, carrying out a method of a kind described in this document. The term "loaded into a digital memory of an apparatus" means that the apparatus programmed in this way is capable of, or adapted to, carrying out a function described in this document, and/or a method described in this document. The above mentioned computer program product may also be a program 380, 394, 410 loadable onto a computer readable medium, such as a compact disc or DVD. Such a computer readable medium may be used for delivery of the program 380, 394, 410 to a client. As indicated above, the computer program product may, alternatively, comprise a carrier wave which is modulated to carry the computer program 380, 394, 410 over a communications network. Thus, the computer program 380, 394, 410 may be delivered from a supplier server to a client having an analysis apparatus 150 by downloading over the Internet.

Figure 5:
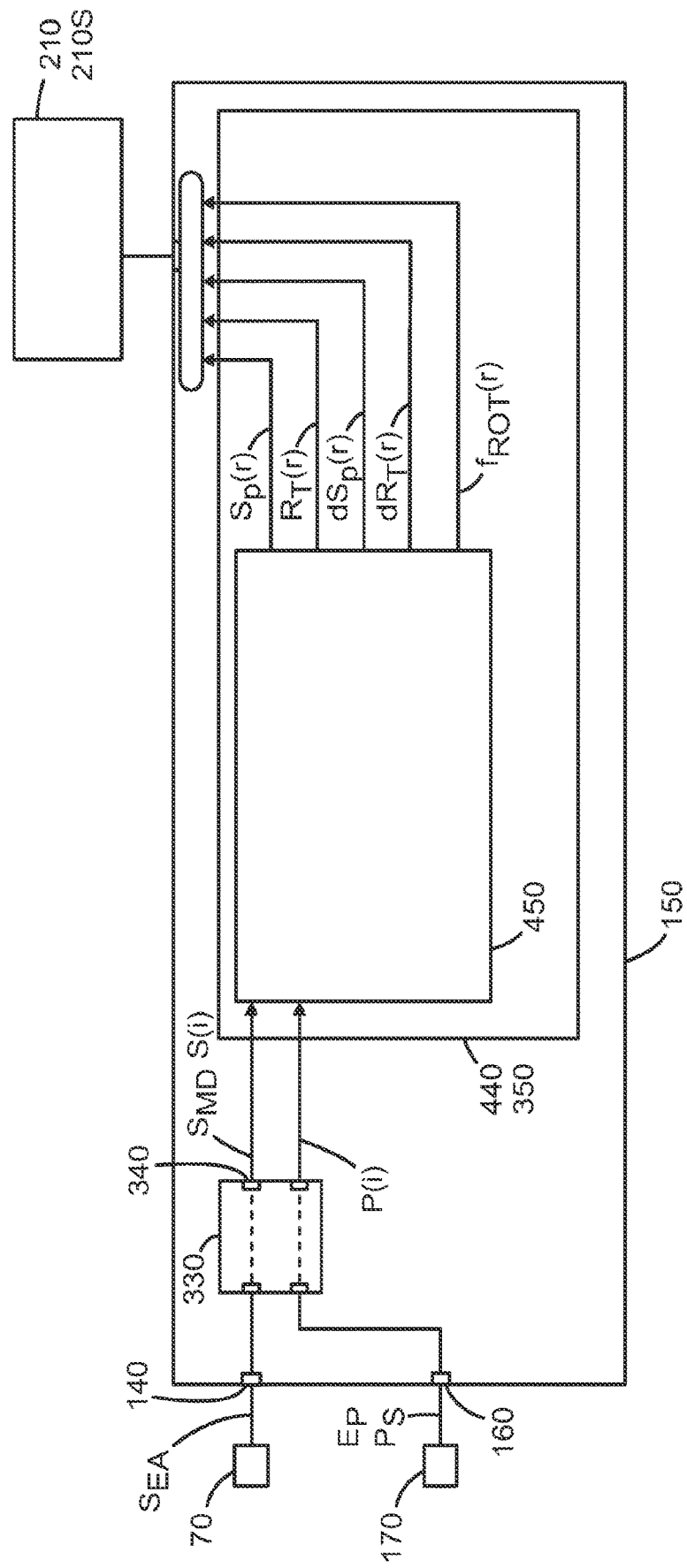
FIG. 5 is a block diagram illustrating an example of the analysis apparatus.

FIG. 5 is a block diagram illustrating an example of the analysis apparatus 150. In the FIG. 5 example, some of the functional blocks represent hardware and some of the functional blocks either may represent hardware, or may represent functions that are achieved by running program code on the data processing device 350, as discussed in connection with FIGS. 3 and 4.

The apparatus 150 in FIG. 5 shows an example of the analysis apparatus 150 shown in FIG. 1 and/or FIG. 3. For the purpose of simplifying understanding, FIG. 5 also shows some peripheral devices coupled to the apparatus 150. The vibration sensor 70 is coupled to the input 140 of the analysis apparatus 150 to deliver an analogue measuring signal $S_{EA}$, also referred to as vibration signal $S_{EA}$, to the analysis apparatus 150.

Moreover, the position sensor 170 is coupled to the second input 160. Thus, the position sensor 170 delivers the position signal Ep, dependent on the rotational position of the shell 20, to the second input 160 of the analysis apparatus 150.

The input 140 is connected to an analogue-to-digital (A/D) converter 330. The A/D converter 330 samples the received analogue vibration signal $S_{EA}$ with a certain sampling frequency $f_S$ so as to deliver a digital measurement data signal $S_{MD}$ having said certain sampling frequency $f_S$ and wherein the amplitude of each sample depends on the amplitude of the received analogue signal at the moment of sampling. The digital measurement data signal $S_{MD}$ is delivered on a digital output 340, which is coupled to a data processing unit 440. The data processing unit 440 comprises functional blocks illustrating functions that are performed. In terms of hardware, the data processing unit 440 may comprise the data processing unit 350, the program memory 360, and the read/write memory 430 as described in connection with FIGS. 3 and 4 above. Hence, the analysis apparatus 150 of FIG. 5 may comprise the data processing unit 440 and program code for causing the analysis apparatus 150 to perform certain functions.

The digital measurement data signal $S_{MD}$ is processed in parallel with the position signal Ep. Hence, the A/D converter 330 may be configured to sample the position signal Ep simultaneously with the sampling of the analogue vibration signal $S_{EA}$. The sampling of the position signal Ep may be performed using that same sampling frequency $f_S$ so as to generate a digital position signal $E_{PD}$ wherein the amplitude of each sample P(i) depends on the amplitude of the received analogue position signal Ep at the moment of sampling.

As mentioned above, the analogue position signal Ep may have a marker signal value $P_S$, e.g. in the form of an electric pulse having an amplitude edge that can be accurately detected and indicative of a certain rotational position of the monitored shell 20. Thus, whereas the analogue position marker signal $P_S$ has an amplitude edge that can be accurately detected, the digital position signal $E_{PD}$ will switch from a first value, e.g. "0" (zero), to a second value, e.g. "1" (one), at a distinct time.

Hence, the A/D converter 330 may be configured to deliver a sequence of pairs of measurement values S(i) associated with corresponding position signal values P(i).

The letter "i" in S(i) and P(i) denotes a point in time, i.e. a sample number. Hence, the time of occurrence of a rotational reference position of said rotating shell can be detected by analysing a time sequence of the position signal values P(i) and identifying the sample P(i) indicating that the digital position signal $E_{PD}$ has switched from the first value, e.g. "0" (zero), to the second value, e.g. "1" (one).

Figures 6A, 6B:
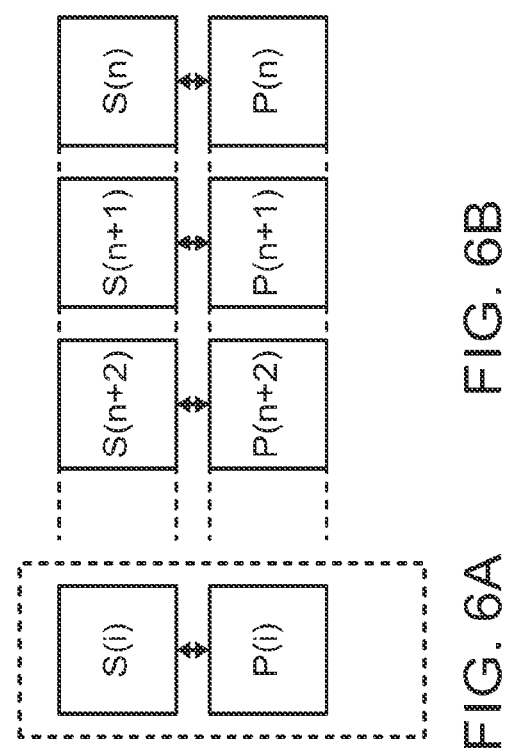
FIG. 6A is an illustration of a signal pair S(i) and P(i) as delivered by the A/D converter.
FIG. 6B is an illustration of a sequence of the signal pair S(i) and P(i) as delivered by the A/D converter.

FIG. 6A is an illustration of a signal pair S(i) and P(i) as delivered by the A/D converter 330.

FIG. 6B is an illustration of a sequence of the signal pair S(i) and P(i) as delivered by the A/D converter 330. A first signal pair comprises a first vibration signal amplitude value S(n), associated with the sample moment "n", being delivered simultaneously with a first position signal value P (n), associated with the sample moment "n". It is followed by a second signal pair comprising a second vibration signal amplitude value S(n+1), associated with the sample moment "n+1", which is delivered simultaneously with a second position signal value P (n+1), associated with the sample moment "n+1", and so on.

With reference to FIG. 5, the signal pair S(i) and P(i) is delivered to a status parameter extractor 450. The status parameter extractor 450 is configured to generate an amplitude peak value $S_P(r)$ based on a time sequence of measurement sample values S(i). The amplitude peak value $S_P(r)$ may be dependent on an impact force $F_{IMP}$ generated when a projection 310 on an internal shell surface of the rotating shell interacts with a toe portion 205 of the charge material 30 (See FIG. 2).

The status parameter extractor 450 is also configured to generate a temporal relation value $R_T(j)$, also referred to as $R_T(r)$, based on a temporal duration ($T_D$) between time of occurrence of the amplitude peak value $S_P(r)$ and time of occurrence of a rotational reference position of said rotating shell. As mentioned above, the time of occurrence of a rotational reference position of said rotating shell can be detected by analysing a time sequence of the position signal values P(i) and identifying a sample P(i) indicating that the digital position signal $E_{PD}$ has switched from the first value, e.g. "0" (zero), to the second value, e.g. "1" (one).

Figure 7:
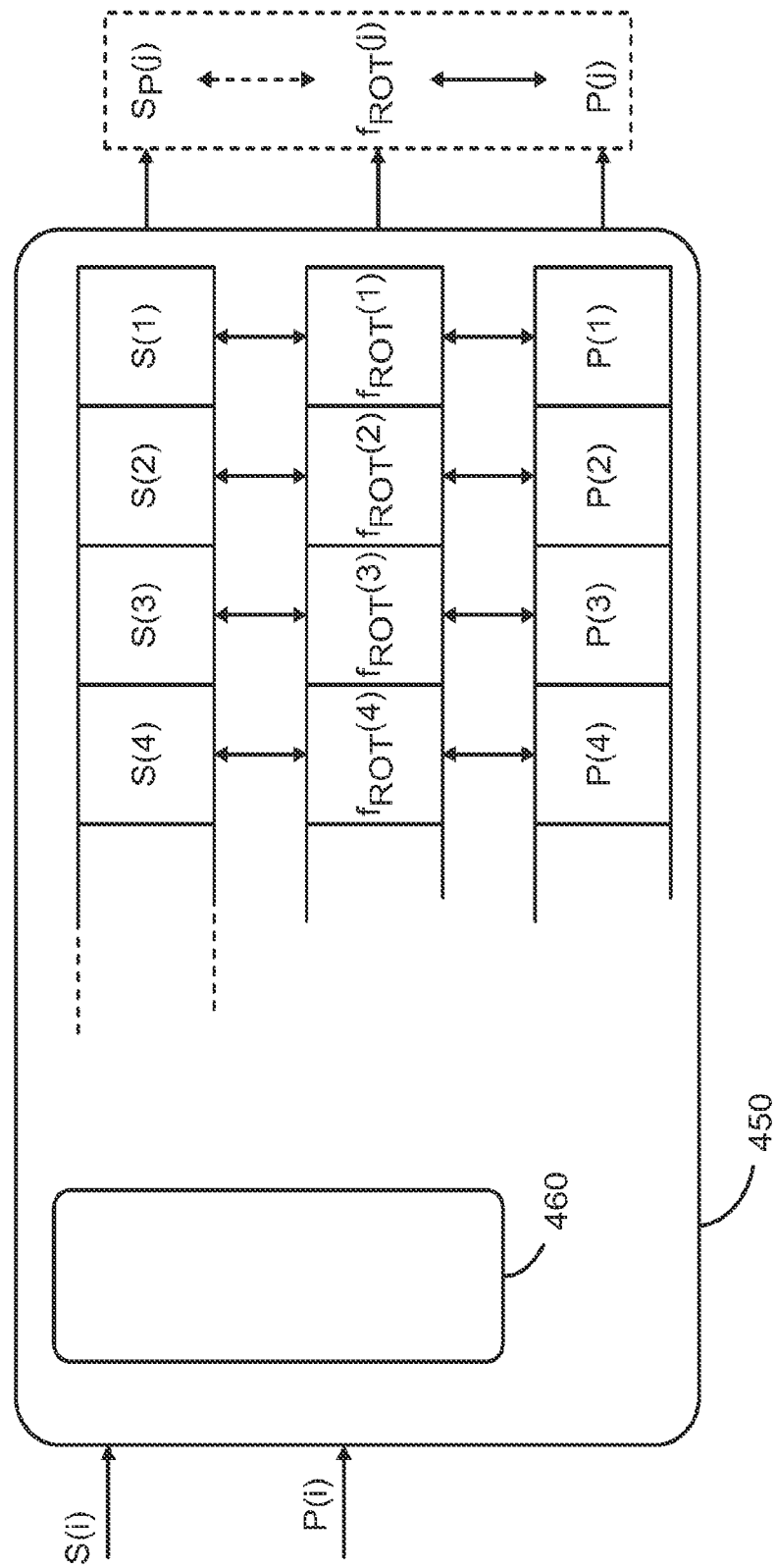
FIG. 7 is a block diagram that illustrates an example of a part of a status parameter extractor.
Figure 8A:
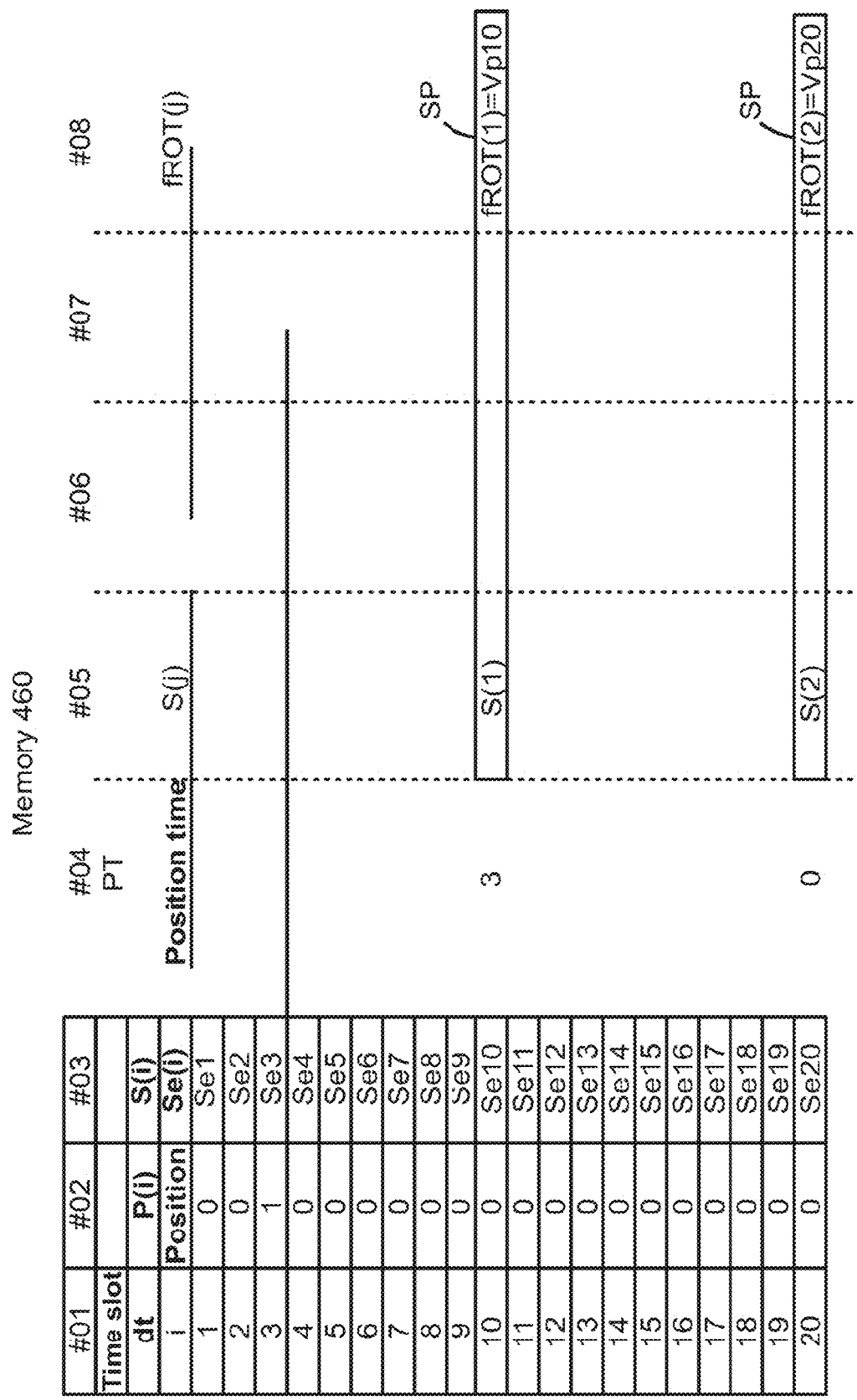
FIG. 8A-FIG. 8E is a simplified illustration of an example of the memory and its contents.
Figure 8B:
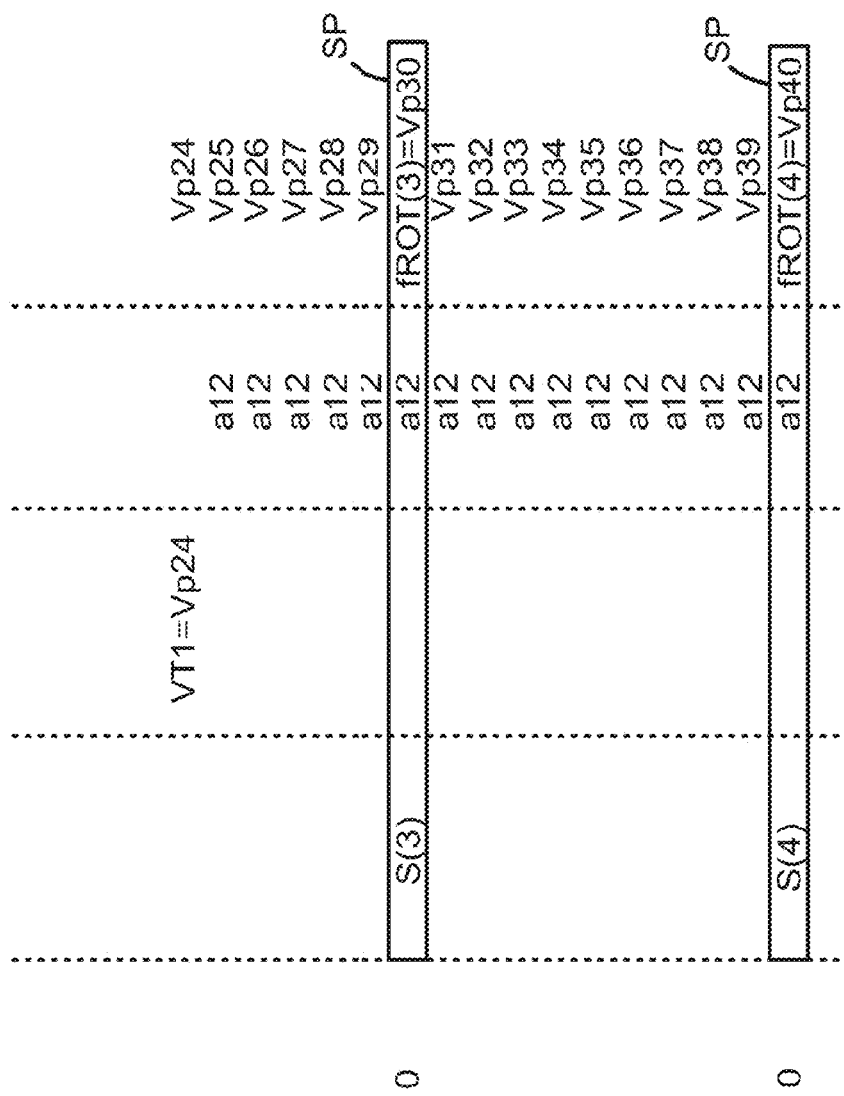
Figure 8C:
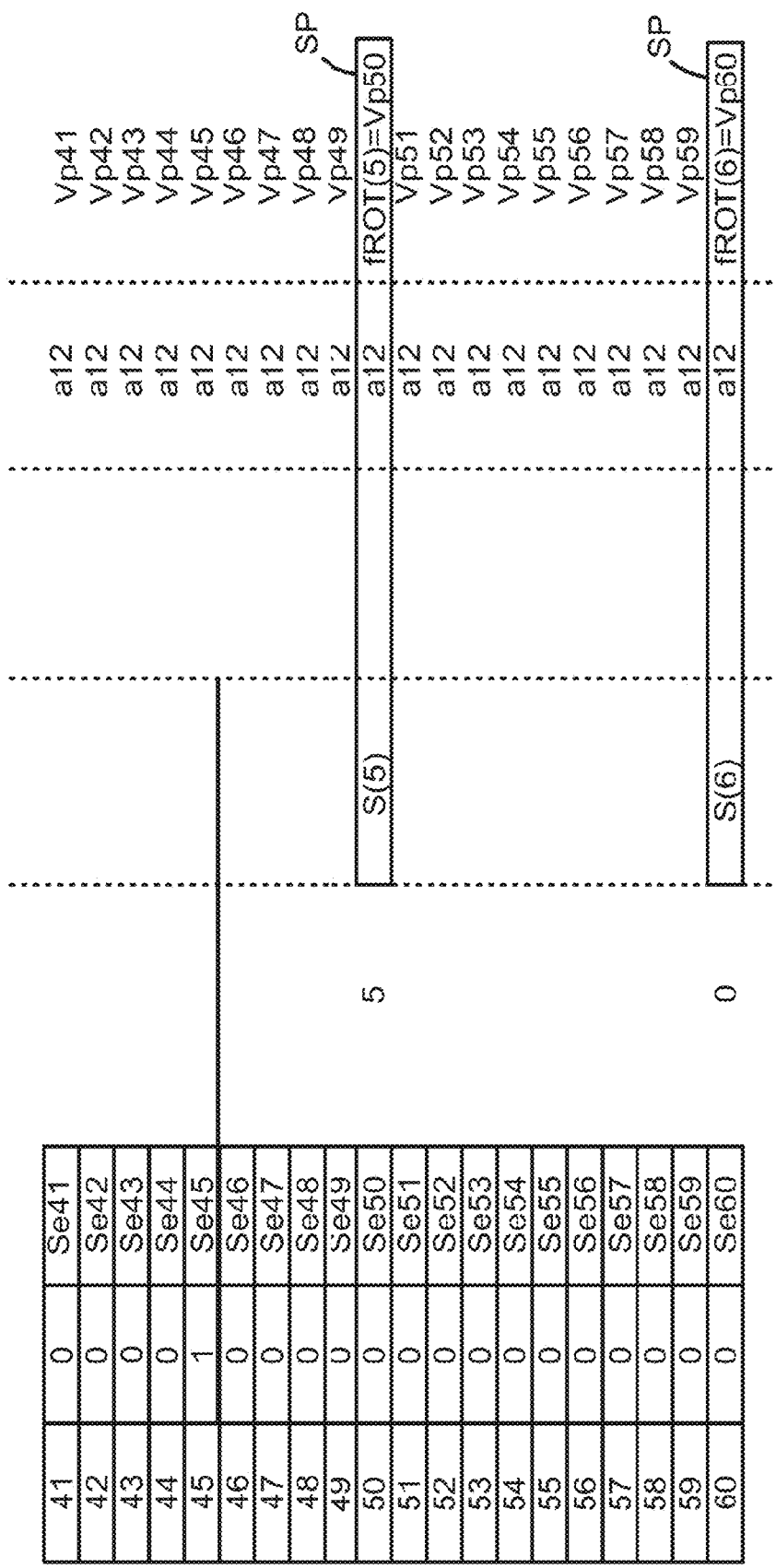
Figure 8D:
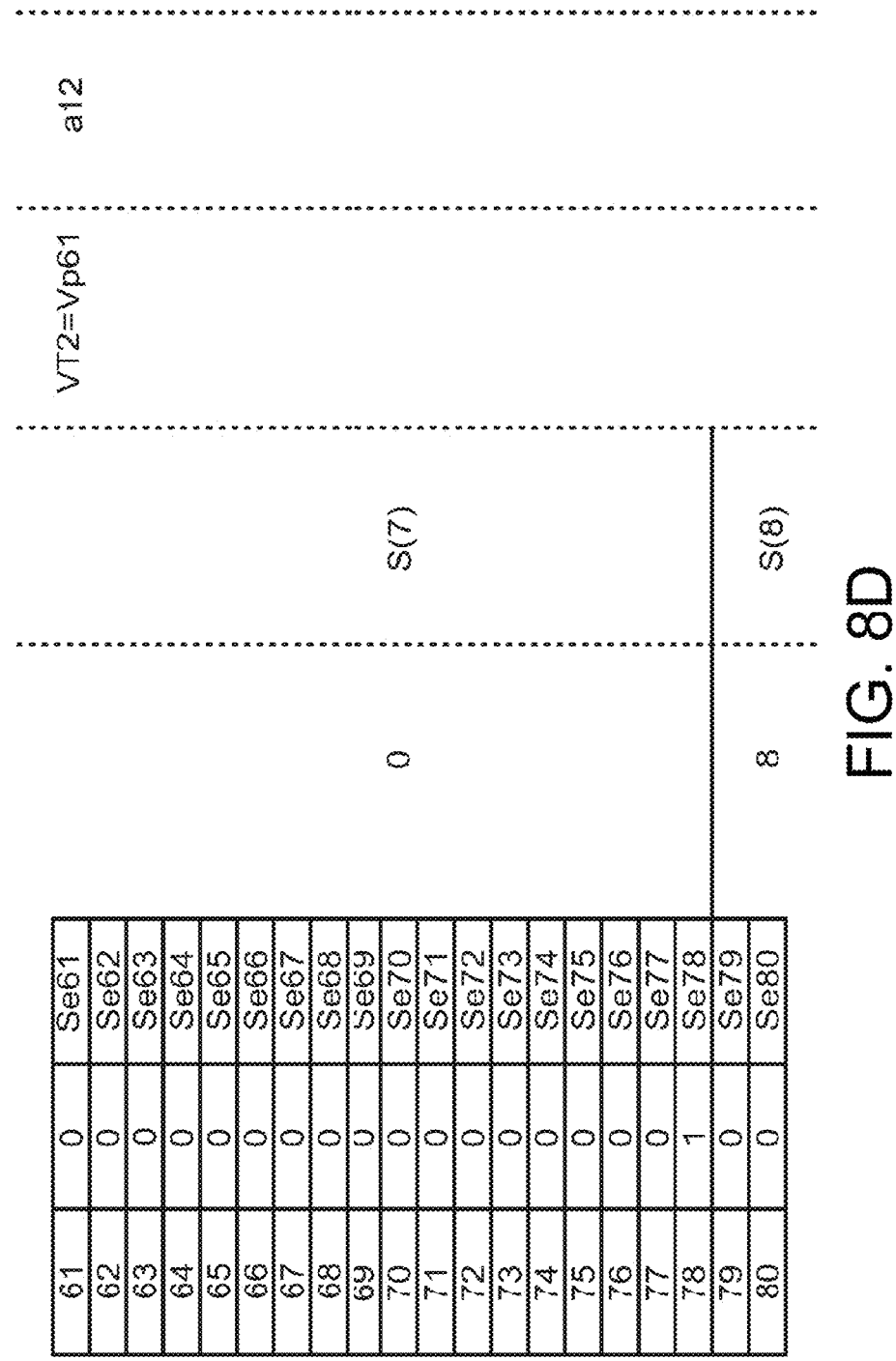
Figure 8E:
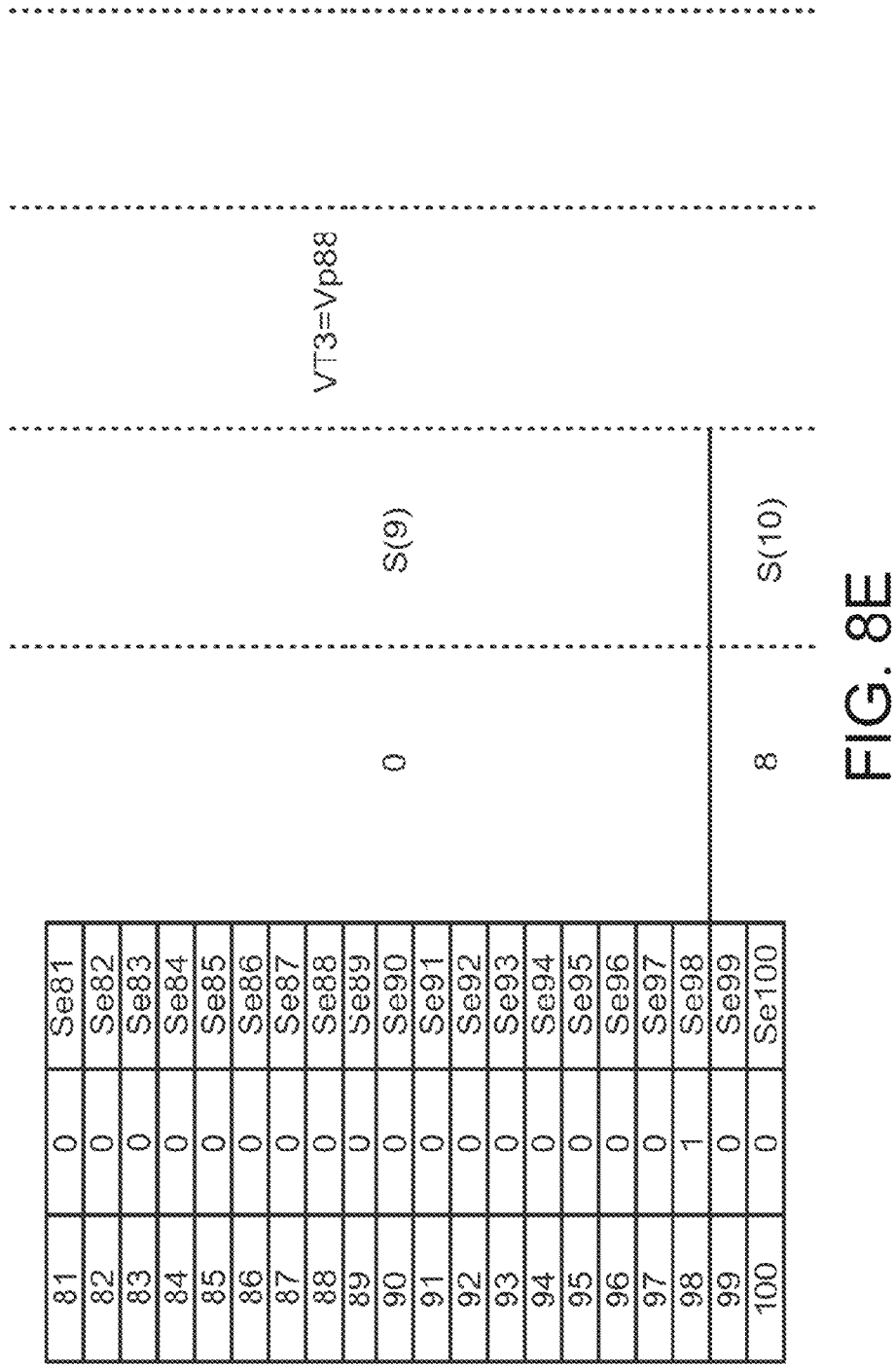

FIG. 7 is a block diagram that illustrates an example of a part of a status parameter extractor 450. According to an example the status parameter extractor 450 comprises a memory 460. The status parameter extractor 450 is adapted to receive a sequence of measurement values S(i) and a sequence of positional signals P(i), together with temporal relations there-between, and the status parameter extractor 450 is adapted to provide a sequence of temporally coupled values S(i), $f_{ROT}(i)$, and P(i). Thus, an individual measurement value S(i) is associated with a corresponding speed value $f_{ROT}(i)$, the speed value $f_{ROT}(i)$ being indicative of the rotational speed of the shell 20 at the time of detection of the associated individual measurement value S(i). This is described in detail below with reference to FIGS. 8-13.

FIG. 8A-FIG. 8E is a simplified illustration of an example of the memory 460 and its contents, and columns #01, #02, #03, #04 and #05, on the left hand side of the memory 460 illustration, provide an explanatory image intended to illustrate the temporal relation between the time of detection of the encoder pulse signals P(i) (See column #02) and the corresponding vibration measurement values S(i) (See column #03).

As mentioned above, the analogue-to-digital converter 330 samples the analogue electric measurement signal $S_{EA}$ at an initial sampling frequency $f_S$ so as to generate a digital measurement data signal $S_{MD}$. The encoder signal P may also be detected with substantially the same initial temporal resolution $f_S$, as illustrated in the column #02 of FIG. 8.

Column #01 illustrates the progression of time as a series of time slots, each time slot having a duration dt=1/$f_{Sample}$; wherein $f_{Sample}$ is a sample frequency having an integer relation to the initial sample frequency $f_S$ with which the analogue electric measurement signal $S_{EA}$ is sampled. According to a preferred example, the sample frequency $f_{Sample}$ is the initial sample frequency $f_S$. According to another example the sample frequency $f_{Sample}$ is a first reduced sampling frequency $f_{SR1}$, which is reduced by an integer factor M as compared to the initial sampling frequency $f_S$.

In column #02 of FIG. 8 each positive edge of the encoder signal P is indicated by a "1". In this example a positive edge of the encoder signal P is detected in the 3:rd, the 45:th, the 78:th time slot and in the 98:th time slot, as indicated in column #02. According to another example, the negative edges of the positional signal are detected, which provides an equivalent result to detecting the positive edges. According to yet another example both the positive and the negative edges of the positional signal are detected, so as to obtain redundancy by enabling the later selection of whether to use the positive or the negative edge.

Column #03 illustrates a sequence of vibration sample values S(i). Column #05 illustrates the corresponding sequence of vibration sample values S(j), when an integer decimation is performed. Hence, when integer decimation is performed by this stage, it may e.g. be set up to provide an integer decimation factor M=10, and as illustrated in FIG. 8, there will be provided one vibration sample value S(j) (See column #05 in FIG. 8) for every ten samples S(i) (See column #03 in FIG. 8). According to an example, a very accurate position and time information PT, relating to the decimated vibration sample value S(j), is maintained by setting the PositionTime signal in column #04 to value PT=3, so as to indicate that the positive edge (see col #02) was detected in time slot #03. Hence, the value of the PositionTime signal, after the integer decimation is indicative of the time of detection of the position signal edge P in relation to sample value S(1).

In the example of FIG. 8, the amplitude value of the PositionTime signal at sample i=3 is PT=3, and since decimation factor M=10 so that the sample S(1) is delivered in time slot 10, this means that the edge was detected M-PT=10−3=7 slots before the slot of sample S(1).

Accordingly, the apparatus 150 may operate to process the information about the positive edges of encoder signal P(i) in parallel with the vibration samples S(i) in a manner so as to maintain the time relation between positive edges of the encoder signal P(i) and corresponding vibration sample values S(i), and/or integer decimated vibration sample values S(j), through the above mentioned signal processing from detection of the analogue signals to the establishing of the speed values $f_{ROT}$.

Figure 9:
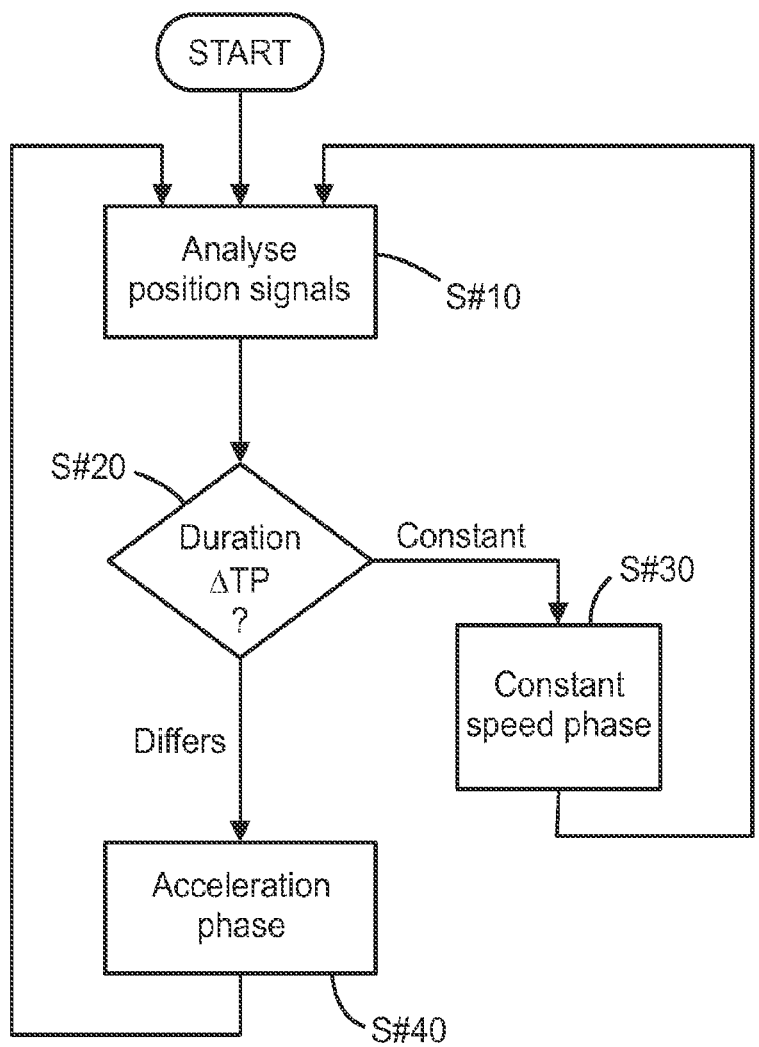
FIG. 9 is a flow chart illustrating an example of a method of operating the status parameter extractor of FIG. 7.

FIG. 9 is a flow chart illustrating an example of a method of operating the status parameter extractor 450 of FIG. 7.

According to an example, the status parameter extractor 450 analyses (Step S #10) the temporal relation between three successively received position signals, in order to establish whether the monitored rotational shell 20 is in a constant speed phase or in an acceleration phase. This analysis may be performed on the basis of information in memory 460, as described above (See FIG. 8).

If the analysis reveals that there is an identical number of time slots between the position signals, status parameter extractor 450 concludes (in step #20) that the speed is constant, in which case step S #30 is performed.

In step S #30, the status parameter extractor 450 may calculate the duration between two successive position signals, by multiplication of the duration of a time slot dt=1/$f_S$ with the number of time slots between the two successive position signals.

When the position signal is provided once per full revolution of the monitored shell 20, the speed of revolution may be calculated as $$V=1/(n_{diff}*dt),$$

wherein $n_{diff}$=the number of time slots between the two successive position signals. During constant speed phase, all of the sample values S(j) (see column #05 in FIG. 8) associated with the three analyzed position signals may be assigned the same speed value $f_{ROT}=V=1/(n_{diff}*dt)$, as defined above. Thereafter, step S #10 may be performed again on the next three successively received position signals. Alternatively, when step S #10 is repeated, the previously third position signal P3 will be used as the first position signal P1 (i.e. P1:=P3), so that it is ascertained whether any change of speed is at hand.

If the analysis (Step S #10) reveals that the number of time slots between the 1:st and the 2:nd position signals differs from the number of time slots between the 2:nd and 3:rd position signals, the status parameter extractor 450 concludes, in step S #20) that the monitored rotational shell 20 is in an acceleration phase. The acceleration may be positive, i.e. an increase in rotational speed, or the acceleration may be negative, i.e. a decrease in rotational speed also referred to as retardation.

In a next step S #40, the status parameter extractor 450 operates to establish momentary speed values during acceleration phase, and to associate each one of the measurement data values S(j) with a momentary speed value Vp which is indicative of the speed of rotation of the monitored mill shell at the time of detection of the sensor signal (SEA) value corresponding to that data value S(j).

According to an example the status parameter extractor 450 operates to establish momentary speed values by linear interpolation. According to another example the status parameter extractor 450 operates to establish momentary speed values by non-linear interpolation.

Figure 10:
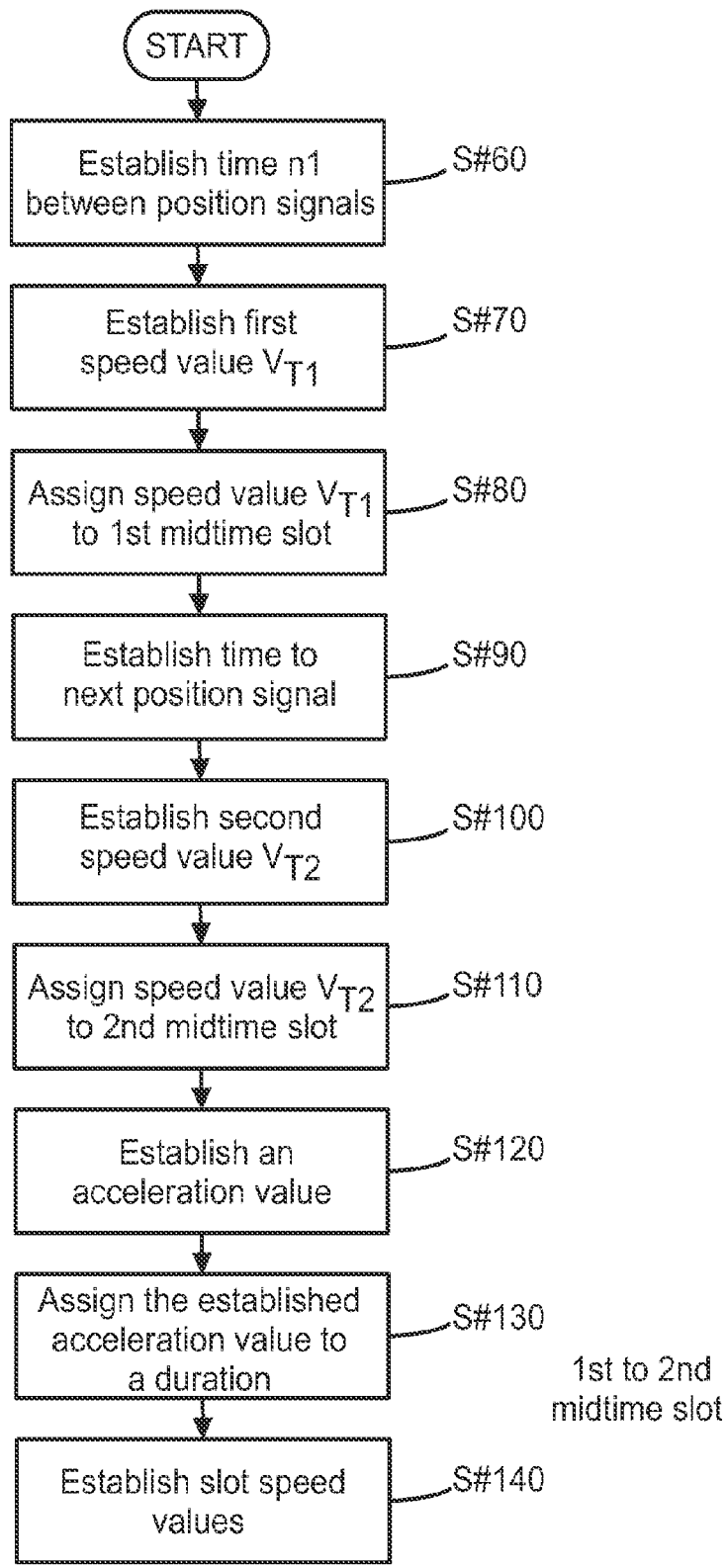
FIG. 10 is a flow chart illustrating an example of a method for performing step S#40 of FIG. 9.

FIG. 10 is a flow chart illustrating an example of a method for performing step S #40 of FIG. 9. According to an example, the acceleration is assumed to have a constant value for the duration between two mutually adjacent position indicators P (See column #02 in FIG. 8). Hence, when the position indicator P is delivered once per revolution, and
the gear ratio is 1/1: then
  the angular distance travelled by the rotating shell 20 between two mutually adjacent position indicators P is one (1) revolution, which may also be expressed as 360 degrees, and
  the duration is $T=n_{diff}*dt$,
    where $n_{diff}$ is the number of slots of duration dt between the two mutually adjacent position indicators P.

With reference to FIG. 8, a first position indicator P was detected in slot i1=#03 and the next position indicator P was detected in slot i2=#45. Hence, the duration was $n_{diff1}$=i2−i1=45−3=42 time slots.

Hence, in step S #60 (See FIG. 10 in conjunction with FIG. 8), the status parameter extractor 450 operates to establish a first number of slots $n_{diff1}$ between the first two successive position signals P1 and P2, i.e. between position signal P(i=3) and position signal P(i=45).

In step S #70, the status parameter extractor 450 operates to calculate a first speed of revolution value VT1. The first speed of revolution value VT1 may be calculated as $$VT1=1/(n_{diff1}*dt),$$

wherein VT1 is the speed expressed as revolutions per second,
$n_{diff1}$=the number of time slots between the two successive position signals; and
dt is the duration of a time slot, expressed in seconds.
Since the acceleration is assumed to have a constant value for the duration between two mutually adjacent position indicators P, the calculated first speed value VT1 is assigned to the time slot in the middle between the two successive position signals (step S #80).

Hence, in this example wherein first position indicator P1 was detected in slot $i_{P1}$=#03 and the next position indicator P2 was detected in slot $i_{P2}$=#45; the first mid time slot is $$\text{slot } i_{P1-2}=i_{P1}+(i_{P2}-i_{P1})/2=3+(45-3)/2=3+21)=24.$$

Hence, in step S #80 the first speed of revolution value VT1 may be assigned to a time slot (e.g. time slot i=24) representing a time point which is earlier than the time point of detection of the second position signal edge P(i=45), see FIG. 8.

The retro-active assigning of a speed value to a time slot representing a point in time between two successive position signals advantageously enables a significant reduction of the inaccuracy of the speed value. Whereas state of the art methods of attaining a momentary rotational speed value of a tumbling mill shell 20 may have been satisfactory for establishing constant speed values at several mutually different speeds of rotation, the state of the art solutions appear to be unsatisfactory when used for establishing speed values for a rotational tumbling mill shell 20 during an acceleration phase.

By contrast, the methods according to examples disclosed in this document enable the establishment of speed values with an advantageously small level of inaccuracy even during an acceleration phase.

In a subsequent step S #90, the status parameter extractor 450 operates to establish a second number of slots $n_{diff2}$ between the next two successive position signals. In the example of FIG. 8, that is the number of slots $n_{diff2}$ between slot 45 and slot 78, i.e. $n_{diff2}$=78−45=33.

In step S #100, the status parameter extractor 450 operates to calculate a second speed of revolution value VT2. The second speed of revolution value VT2 may be calculated as $$VT2=Vp61=1/(n_{diff2}*dt),$$

wherein $n_{diff2}$=the number of time slots between the next two successive position signals P2 and P3. Hence, in the example of FIG. 8, $n_{diff2}$=33 i.e. the number of time slots between slot 45 and slot 78.

Since the acceleration may be assumed to have a constant value for the duration between two mutually adjacent position indicators P, the calculated second speed value VT2 is assigned (Step S #110) to the time slot in the middle between the two successive position signals.

Hence, in the example of FIG. 8, the calculated second speed value VT2 is assigned to slot 61, since 45+(78−45)/2=61.5. Hence the speed at slot 61 is set to $$V(61):=VT2.$$

Hence, in this example wherein one position indicator P was detected in slot i2=#45 and the next position indicator P was detected in slot i3=#78; the second mid time slot is the integer part of:

$$i_{P2-3}=i_{P2}+(i_{P3}-i_{P2})/2=45+(78-45)/2=45+33/2=61.5$$

Hence, slot 61 is the second mid time slot $i_{P2-3}$.

Hence, in step S #110 the second speed value VT2 may advantageously be assigned to a time slot (e.g. time slot i=61) representing a time point which is earlier than the time point of detection of the third position signal edge P(i=78), see FIG. 8. This feature enables a somewhat delayed real-time monitoring of the rotational speed while achieving an improved accuracy of the detected speed.

In the next step S #120, a first acceleration value is calculated for the relevant time period. The first acceleration value may be calculated as:

$$a12=(VT2-VT1)/((i_{VT2}-i_{VT1})*dt)$$

In the example of FIG. 8, the second speed value VT2 was assigned to slot 61, so $i_{VT2}$=61 and first speed value VT1 was assigned to slot 24, so $i_{VT1}$=24. Hence, since dt=1/$f_S$, the acceleration value may be set to $$a12=fs*(VT2-VT1)/(i_{VT2}-i_{VT1})$$

for the time period between slot 24 and slot 60, in the example of FIG. 8.

In the next step S #130, the status parameter extractor 450 operates to associate the established first acceleration value a12 with the time slots for which the established acceleration value a12 is valid. This may be all the time slots between the slot of the first speed value VT1 and the slot of the second speed value VT2. Hence, the established first acceleration value a12 may be associated with each time slot of the duration between the slot of the first speed value VT1 and the slot of the second speed value VT2. In the example of FIG. 8 it is slots 25 to 60. This is illustrated in column #07 of FIG. 8.

In the next step S #140, the status parameter extractor 450 operates to establish speed values for measurement values s(j) associated with the duration for which the established acceleration value is valid. Hence speed values are established for each time slot which is associated with a measurement value s(j), and
associated with the established first acceleration value a12.

During linear acceleration, i.e. when the acceleration a is constant, the speed at any given point in time is given by the equation:

$$V(i)=V(i-1)+a*dt,$$

wherein

V(i) is the momentary speed at the point of time of slot i
V(i–1) is the momentary speed at the point of time of the slot immediately preceding slot i
a is the acceleration
dt is the duration of a time slot According to an example, the speed for each slot from slot 25 to slot 60 may be calculated successively in this manner, as illustrated in column #08 in FIG. 8. Hence, momentary speed values Vp to be associated with the detected measurement values Se(25), Se(26), Se(27) . . . Se(59), and Se(60) associated with the acceleration value a12 may be established in this manner (See time slots 25 to 60 in column #08 in conjunction with column #03 and in conjunction with column #07 in FIG. 8). Hence, momentary speed values S(j) [See column #05] to be associated with the detected measurement values S(3), S(4), S(5), and S(6) associated with the acceleration value a12 may be established in this manner.

According to another example, the momentary speed for the slot 30 relating to the first measurement value s(j)=S(3) may be calculated as:

$$V(i=30)=Vp30=VT1+a*(30-24)*dt=Vp24+a*6*dt$$

The momentary speed for the slot 40 relating to the first measurement value s(j)=S(4) may be calculated as:

$$V(i=40)=Vp40=VT1+a*(40-24)*dt=Vp40+a*16*dt$$

or as:

$$V(i=40)=Vp40=V(30)+(40-30)*dt=Vp30+a*10*dt$$

The momentary speed for the slot 50 relating to the first measurement value s(j)=S(5) may then subsequently be calculated as:

$$V(i=50)=Vp50=V(40)+(50-40)*dt=Vp40+a*10*dt$$

and the momentary speed for the slot 60 relating to the first measurement value s(j)=S(6) may then subsequently be calculated as:

$$V(i=60)=Vp50+a*10*dt$$

When measurement sample values S(i) [See column #03 in FIG. 8] associated with the established acceleration value have been associated with a momentary speed value, as described above, an array of data including a time sequence of measurement sample values S(i), each value being associated with a speed value V(i), $f_{ROT}$(i), may be delivered on an output of said status parameter extractor 450. Alternatively, if a decimation of sample rate is desired, it is possible to do as follows: When measurement sample values S(j) [See column #05 in FIG. 8] associated with the established acceleration value have been associated with a momentary speed value, as described above, an array of data including a time sequence of measurement sample values S(j), each value being associated with a speed value V(j), $f_{ROT}$(j), may be delivered on an output of said status parameter extractor 450.

Figure 11:
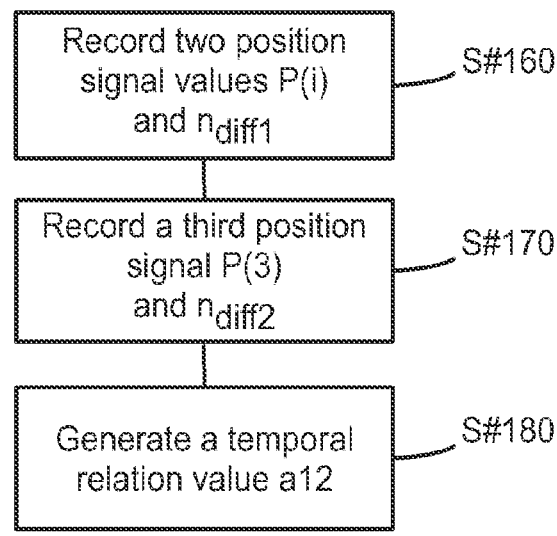
FIG. 11 is a flow chart illustrating another example of a method according to an embodiment of the present disclosure.

With reference to FIG. 11, another example of a method is described. According to this example, the status parameter extractor 450 operates to record (see step S #160 in FIG. 11) a time sequence of position signal values P(i) of said position signal (Ep) such that there is a first temporal relation $n_{diff1}$ between at least some of the recorded position signal values (P(i)), such as e.g. between a first position signal value P1(i) and a second position signal value P2(i). According to an example, the second position signal value P2(i) is received and recorded in a time slot (i) which arrives $n_{diff1}$ slots after the reception of the first position signal value P1(i) (see step S #160 in FIG. 11). Then the third position signal value P3(i) is received and recorded (see step S #170 in FIG. 11) in a time slot (i) which arrives $n_{diff2}$ slots after the reception of the second position signal value P2(i).

As illustrated by step S #180 in FIG. 11, the status parameter extractor 450 may operate to calculate a relation value $$a12=n_{diff1}/n_{diff2}$$

If the relation value a12 equals unity, or substantially unity, then the status parameter extractor 450 operates to establish that the speed is constant, and it may proceed with calculation of speed according to a constant speed phase method.

If the relation value a12 is higher than unity, the relation value is indicative of a percentual speed increase.

If the relation value a12 is lower than unity, the relation value is indicative of a percentual speed decrease.

The relation value a12 may be used for calculating a speed V2 at the end of the time sequence based on a speed V1 at the start of the time sequence, e.g. as $$V2=a12*V1$$

Figure 12:
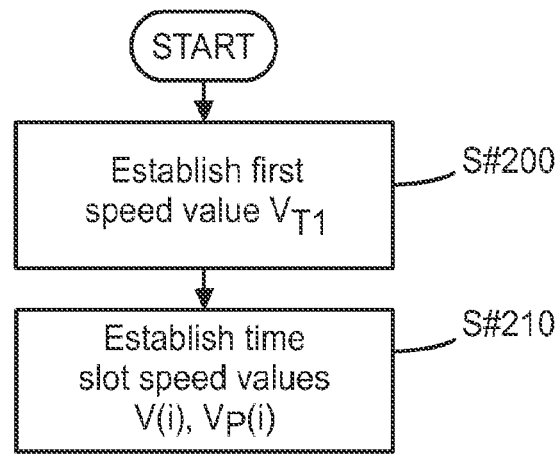
FIG. 12 is a flow chart illustrating an example of a method for performing step S#40 of FIG. 9.

FIG. 12 is a flow chart illustrating an example of a method for performing step S #40 of FIG. 9. According to an example, the acceleration is assumed to have a constant value for the duration between two mutually adjacent position indicators P (See column #02 in FIG. 8). Hence, when
the position indicator P is delivered once per revolution, and
the gear ratio is 1/1: then
the angular distance travelled between two mutually adjacent position indicators P is 1 revolution, which may also be expressed as 360 degrees, and
the duration is T=n*dt,
where n is the number of slots of duration dt between the first two mutually adjacent position indicators P1 and P2.

In a step S #200, the first speed of revolution value VT1 may be calculated as $$VT1 = 1/(n_{diff1} * dt),$$

wherein VT1 is the speed expressed as revolutions per second,
ndiff1=the number of time slots between the two successive position signals; and
dt is the duration of a time slot, expressed in seconds. The value of dt may e.g be the inverse of the initial sample frequency fs.

Since the acceleration is assumed to have a constant value for the duration between two mutually adjacent position indicators P, the calculated first speed value VT1 is assigned to the first mid time slot in the middle between the two successive position signals P(i) and P(i+ndiff1).

In a step S #210, a second speed value VT2 may be calculated as $$VT2 = 1/(n_{diff2} * dt),$$

wherein VT2 is the speed expressed as revolutions per second,
ndiff2=the number of time slots between the two successive position signals; and
dt is the duration of a time slot, expressed in seconds. The value of dt may e.g be the inverse of the initial sample frequency fs.

Since the acceleration is assumed to have a constant value for the duration between two mutually adjacent position indicators P, the calculated second speed value VT2 is assigned to the second mid time slot in the middle between the two successive position signals P(i+ndiff1) and P(i+ndiff1+ndiff2).

Thereafter, the speed difference $V_{Delta}$ may calculated as $$V_{Delta} = VT2 - VT1$$

This differential speed $V_{Delta}$ value may be divided by the number of time slots between the second mid time slot and the first mid time slot. The resulting value is indicative of a speed difference dV between adjacent slots. This, of course, assumes a constant acceleration, as mentioned above.

The momentary speed value to be associated with selected time slots may then be calculated in dependence on said first speed of revolution value VT1, and the value indicative of the speed difference between adjacent slots.

When the measurement sample values S(i), associated with time slots between the first mid time slot and the second mid time slot, have been associated with a momentary speed value, as described above, an array of data including a time sequence of measurement sample values S(i), each value being associated with a speed value V(i) is delivered on an output of said status parameter extractor 450. The momentary speed value V(i) may also be referred to as $f_{ROT}(i)$.

In summary, according to some examples, a first momentary speed value VT1 may be established in dependence of
the angular distance delta-$FI_{p1\text{-}p2}$ between a first positional signal P1 and a second positional signal P2, and in dependence of
the corresponding duration delta-$T_{p1\text{-}p2} = t_{P2} - t_{P1}$.

Thereafter, a second momentary speed value VT2 may be established in dependence of
the angular distance delta-$FI_{p2\text{-}p3}$ between the second positional signal P2 and a third positional signal P3, and in dependence of
the corresponding duration delta-$T_{p2\text{-}p3} = t_{P2} - t_{P1}$.

Thereafter, momentary speed values for the rotational shell 20 may be established by interpolation between the first momentary speed value VT1 and the second momentary speed value VT2.

In other words, according to examples, two momentary speed values VT1 and VT2 may be established based on the angular distances delta-$FI_{p1\text{-}p2}$, delta-$FI_{p2\text{-}p3}$ and the corresponding durations between three consecutive position signals, and thereafter momentary speed values for the rotational shell 20 may be established by interpolation between the first momentary speed value VT1 and the second momentary speed value VT2.

Figure 13:
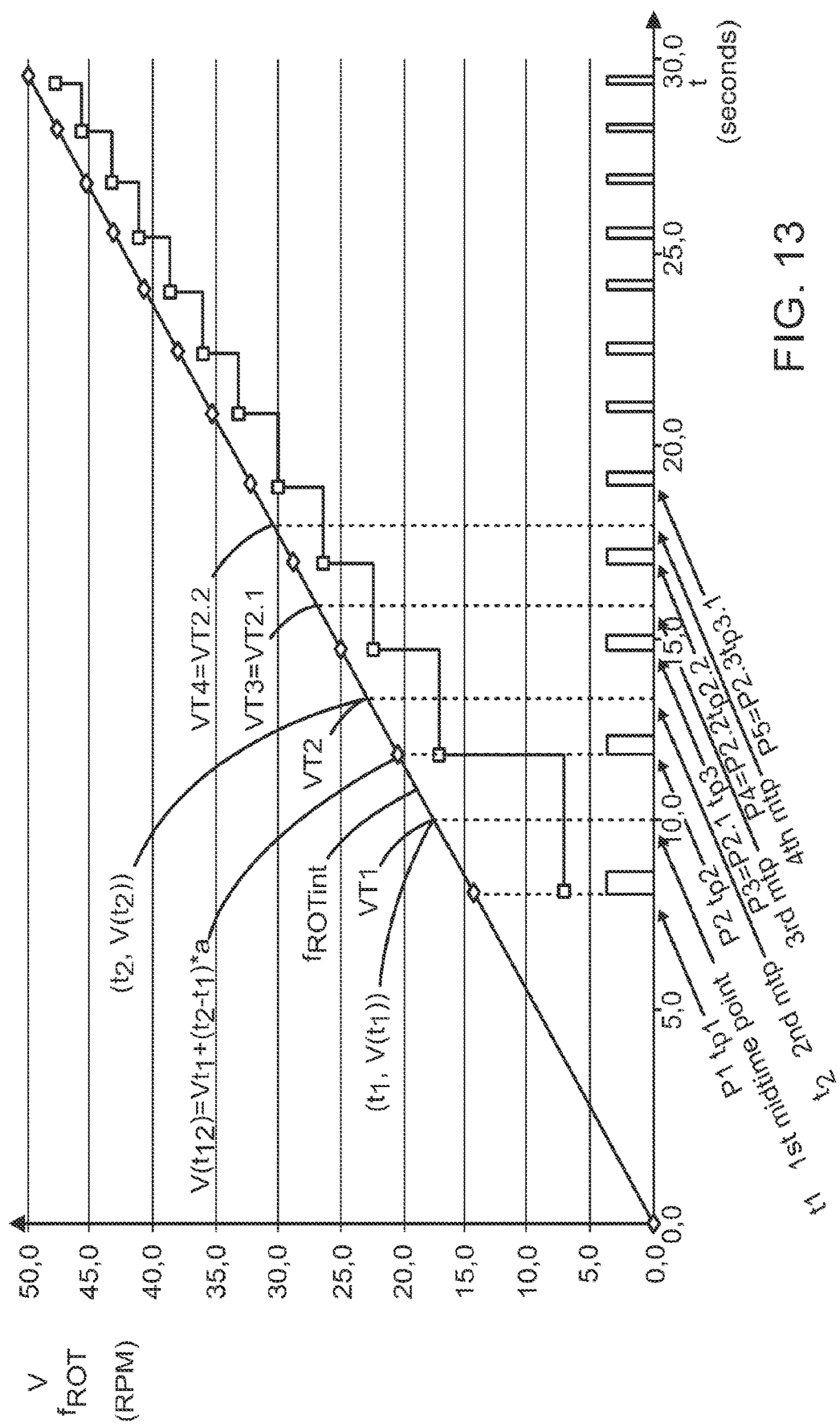
FIG. 13 is a graph illustrating a series of temporally consecutive position signals.

FIG. 13 is a graph illustrating a series of temporally consecutive position signals P1, P2, P3, . . . , each position signal P being indicative of a full revolution of the monitored shell 20. Hence, the time value, counted in seconds, increases along the horizontal axis towards the right.

The vertical axis is indicative of speed of rotation, graded in revolutions per minute (RPM).

With reference to FIG. 13, effects of the method according to an example are illustrated. A first momentary speed value $V(t_1) = VT1$ may be established in dependence of
the angular distance delta-$FI_{p1\text{-}p2}$ between the first positional signal P1 and the second positional signal P2, and in dependence of
the corresponding duration delta-$T_{1\text{-}2} = t_{P2} - t_{P1}$. The speed value attained by dividing the angular distance delta-$FI_{p1\text{-}p2}$ by the corresponding duration $(t_{P2} - t_{P1})$ represents the speed $V(t_1)$ of the rotational shell 20 at the first mid time point $t_1$, also referred to as mtp (mid time point), as illustrated in FIG. 13.

Thereafter, a second momentary speed value $V(t_2) = VT2$ may be established in dependence of
the angular distance delta-FI between the second positional signal P2 and a third positional signal P3, and in dependence of
the corresponding duration delta-$T2\text{-}3 = t_{P3} - t_{P2}$.

The speed value attained by dividing the angular distance delta-FI by the corresponding duration $(t_{P3} - t_{P2})$ represents the speed $V(t_2)$ of the rotational shell 20 at the 2:nd mid time point $t_2$(2:nd mtp), as illustrated in FIG. 13.

Thereafter, momentary speed values for time values between the first first mid time point and the 2:nd mid time point may be established by interpolation between the first momentary speed value VT1 and the second momentary speed value VT2, as illustrated by the curve $f_{ROTint}$.

Mathematically, this may be expressed by the following equation:

$$V(t12) = V(t1) + a * (t12 - t1)$$

Hence, if the speed of the shell 20 can be detected at two points of time (t1 and t2), and the acceleration a is constant, then the momentary speed at any point of time can be calculated. In particular, the speed V(t12) of the shell at time t12, being a point in time after $t_1$ and before $t_2$, can be calculated by $$V(t12) = V(t_1) + a * (t12 - t_1)$$

wherein a is the acceleration, and $t_1$ is the first mid time point $t_1$ (See FIG. 13).

The establishing of a speed value as described above, as well as the compensatory decimation as described with reference to FIGS. 20, 21, and 22, may be attained by performing the corresponding method steps, and this may be achieved by means of a computer program 94 stored in memory 60, as described above. The computer program may be executed by a DSP 50. Alternatively the computer program may be executed by a Field Programmable Gate Array circuit (FPGA).

The establishing of a speed value $f_{ROT}(i)$ as described above may be performed by the analysis apparatus 150 when a processor 350 executes the corresponding program code 380, 394, 410 as discussed in conjunction with FIG. 4 above. The data processor 350 may include a central processing unit 350 for controlling the operation of the analysis apparatus 14. Alternatively, the processor 50 may include a Digital Signal Processor (DSP) 350. According to another example the processor 350 includes a Field programmable Gate Array circuit (FPGA). The operation of the Field programmable Gate Array circuit (FPGA), may be controlled by a central processing unit 350 which may include a Digital Signal Processor (DSP) 350.

Identification of Data Relating to the Toe of the Charge in a Tumbling Mill

As mentioned above, the tumbling mill shell 20 has an internal shell surface 22 facing the chamber 25, the internal shell surface 22 including a number of protrusions 310, also referred to as lifters, that may be configured to engage and lift material 30 as the shell rotates about the axis 60 (See e.g. FIG. 2). The number of protrusions 310 provided on the internal shell surface 22 facing the chamber 25 is herein termed with the variable L. Whereas FIG. 2 illustrates a case when there are twelve protrusions 310, i.e. L=12, the number L of protrusions 310 may be higher or lower. According to some embodiments the number L of protrusions 310 may be at least one, i.e. the number L of protrusions 310 may be L=1. According to some embodiments the number L of protrusions 310 may be any number higher than L=1. According to some embodiments the number L of protrusions 310 may be anywhere in the range from L=2 to L=60. According to some embodiments the number L of protrusions 310 may be anywhere in the range from L=2 to L=35.

The number L of protrusions 310 is an important factor in relation to analysis of the vibrations resulting from rotation of the mill shell 20. The inventor realized that the interaction of a protrusion 310 with the toe of the charge, forcing the material of the charge to accelerate in the direction of movement of the protrusion 310 causes a mechanical vibration $V_{IMP}$. The inventor also realized that this mechanical vibration $V_{IMP}$, caused by the interaction of protrusions 310 with the toe of the charge, will be repetitive, i.e. there will be a repetition frequency $f_R$. With reference to FIG. 2, it is noted that it illustrates the rotating mill shell 20 at the moment in time when a protrusion 310C impacts the toe 205 of the charge material 30. The impact of the protrusion 310C against the mass of material in the toe portion 205 causes a mass of toe portion material to accelerate in the direction $A_{ACC}$ of movement of the protrusion 310C, this acceleration causing a force $F_{IMP}$ against the leading edge surface of the protrusion 310C. Incidentally, this impact force $F_{IMP}$ may be estimated to be of a magnitude:

$$F_{IMP}=m_{205}*a_{205}$$

wherein $m_{205}$ is the mass of the portion of the toe that is accelerated, $a_{205}$ is the amount of acceleration of that portion of the toe Hence, the measurement signal $S_{MD}$ (See e.g. FIG. 5) may include at least one vibration signal signature $S_{FIMP}$ dependent on a vibration movement of the rotationally moving tumbling mill shell 20; wherein said vibration signal signature $S_{FIMP}$ has a repetition frequency $f_R$ which depends on the speed of rotation $f_{ROT}$ of the rotationally moving tumbling mill shell 20.

Moreover, the magnitude of the peak amplitude of the vibration signal signature $S_{FIMP}$ appears to depend on the magnitude of the impact force $F_{IMP}$.

Accordingly, the inventor concluded that a measure of the energy, or of the amplitude, of the vibration signal signature $S_{FIMP}$ appears to be indicative of the magnitude of the impact force $F_{IMP}$.

The existence of a vibration signal signature $S_{FIMP}$ which is dependent on the vibration movement of the rotationally moving mill shell 20 may therefore provide an indication of a toe portion 205 of the charge in of the monitored tumbling mill shell 20. In fact, the vibration signal signature $S_{FIMP}$ which is dependent on the vibration movement of the rotationally moving mill shell 20 may provide an indication of a position of a toe portion 205 of the charge in of the monitored tumbling mill shell 20, the position being indicated in relation to a reference position value.

The inventor concluded that the repetition frequency $f_R$ of the mechanical vibration $V_{IMP}$, caused by the interaction of protrusions 310 with the toe of the charge, depends on the number L of protrusions 310 provided on the internal shell surface 22 and on the speed of rotation $f_{ROT}$ of the shell 20.

When the monitored tumbling mill shell 20 rotates at a constant rotational speed such a repetition frequency $f_R$ may be discussed either in terms of repetition per time unit or in terms of repetition per revolution of the shell being monitored, without distinguishing between the two. However, if the tumbling mill shell 20 rotates at a variable rotational speed the matter is further complicated, as discussed elsewhere in this disclosure, e.g. in connection with FIGS. 20, 21, 22A, 22B, and 22C. In fact, it appears as though even very small variations in rotational speed of the mill shell may have a large adverse effect on detected signal quality in terms of smearing of detected vibration signals. Hence, a very accurate detection of the rotational speed $f_{ROT}$ of the mill shell 20 appears to be of essence.

Moreover, the inventor realized that, not only the amplitude of the mechanical vibration $V_{IMP}$ but also the time of occurrence of the mechanical vibration $V_{IMP}$ may be indicative of data relating a toe portion 205 of the charge in a tumbling mill. Thus, the measurement signal $S_{MD}$ (See e.g. FIG. 5) may include at least one vibration signal amplitude component $S_{FIMP}$ dependent on a vibration movement of the rotationally moving tumbling mill shell 20;

wherein said vibration signal amplitude component $S_{FIMP}$ has a repetition frequency $f_R$ which depends on the speed of rotation $f_{ROT}$ of the rotationally moving tumbling mill shell 20 and that also depends on the number L of protrusions 310 provided on the internal shell surface 22 of the mill shell 20; and wherein there is a temporal relation between the occurrence of the repetitive vibration signal amplitude component $S_{FIMP}$ and the occurrence of a position signal P(i) which has a second repetition frequency $f_P$ dependent on the speed of rotation $f_{ROT}$ of the rotationally moving tumbling mill shell 20.

As regards constant rotational speed, the inventor concluded that if the speed of rotation $f_{ROT}$ is constant, the digital measurement signal $S_{MD}$, comprising a temporal sequence of vibration sample values S(i), has a repetition frequency $f_R$, that depends on the number L of protrusions 310 provided on the internal shell surface 22.

The status parameter extractor 450 may optionally include a Fast Fourier Transformer (FFT) coupled to receive the digital measurement signal $S_{MD}$, or a signal dependent on the digital measurement signal $S_{MD}$. In connection with the analysis of a tumbling mill, having a rotating shell 20, it may be interesting to analyse signal frequencies that are higher than the rotation frequency $f_{ROT}$ of the rotating shell 20. In this context, the rotation frequency $f_{ROT}$ of the shell 20 may be referred to as "order 1". If a signal of interest occurs at, say ten times per revolution of the shell, that frequency may be referred to as Order 10, i.e. a repetition frequency $f_R$ (measured in Hz) divided by rotational speed $f_{ROT}$ (measured in revolutions per second, rps) equals 10 Hz/rps, i.e. order $Oi=f_R/f_{ROT}=10$ Referring to a maximum order as Y, and the total number of frequency bins in the FFT to be used as Z, the inventor concluded that the following applies according to an example:

$$Oi*Z=X*Y.$$

Conversely, X=Oi*Z/Y, wherein
Y is a maximum order; and
Z is the number of bins in the frequency spectrum produced by the FFT, and
Oi is the number L of protrusions 310 in the monitored tumbling mill shell.

The above variables Y, Z, and Oi, should be set so as to render the variable X a positive integer. In connection with the above example it is noted that the FFT analyzer is configured to receive a reference signal, i.e. a position marker signal value PS, once per revolution of the rotating shell 20. As mentioned in connection with FIG. 2, a position marker device 180 may be provided on an outer wall surface of the shell 20 such that, when the shell 20 rotates around the axis of rotation 60, the position marker 180 passes by the position sensor 170 once per revolution of the shell, thereby causing the position sensor 170 to generate a revolution marker signal value PS.

Incidentally, referring to the above example of FFT analyzer settings, the resulting integer number X may indicate the number of revolutions of the monitored tumbling mill shell 20 during which the digital signal $S_{MD}$ is analysed. According to an example, the above variables Y, Z, and Oi, may be set by means of the Human Computer Interface, HCI, 210, 210S (See e.g. FIG. 1 and/or FIG. 5 and/or FIG. 15).

As mentioned above, the protrusions 310 may be also be referred to as lifters 310. Consider a case when the digital measurement signal $S_{MD}$ is delivered to an FFT analyzer: In such a case, when the FFT analyzer is set for ten protrusions, i.e. L=10, and Z=160 frequency bins, and the user is interested in analysing frequencies up to order Y=100, then the value for X becomes X=Oi*Z/Y=10*160/100=16. Hence, it is necessary to measure during sixteen shell revolutions (X=16) when Z=160 frequency bins is desired, the number of protrusions is L=10; and the user is interested in analysing frequencies up to order Y=100. In connection with settings for an FFT analyzer, the order value Y may indicate a highest frequency to be analyzed in the digital measurement signal $S_{MD}$.

According to some embodiments, the setting of the FFT analyzer should fulfill the following criteria when the FFT analyzer is configured to receive a reference signal, i.e. a position marker signal value PS, once per revolution of the rotating shell 20:

The integer value Oi is set to equal L, i.e. the number of protrusions in the shell 20, and the settable variables Y, and Z are selected such that the mathematical expression Oi*Z/Y becomes a positive integer. Differently expressed: When integer value Oi is set to equal L, then settable variables Y and Z should be set to integer values so as to render the variable X a positive integer, wherein X=Oi*Z/Y According to an example, the number of bins Z is settable by selecting one value Z from a group of values. The group of selectable values for the frequency resolution Z may include

Z=200

Z=400

Z=800

Z=1600

Z=3200

An Example of Constant Speed Phase

As mentioned in connection with step S #30 in FIG. 9, the status parameter extractor 450 may identify a constant speed phase, i.e. a status of constant rotational speed $f_{ROT}$ of the shell 20.

Figure 14:
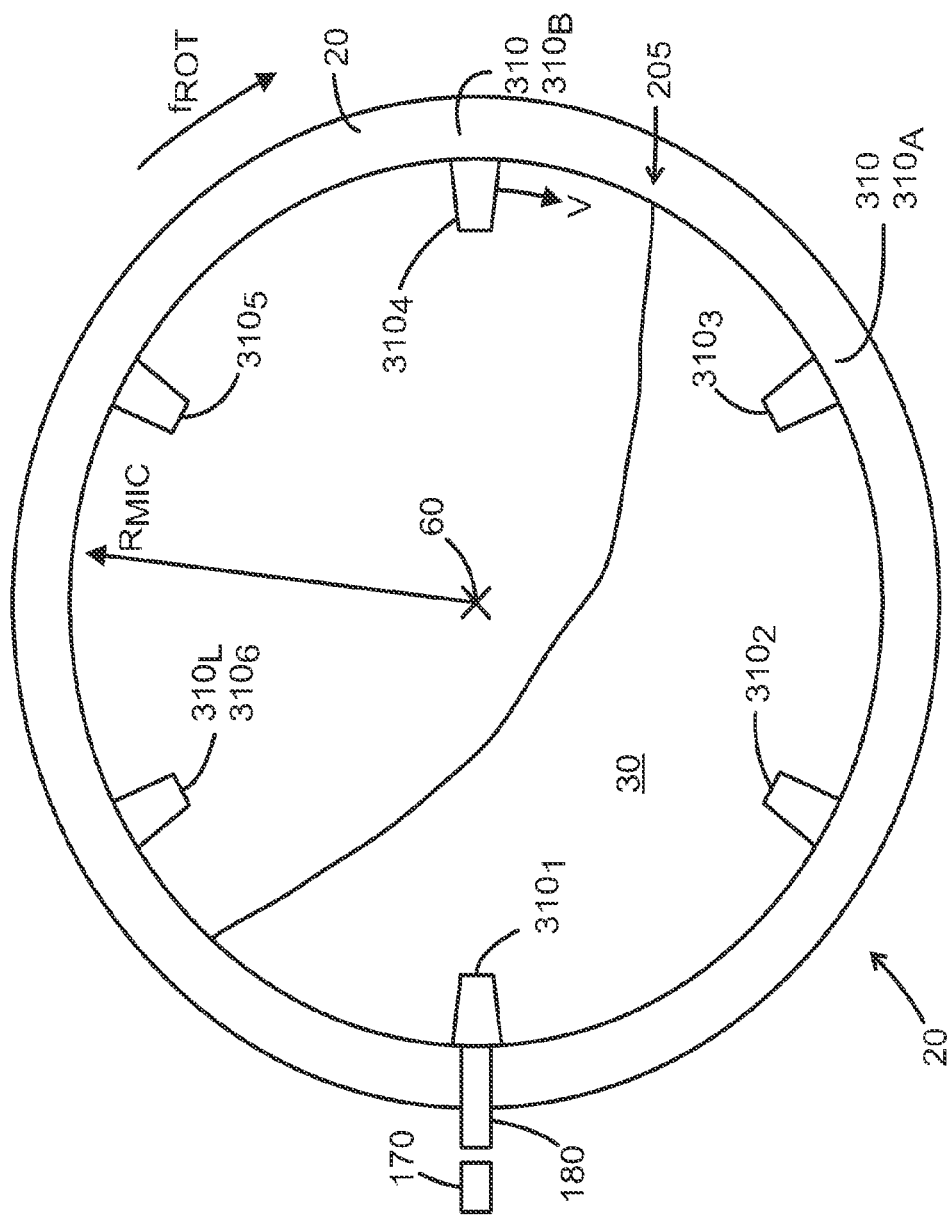
FIG. 14 shows another example of a cross-sectional view of the mid-portion of a rotating mill shell 20 during operation.

FIG. 14 shows another example of a cross-sectional view of the mid-portion 98 of a rotating mill shell 20 during operation. This view could be taken e.g. along line A-A of FIG. 1. According to the example of FIG. 14, the tumbling mill shell 20 has six protrusions 310 configured to engage the charge material 30 as the shell rotates about the axis 60, i.e. the number L=6.

The inner diameter of the shell 20 may be e.g. 600 cm, and the speed of rotation may be constant, at e.g. 13.6 revolutions per minute. For the purpose of this example, the sample frequency is such that there are n=7680 samples per revolution at that. rotational speed $f_{ROT}$ of the shell 20.

When there is one position signal per revolution and the rotational speed $f_{ROT}$ is constant, or substantially constant, there will be a constant, or substantially constant, number of vibration sample values S(i) for every revolution of the mill shell 20. For the purpose of this example, the position signal P(0) is indicative of the vibration sample i=0, as shown in table 2 (See below). For the purpose of an example, the position of the position signal P(0) in relation to the shell 20 may not be important, as long as the repetition frequency $f_P$ is dependent on the speed of rotation $f_{ROT}$ of the rotationally moving tumbling mill shell 20. Hence, if the position signal Ep has one pulse per revolution of the shell 20, the digital position signal will also have one Position signal value P(i)=1 per revolution, the remaining Position signal values being zero.

TABLE 2

| #01 Time slot dt i, j | #02 Position P(i) | #03 S(i) | #04 $f_{ROT}(i)$ |
|---|---|---|---|
| 0 | 1 | S(0) | const |
| 427 | 0 | S(427) | const |
| 853 | 0 | S(853) | const |
| 1280 | 0 | S(1280) | const |
| 1707 | 0 | S(1707) | const |
| 2133 | 0 | S(2133) | const |
| 2560 | 0 | S(2560) | const |
| 2987 | 0 | S(2987) | const |
| 3413 | 0 | S(3413) | const |
| 3840 | 0 | S(3840) | const |
| 4267 | 0 | S(4267) | const |
| 4693 | 0 | S(4693) | const |
| 5120 | 0 | S(5120) | const |
| 5547 | 0 | S(5547) | const |
| 5973 | 0 | S(5973) | const |
| 6400 | 0 | S(6400) | const |
| 6827 | 0 | S(6827) | const |
| 7253 | 0 | S(7253) | const |
| 7680 | 1 | S(7680) | const |

Thus, at a certain constant speed $f_{ROT}$ there may be n time slots per revolution, as indicated by table 2, and n may be a positive integer. In the example of table 2, n=7680.

Having one position signal P per revolution, we know that the position signal will be repetitive every n slots since the rotational speed $f_{ROT}$ is constant. Thus a number of virtual position signals $P_C$ may be generated by calculation. In an example, consider that virtual position signals $P_C$ are generated. The provision of one virtual position signal $P_C$ per protrusion 310 may be used for establishing a temporal relation between the occurrence of the repetitive vibration signal amplitude component $S_{FIMP}$ and the occurrence of a position signal P(i) which has a second repetition frequency $f_P$ dependent on the speed of rotation $f_{ROT}$ of the rotationally moving tumbling mill shell 20.

Having L equidistant protrusions 310 in the mill shell and one position signal P per revolution and a constant speed of rotation $f_{ROT}$ it is possible to generate one virtual position signal $P_C$ per protrusion, so that the total number of position signals P, $P_C$ are evenly distributed. Thus, a position signal P or $P_C$ will occur at every n/L sample value position, as indicated in Table 3, when there are provided n time slots per revolution. In table 3, n=7680, and L=6, and thus there is provided a position signal $P_C$ at every 1280 sample, the calculated position signals being indicated as 1 C.

It may be assumed that the position of the toe portion 205 of the mill is substantially constant during a single revolution of the mill shell 20. Since the vibration signal amplitude component $S_{FIMP}$, $S_P$ is generated by interaction of a protrusion and the toe of the charge, it will be repetitive with the frequency of one vibration signal amplitude component $S_{FIMP}$, $S_P$ per protrusion 310. Thus, it can be assumed that the temporal relation between the occurrence of the repetitive vibration signal amplitude component $S_{FIMP}$, $S_P$ and the occurrence of a position signal P, PC will be substantially constant for each of the L data blocks, L being L=6 in this example.

TABLE 3

Table 3 illustrates the principle of a temporal progression of position signal values P(i) with calculated Positions signal values P(i) being indicated as "1C".

| #00 | #01 Time slot dt i (*1000) | #02 Position P(i) | #03 S(i) | #04 $f_{ROT}(i)$ |
|---|---|---|---|---|
| | 0 | 1 | S(0) | const |
| Block I | 427 | 0 | S(427) | const |
| Block I | 853 | 0 | S(853) | const |
| Block I | 1280 | 1C | S(1280) | const |
| Block II | 1707 | 0 | S(1707) | const |
| Block II | 2133 | 0 | S(2133) | const |
| Block II | 2560 | 1C | S(2560) | const |
| Block III | 2987 | 0 | S(2987) | const |
| Block III | 3413 | 0 | S(3413) | const |
| Block III | 3840 | 1C | S(3840) | const |
| Block IV | 4267 | 0 | S(4267) | const |
| Block IV | 4693 | 0 | S(4693) | const |
| Block IV | 5120 | 1C | S(5120) | const |
| Block V | 5547 | 0 | S(5547) | const |
| Block V | 5973 | 0 | S(5973) | const |
| Block V | 6400 | 1C | S(6400) | const |
| Block VI | 6827 | 0 | S(6827) | const |
| Block VI | 7253 | 0 | S(7253) | const |
| Block VI | 7680 | 1 | S(7680) | const |

TABLE 4

| #00 | #01 Time slot dt i, j | #02 Position P(i) | #03 S(i) | #04 $f_{ROT}(i)$ |
|---|---|---|---|---|
| | 0 | 1 | S(0) | const |
| Block I | 40 | 0 | S(40) | const |
| Block I | 80 | 0 | S(80) | const |
| Block I | 120 | 0 | S(120) | const |
| Block I | 160 | 0 | S(160) | const |
| Block I | 200 | 0 | S(200) | const |
| Block I | 240 | 0 | S(240) | const |
| Block I | 280 | 0 | S(280) | const |
| Block I | 320 | 0 | S(320) | const |
| Block I | 360 | 0 | S(360) | const |
| Block I | 400 | 0 | S(400) | const |
| Block I | 440 | 0 | S(440) | const |
| Block I | 480 | 0 | S(480) | const |
| Block I | 520 | 0 | S(520) | const |
| Block I | 560 | 0 | S(560) | const |
| Block I | 600 | 0 | S(600) | const |
| Block I | 640 | 0 | S(640) | const |
| Block I | 680 | 0 | S(680) | const |
| Block I | 720 | 0 | S(720) | const |
| Block I | 760 | 0 | S(760) | const |
| Block I | 800 | 0 | S(800) | const |
| Block I | 840 | 0 | S(840) | const |
| Block I | 880 | 0 | S(880) | const |
| Block I | 920 | 0 | S(920) | const |
| Block I | 960 | 0 | S(960) | const |
| Block I | 1000 | 0 | S(1000) | const |
| Block I | 1040 | 0 | S(1040) | const |
| Block I | 1080 | 0 | S(1080) | const |
| Block I | 1120 | 0 | S(1120) | const |
| Block I | 1160 | 0 | S(1160) | const |
| Block I | 1200 | 0 | S(1200) | const |
| Block I | 1240 | 0 | S(1240) | const |
| Block I | 1280 | 1C | S(1280) | const |

TABLE 5

| #00 | #01 Time slot dt i, j | #02 Position % | #03 S(i) | #04 $f_{ROT}(i)$ |
|---|---|---|---|---|
|  | 0 = $N_0$ | 0% |  | const |
| Block I | 40 | 3% |  | const |
| Block I | 80 | 6% |  | const |
| Block I | 120 | 9% |  | const |
| Block I | 160 | 13% |  | const |
| Block I | 200 | 16% |  | const |
| Block I | 240 | 19% |  | const |
| Block I | 280 | 22% |  | const |
| Block I | 320 | 25% |  | const |
| Block I | 360 | 28% |  | const |
| Block I | 400 | 31% |  | const |
| Block I | 440 | 34% |  | const |
| Block I | 480 | 38% |  | const |
| Block I | 520 | 41% |  | const |
| Block I | 560 | 44% |  | const |
| Block I | 600 | 47% |  | const |
| Block I | 640 | 50% |  | const |
| Block I | 680 | 53% |  | const |
| Block I | 720 | 56% |  | const |
| Block I | 760 = $N_P$ | 59% | S(760) = Sp | const |
| Block I | 800 | 63% |  | const |
| Block I | 840 | 66% |  | const |
| Block I | 880 | 69% |  | const |
| Block I | 920 | 72% |  | const |
| Block I | 960 | 75% |  | const |
| Block I | 1000 | 78% |  | const |
| Block I | 1040 | 81% |  | const |
| Block I | 1080 | 84% |  | const |
| Block I | 1120 | 88% |  | const |
| Block I | 1160 | 91% |  | const |
| Block I | 1200 | 94% |  | const |
| Block I | 1240 | 97% |  | const |
| Block I | 1280 = $N_B$ | 100% |  | const |

Table 4 is an illustration of the first block, i.e. Block I, having n/L=7680/6=1280 consecutive time slots. It is to be understood that if there is a constant speed phase (See FIG. 9) for the duration of a complete revolution of the shell 20, then each of the blocks I to VI (See table 3) will have the same appearance as Block I being illustrated in table 4.

According to embodiments of this disclosure, with reference to column #03 in table 4, the vibration sample values S(i) are analyzed for detection of a vibration signal signature $S_{FIMP}$. The vibration signal signature $S_{FIMP}$ may be manifested as a peak amplitude sample value Sp. According to an example, with reference to column #03 in table 4, the vibration sample values S(i) are analyzed by a peak value detector for detection of a peak sample value Sp. With reference to table 5, the peak value analysis leads to the detection of a highest vibration sample amplitude value S(i). In the illustrated example, the vibration sample amplitude value S(i=760) is detected to hold a highest peak value Sp.

Having detected the peak value Sp to be located in time slot 760, a temporal relation between the occurrence of the repetitive vibration signal amplitude component Sp and the occurrence of a position signal P(i) can be established. In table 5 the time slots carrying position signals P(i) are indicated as 0% and 100%, respectively, and all the slots in between may be labelled with their respective locations, as illustrated in column #02 in table 5. As illustrated in the example in col. #02 of table 5, the temporal location of slot number i=760 is at a position 59% of the temporal distance between slot i=0 and slot i=1280. Differently expressed, 760/1280=0.59=59%

Consequently, the inventor concluded that the temporal relation between the occurrence of the repetitive vibration signal amplitude component $S_{FIMP}$ and the occurrence of a position signal P(i) may be used as an indication of the relative physical position of the toe portion 205 of the charge between two consequtive protrusions 310 in the rotating shell 20.

Accordingly, a position of the toe 205, expressed as a percentage of the distance between two adjacent leading egdes (see 312C and 312D in FIG. 2 in conjunction with table 5), can be obtained by:

Counting a total number of samples ($N_B$-$N_0$=$N_B$-0=$N_B$=1280) from the first reference signal occurrence in sample number $N_0$=0 to the second reference signal occurrence in sample number $N_B$=1280, and Counting another number of samples ($N_P$-$N_0$=$N_P$-0=$N_P$) from the first reference signal occurrence at $N_0$=0 to the occurrence of the peak amplitude value Sp at sample number $N_P$, and generating said first temporal relation ($R_T(r)$; $T_D$; FI(r)) based on said another number $N_P$ and said total number $N_B$. This can be summarized as:

$$R_T(r)=R_T(760)=(N_P-N_0)/(N_B-N_0)=(760-0)/(1280-0)$$
$$=0.59=59\%$$

Thus, a relative toe position may be generated by:

Counting a total number of samples ($N_B$) from the first reference signal occurrence to the second reference signal occurrence, and Counting another number of samples ($N_P$) from the first reference signal occurrence to the occurrence of the peak amplitude value Sp at sample number $N_P$, and generating said first temporal relation ($R_T(r)$; $T_D$; FI(r)) based on a relation between said sample number $N_P$ and said total number of samples i.e. $N_B$.

With reference to FIG. 14, it is noted that, at the point in time illustrated, the position marker 180 is depicted just as it passes by the position by the position sensor 170. Thus, the point in time illustrated may be the point in time indicated by time slot 1280, i.e. when the position signal P(i=1280) is generated. Since the shell rotates in a clockwise direction, the most recent peak sample value Sp was generated by the impact of protrusion 310A with the toe portion 205 (See FIG. 14 in conjunction with table 5). Thus, the vibration sample amplitude value S(i=760), detected to hold a highest peak value Sp, occurred at a time $T_{SP}$=dt*(1280-760) before the occurrence of the position signal P(i=1280).

Since S=v*t, wherein S=distance, v=a constant speed, and t is time, the temporal relation can be directly translated into a distance. Consequently, col. #02 of table 5, can be regarded as indicating the physical location of the toe portion 205 at a position 59% of the distance between protrusion 310A and protrusion 310B (see FIG. 14 in conjunction with col. #02 of table 5).

According to another example, with reference to table 6, the temporal relation between the occurrence of the repetitive vibration signal amplitude component Sp and the occurrence of a position signal P(i) can be regarded as a phase deviation, expressed in degrees.

TABLE 6

| #00 | #01 Time slot dt i | #02 phase FI degrees | #03 S(i) | #04 $f_{ROT}(i)$ |
|---|---|---|---|---|
|  | 0 | 0 |  | const |
| Block I | 40 | 11, 25 |  | const |
| Block I | 80 | 22, 5 |  | const |
| Block I | 120 | 33, 75 |  | const |
| Block I | 160 | 45 |  | const |
| Block I | 200 | 56, 25 |  | const |
| Block I | 240 | 67, 5 |  | const |
| Block I | 280 | 78, 75 |  | const |
| Block I | 320 | 90 |  | const |
| Block I | 360 | 101, 25 |  | const |
| Block I | 400 | 112, 5 |  | const |
| Block I | 440 | 123, 75 |  | const |
| Block I | 480 | 135 |  | const |
| Block I | 520 | 146, 25 |  | const |
| Block I | 560 | 157, 5 |  | const |
| Block I | 600 | 168, 75 |  | const |
| Block I | 640 | 180 |  | const |
| Block I | 680 | 191, 25 |  | const |
| Block I | 720 | 202, 5 |  | const |
| Block I | 760 | 213, 75 | S(760) = Sp | const |
| Block I | 800 | 225 |  | const |
| Block I | 840 | 236, 25 |  | const |
| Block I | 880 | 247, 5 |  | const |
| Block I | 920 | 258, 75 |  | const |
| Block I | 960 | 270 |  | const |
| Block I | 1000 | 281, 25 |  | const |
| Block I | 1040 | 292, 5 |  | const |
| Block I | 1080 | 303, 75 |  | const |
| Block I | 1120 | 315 |  | const |
| Block I | 1160 | 326, 25 |  | const |
| Block I | 1200 | 337, 5 |  | const |
| Block I | 1240 | 348, 75 |  | const |
| Block I | 1280 | 360 |  | const |

Figure 15:
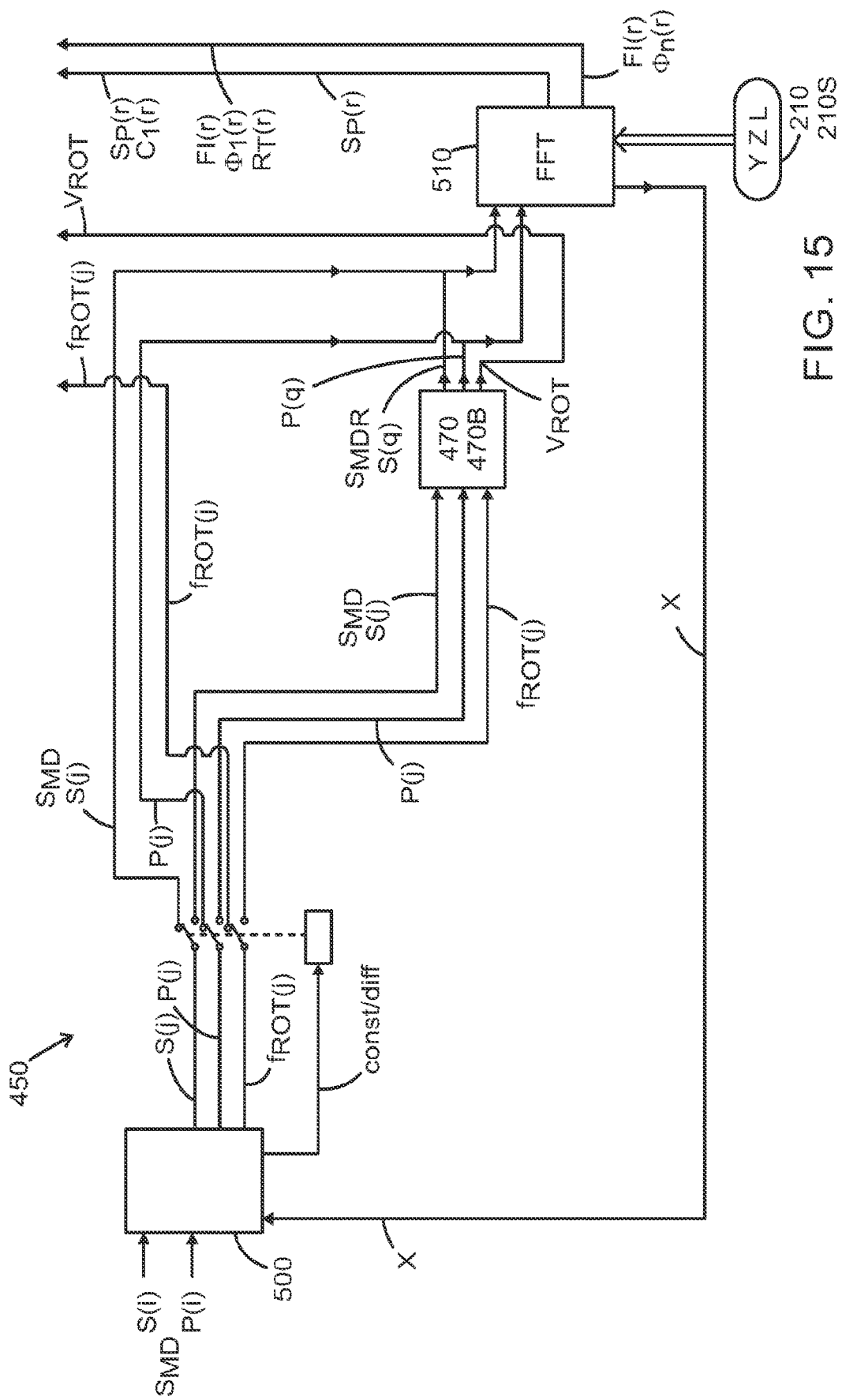
FIG. 15 is a block diagram illustrating an example of a status parameter extractor.
Figure 16:
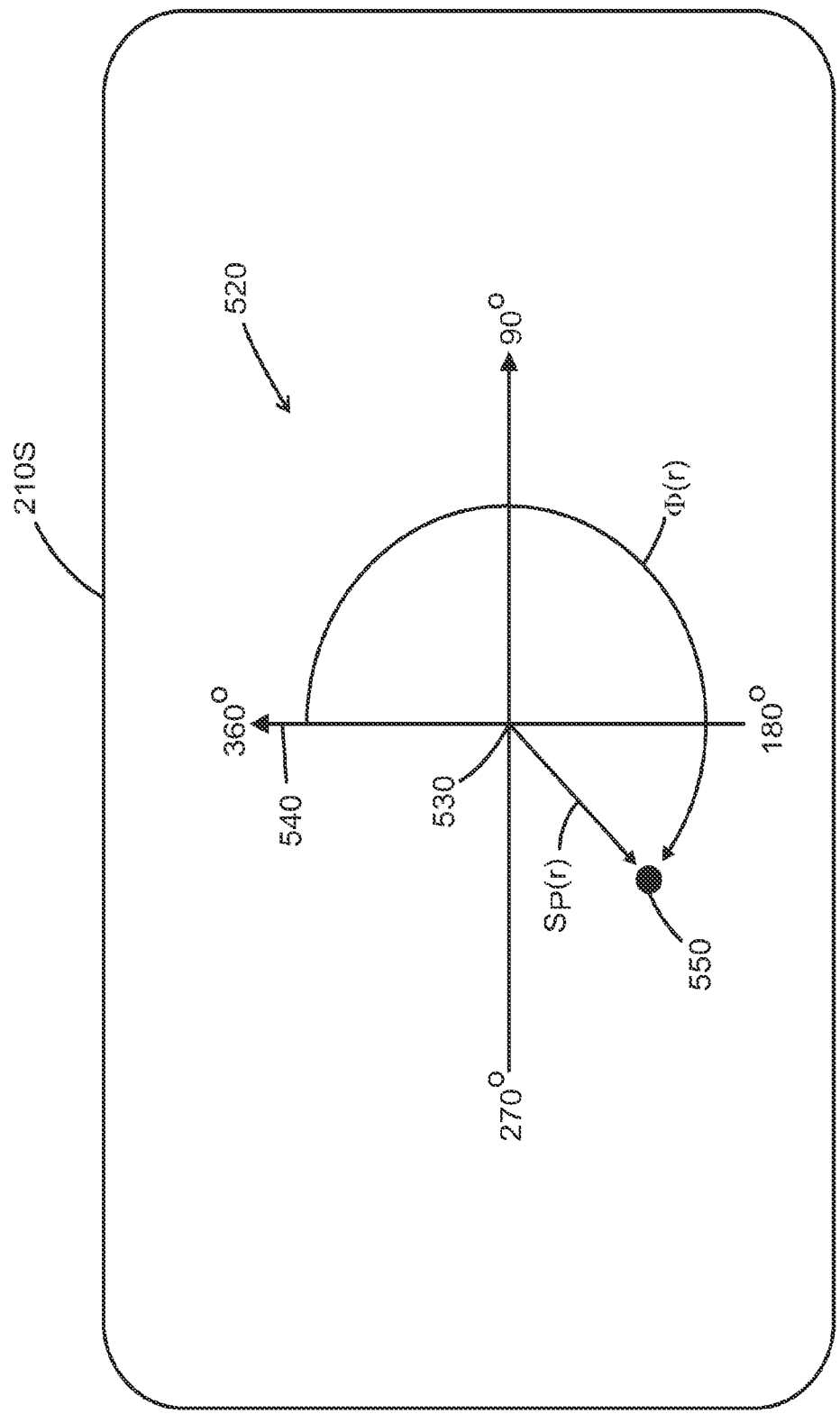
FIG. 16 is an illustration of an example of a visual indication of an analysis result.

In fact, by using the position signal as a reference signal for the digital measurement signal $S_{MD}$, S(i), S(j), and adjusting the settings of a Fast Fourier Transformer in a certain manner, the Fast Fourier Transformer may be used for extracting the amplitude top value as well as the phase value, as discussed below. Consequently, col. #02 of table 6, can be regarded as indicating the physical location of the toe portion 205 at a position 213.75 degrees of the distance between protrusion 310A and protrusion 310B when the total distance between protrusion 310A and protrusion 310B is regarded as 360 degrees (see FIG. 14 in conjunction with col. #02 of table 6). The physical location of the toe portion 205, when expressed as a part of the distance between two adjacent protrusions 310, may be referred to as a relative position of the toe 205. In other words, this disclosure provides a manner of identifying a relative toe position, for the toe 205 of a charge in a tumbling mill. Hence, this disclosure provides a manner of generating information indicative of the location of the toe portion 205, when expressed as a part of the distance between two adjacent protrusions 310 in a rotating shell 20. With reference to FIG. 15 and FIG. 16 the relative toe position may be presented as a phase angle FI(r), as discussed in connection with FIGS. 15 and 16 below. According to embodiments of this disclosure, the relative toe position can be presented as a percentage (see col. #02 of table 5 above). Moreover, according to embodiments of this disclosure, the relative toe position can be presented as a temporal duration, or as a part of a temporal duration. As discussed above, in connection with table 5, since S=v*t, wherein S=distance, v=the speed of a protrusion, and t is time, the temporal relation can be directly translated into a distance. In this context it is noted that the speed v of a protrusion depends on the angular velocity $f_{ROT}$ of the shell 20 and of the radius $R_{MIC}$ of the shell 20 (See FIG. 14).

FIG. 15 is a block diagram illustrating an example of a status parameter extractor 450. The status parameter extractor 450 of FIG. 15 includes a shell speed detector 500 that receives the digital vibration signal $S_{MD}$, S(i) and the digital position signal (Pi). The shell speed detector 500 may also be referred to as a shell speed value generator 500. The shell speed detector 500 may generate the three signals S(j), P(j) and $f_{ROT}$(j) on the basis of the received digital vibration signal $S_{MD}$, S(i) and the digital position signal (Pi). This may be achieved e.g. in the manner described above in relation to FIGS. 7 to 13. In this connection it is noted that the three signals S(j), P(j) and $f_{ROT}$(j) may be delivered simultaneously, i.e. they all relate to the same time slot j. In other words, the the three signals S(j), P(j) and $f_{ROT}$(j) may be provided in a synchronized manner. The provision of signals, such as S(j), P(j) and $f_{ROT}$(j), in a synchronized manner advantageously provides accurate information about about temporal relations between signal values of the individual signals. Thus, for example, a speed value $f_{ROT}$(j) delivered by the shell speed value generator 500 is indicative of a momentary rotational speed of the shell 20 at the time of detection of the amplitude value S(j).

It is noted that the signals S(j) and P(j), delivered by the shell speed value generator 500, are delayed in relation to the signals S(i) and (Pi) received by the shell speed value generator 500. It is also noted that the signals S(j) and P(j) are equally delayed in relation to the signals S(i) and (Pi), thus the temporal relation between the two has been maintained. In other words, the signals S(j) and P(j) are synchronously delayed.

The shell speed detector 500 may deliver a signal indicative of whether the speed of rotation has been constant for a sufficiently long time, in which case the signals S(j) and P(j) may be delivered to a Fast Fourier Transformer 510.

The variables Y, Z, and L, should be set so as to render the variable X a positive integer, as discussed above. According to an example, the above variables Y, Z, and L, may be set by means of the Human Computer Interface, HCI, 210, 210S (See e.g. FIG. 1 and/or FIG. 5 and/or FIG. 15). As mentioned above the resulting integer number X may indicate the number of revolutions of the monitored tumbling mill shell 20 during which the digital signals S(j) and P(j) are analysed by the FFT 510. Thus, based on the settings of the variables Y, Z, and L, the FFT 510 may generate the value X, indicative of the duration of the analysis of a measurement session, and after a measurement session, the FFT 510 delivers a set of status value Sp(r) and FI(r).

The notion "r", in status values Sp(r) and FI(r), indicates a point in time. It is to be noted that there may be a delay in time from the reception of a first pair of input signals S(j), P(j) at the inputs of the FFT 510 until the delivery of a pair of status values Sp(r) and FI(r) from the FFT 510. A pair of status values Sp(r) and FI(r) may be based on a temporal sequence of pairs of input signals S(j), P(j). The duration of the temporal sequence of pairs of input signals S(j), P(j) should include at least two successive position signal values P(j)=1 and the corresponding input signal pairs.

The status values Sp(r) and FI(r) may also be referred to as $C_L$ and $\Phi_L$, respectively, as explained below. As noted above in relation to FIG. 2, the vibration signal $S_{EA}$, $S_{MD}$, S(j), S(r) will exhibit a signal signature $S_{FIMP}$ indicative of the impact of a protrusion with the toe portion 205, and when there are L protrusions 310 in the shell 20 (See FIG. 1 in conjunction with FIG. 15 and FIG. 14) then that signal signature $S_{FIMP}$ will be repeated L times per revolution of the shell 20.

For the purpose of conveying an intuitive understanding of this signal processing it may be helpful to consider the superposition principle and repetitive signals such as sinus signals. A sinus signal may exhibit an amplitude value and a phase value. In very brief summary, the superposition principle, also known as superposition property, states that, for all linear systems, the net response at a given place and time caused by two or more stimuli is the sum of the responses which would have been caused by each stimulus individually. Acoustic waves are a species of such stimuli.

Also a vibration signal, such as the vibration signal $S_{EA}$, $S_{MD}$, S(j), S(r) including the signal signature $S_{FIMP}$ indicative of the impact of a protrusion with the toe portion 205 is a species of such stimuli. In fact, the vibration signal $S_{EA}$, $S_{MD}$, S(j), S(r) including the signal signature $S_{FIMP}$ may be regarded as a sum of sinus signals, each sinus signal exhibiting an amplitude value and a phase value. In this connection, reference is made to the Fourier series (See Equation 1 below):

$$F(t)=\Sigma_{n=0}^{n=\infty} C_n \sin(n\omega t+\Phi_n) \quad \text{(Eq. 1)}$$

wherein
n=0 the average value of the signal during a period of time (it may be zero, but need not be zero)
n=1 corresponds to the fundamental frequency of the signal F(t).
n=2 corresponds to the first harmonic partial of the signal F(t).
ω=the angular frequency i.e. ($2*T*f_{ROT}$)
$f_{ROT}$=the shell speed of rotation expressed as periods per second
t=time
$\Phi_n$=phase angle for the n:th partial
$C_n$=Amplitude for the n:th partial It follows from the above Fourier series that a time signal may be regarded as composed of a superposition of a number of sinus signals.

An overtone is any frequency greater than the fundamental frequency of a signal. In the above example, it is noted that the fundamental frequency will be $f_{ROT}$, i.e. the shell speed of rotation, since the FFT 510 receives a marker signal value P(j)=1 only one time per revolution of the shell 20 (See e.g FIG. 14).

Using the model of Fourier analysis, the fundamental and the overtones together are called partials. Harmonics, or more precisely, harmonic partials, are partials whose frequencies are numerical integer multiples of the fundamental (including the fundamental, which is 1 times itself).

With reference to FIG. 15 and equation 1 above, the FFT 510 may deliver the amplitude value $C_n(r)$ for n=L, i.e. $C_L(r)$=Sp(r). The FFT 510 may also deliver phase angle for the partial (n=L), i.e. ΦL(r)=FI(r).

Now consider an example when a mill shell rotates at a speed of 10 revolutions per minute (rpm), the shell having ten (10) protrusions 310. A speed of 10 rpm renders one revolution every 6 seconds, i.e. $f_{ROT}$=0.1667 rev/sec. The shell having ten protrusions (i.e. L=10) and running at a speed of $f_{ROT}$=0.1667 rev/see renders a repetition frequency $f_R$ of 1,667 Hz for the signal relating to the protrusions 310, since the repetition frequency $f_R$ is the frequency of order 10.

The position signal P(j), P(q) (see FIG. 15) may be used as a reference signal for the digital measurement signal S(j),S(r). According to some embodiments, when the FFT analyzer is configured to receive a reference signal, i.e. the position signal P(j), P(q), once per revolution of the rotating shell 20, the setting of the FFT analyzer should fulfill the following criteria:

The integer value Oi is set to equal L, i.e. the number of protrusions in the shell 20, and
the settable variables Y, and Z are selected such that the mathematical expression Oi*Z/Y becomes a positive integer. Differently expressed: When integer value Oi is set to equal L, then settable variables Y and Z should be set to integer values so as to render the variable X a positive integer,
wherein X=Oi*Z/Y
Y is a maximum order; and
Z is the number of bins in the frequency spectrum produced by the FFT, and
Oi is a frequency of interest, expressed as an integer in orders, and wherein
$f_{ROT}$ is the frequency of order 1, i.e. the fundamental frequency. In other words, the speed of rotation $f_{ROT}$ of the shell 20 is the fundamental frequency and L is the number of protrusions in the shell 20

Using the above setting, i.e. integer value Oi is set to equal L, and with reference to FIG. 15 and equation 1 above, the FFT 510 may deliver the amplitude value $C_n$ for n=L, i.e. $C_L$=Sp(r). The FFT 510 may also deliver phase angle for the partial (n=L), i.e. $\Phi_L$=FI(r).

Thus, according to embodiments of this disclosure, when the FFT 510 receives a position reference signal P(j), P(q) once per revolution of the rotating shell 20, then the FFT analyzer can be configured to generate a peak amplitude value $C_L$ for a signal whose repetition frequency $f_R$ is the frequency of order L, wherein L is the number of equidistantly positioned protrusions 310 in the rotating shell 20. With reference to the discussion about equation 1 above in this disclosure, the amplitude of the signal whose repetition frequency $f_R$ is the frequency of order L may be termed $C_n$ for n=L, i.e. $C_L$. Referring to equation 1 and FIG. 15, the amplitude value $C_L$ may be delivered as a peak amplitude value indicated as Sp(r) in FIG. 15.

Again with reference to equation 1, above in this disclosure, the phase angle value $\Phi_L$ for the signal whose repetition frequency $f_R$ is the frequency of order L may be delivered as a temporal indicator value, the temporal indicator value being indicative of a temporal duration $T_{D1}$ between occurrence of an impact force $F_{IMP}$ and occurrence of a rotational reference position of said rotating shell.

Hence, according to embodiments of this disclosure, when the FFT 510 receives a position reference signal P(j), P(q) once per revolution of the rotating shell 20, then the FFT analyzer can be configured to generate a phase angle value $\Phi_L$ for a signal whose repetition frequency $f_R$ is the frequency of order L, wherein L is the number of equidistantly positioned protrusions 310 in the rotating shell 20.

Hence, using the above setting, i.e. integer value Oi being set to equal L, and with reference to FIG. 15 and equation 1 above, the FFT 510 may generate the phase angle value $\Phi_L$.

With reference to FIG. 15 in conjunction with FIG. 1, the status values Sp(r)=$C_L$ and FI(r)=$\Phi_L$ may be delivered to the Human Computer Interface (HCI) 210 for providing a visual indication of the analysis result. As mentioned above, the analysis result displayed may include information indicative of an internal state of the tumbling mill process for enabling the operator 230 to control the tumbling mill.

FIG. 16 is an illustration of an example of a visual indication of an analysis result. According to an example, the visual indication of the analysis result may include the provision of a polar coordinate system 520. A polar coordinate system is a two-dimensional coordinate system in which each point on a plane is determined by a distance from a reference point 530 and an angle from a reference direction 540. The reference point 530 (analogous to the origin of a Cartesian coordinate system) is called the pole 530, and the ray from the pole in the reference direction is the polar axis. The distance from the pole is called the radial coordinate, radial distance or simply radius, and the angle is called the angular coordinate, polar angle, or azimuth. According to an example, the amplitude value Sp(r) is used as the radius, and the temporal relation value FI(r), $\Phi$(r), $T_D$ is used as the angular coordinate.

In this manner an internal status of the monitored tumbling mill may be illustrated by providing an internal status indicator object 550, on the display 210S (FIG. 16 in conjunction with FIG. 1). FIG. 16 in conjunction with FIG. 1 and FIG. 14 may be useful for understanding the following example.

Hence, an example relates to an electronic tumbling mill monitoring system 150, 210S for generating and displaying information relating to a grinding process in a tumbling mill 10 having a shell 20 that rotates around an axis 60 at a speed of rotation $f_{ROT}$ for grinding charge material 30 by tumbling the charge material in the rotating shell. The example monitoring system 150 includes:

a computer implemented method of representing an internal state of said grinding process in said tumbling mill on a screen display 210S, the method comprising:
displaying on said screen display 210S
a polar coordinate system 520, said polar coordinate system 520 having
a reference point (O, 530), and
a reference direction (0°, 360°, 540); and
a first internal status indicator object (550, $S_{P1}$, $T_{D1}$), indicative of said internal state of said grinding process, at a first radius (Sp(r), $S_{P1}$) from said reference point (O) and at a first polar angle (FI(r), $\Phi$(r), $T_D$, $T_{D1}$) in relation to said reference direction (0°,360°, 540),
said first radius (Sp(r), $S_{P1}$) being indicative of an impact force ($F_{IMP}$) generated when a projection (310) on an internal shell surface of the rotating shell interacts with a toe portion 205 of the charge material (30), and
said first polar angle (FI(r), $\Phi$(r), $T_D$, $T_{D1}$) being indicative of a position of the toe portion 205 between two protrusions 310 in the rotating shell 20.

As mentioned above, the status parameter extractor 450 may be configured to generate successive pairs of the status values Sp(r) and FI(r). The status parameter extractor 450 may also generate time derivative values of the status values Sp(r) and FI(r), respectively. This may be done e.g. by subtracting a most recent previous status value Sp(r−1) from the most recent status value Sp(r) divided by the temporal duration between the two values. Similarly a numerical derivative of the internal status value FI may be achieved. Thus, derivative values dSp(r) and dFI(r) may be generated. The derivative values dSp(r) and dFI(r) may be used for indicating movement of the first internal status indicator object (550, $S_{P1}$, $T_{D1}$).

Figure 17:
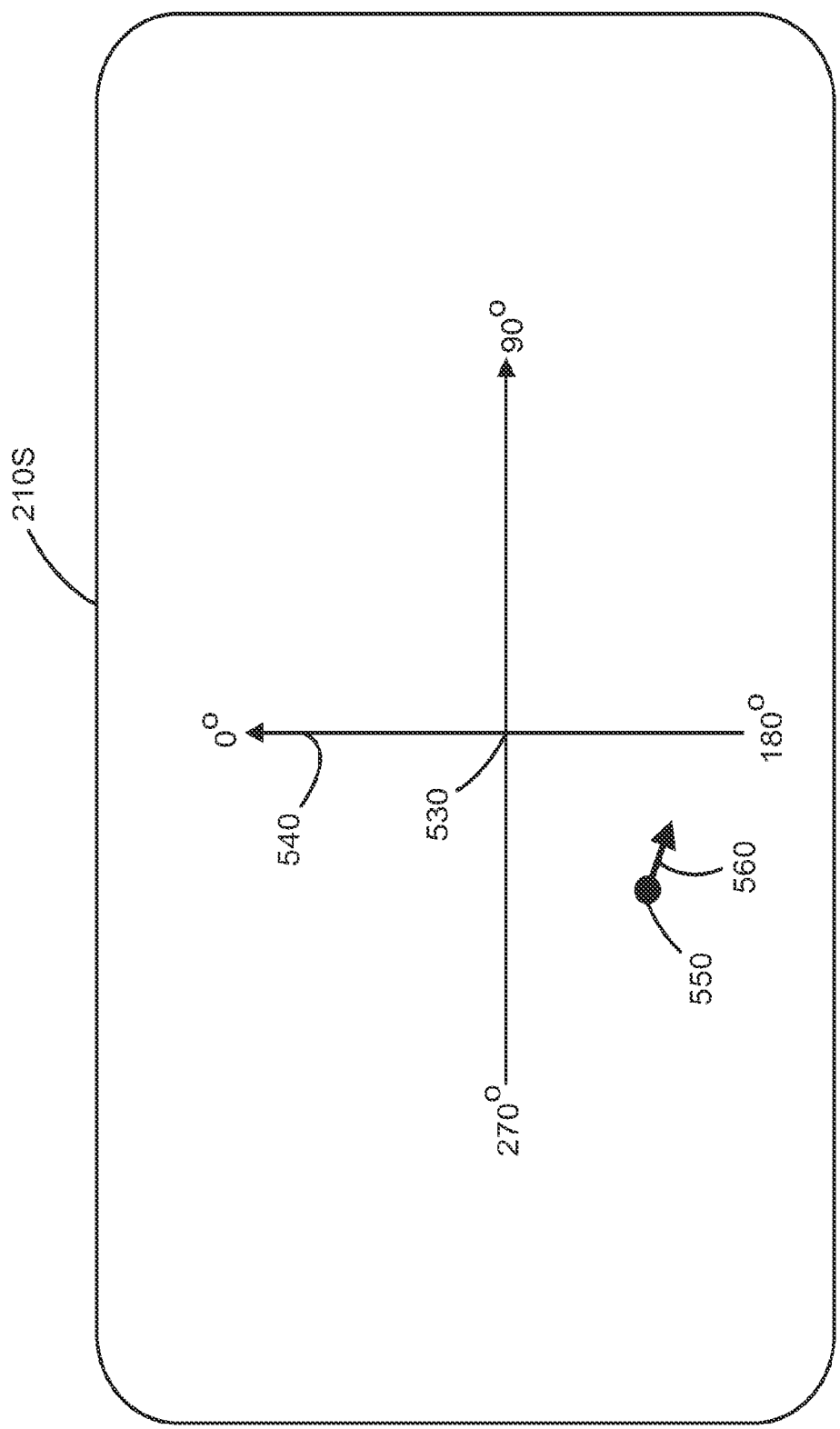
FIG. 17 is an illustration of additional example of a visual indication of an analysis result.

FIGS. 17 and 18 are illustrations of another example of a visual indication of an analysis result. With reference to FIGS. 17 and 18 the above mentioned derivative values may be used for displaying, on said screen display 210S, an arrow 560 originating at the position of the first internal status indicator object (550, $S_{P1}$, $T_{D1}$) and having an extension that depends on the magnitude of the derivative values. In other words, the absence of an arrow 560 means that the internal status is stable, not having changed for the temporal duration. The arrow 560 in FIG. 18 is longer than the arrow 560 in FIG. 17, thereby indicating a faster ongoing change of the internal status of the mill represented in FIG. 18 than that of the mill represented in FIG. 17.

Figure 19A:
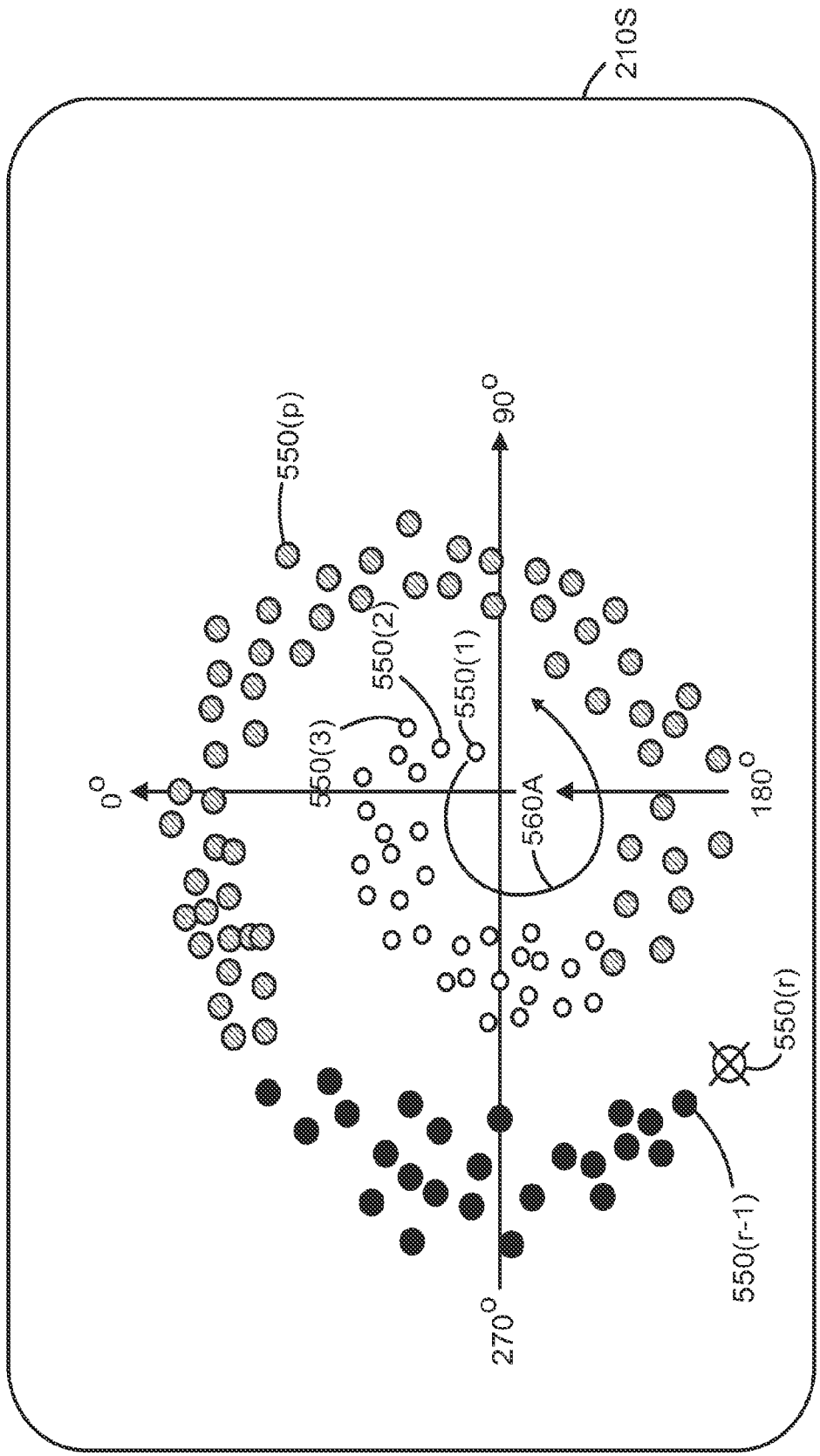
FIGS. 19A and 19B are illustrations of yet another example of a visual indication of an analysis result in terms of internal status of the tumbling mill.
Figure 19B:
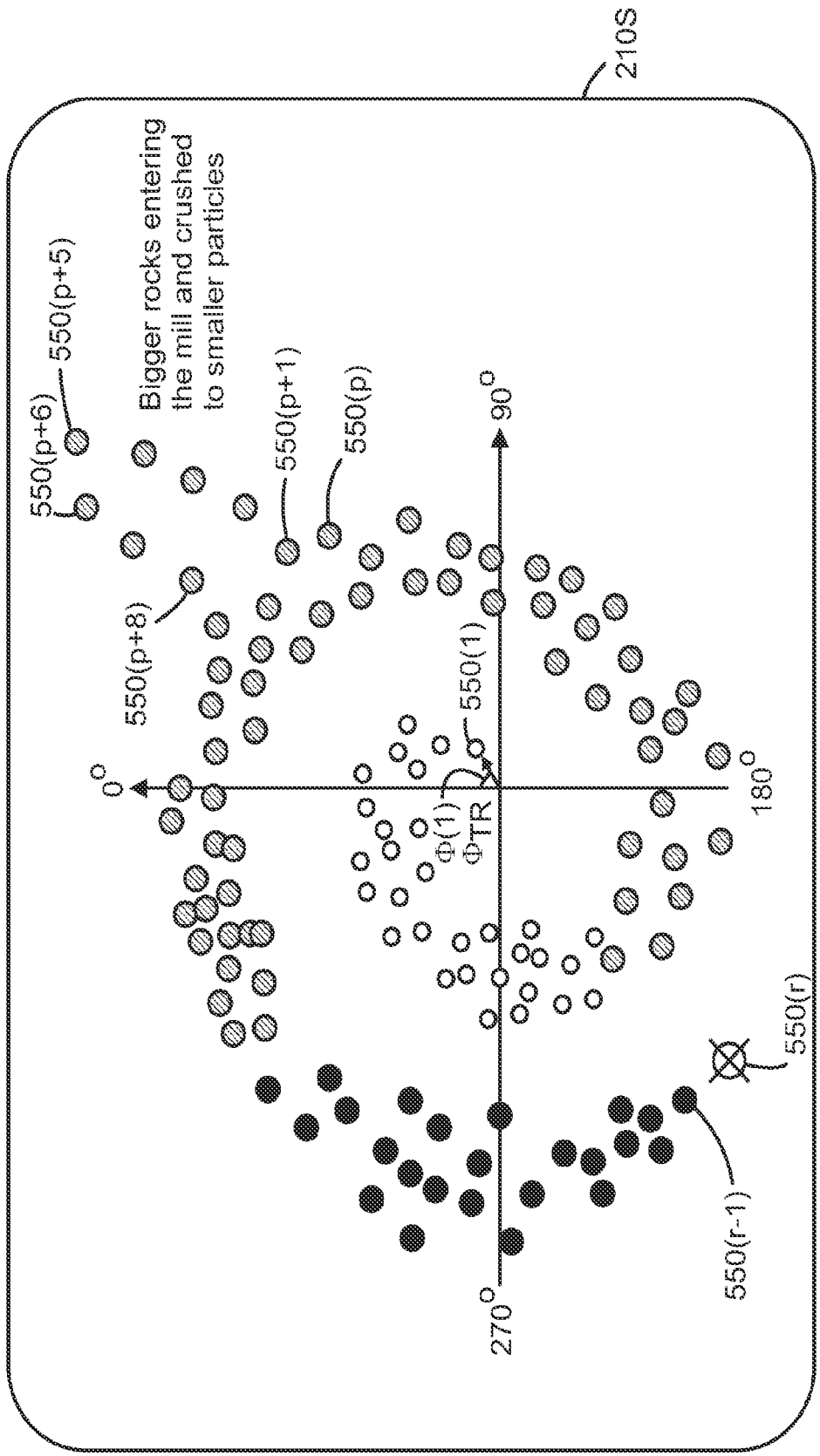

FIGS. 19A and 19B are illustrations of yet another example of a visual indication of an analysis result in terms of internal status of the tumbling mill 10. A most recent internal status indicator object 550(r) indicates a current internal status of the mill 10. Another internal status indicator object 550(r−1) indicates a most recent previous internal status of the mill 10.

An internal status indicator object 550(1), shown as a small empty circle, indicates a internal status of the mill 10 at a nearly empty degree of filling. It is noted that when starting up a tumbling mill from an empty state, the initial internal status indicator object appears at an initial polar angle $\Phi$(1) that represents a very first detected toe position of the mill. In FIGS. 19A and 19B the first thirty-one (31) detected toe positions are indicated as empty circles, starting with the small empty circle 550(1).

Based on experimental measurements, it appears as though the initial polar angle $\Phi$(1) may be used as a reference toe position value. Hence, the initial polar angle $\Phi$(1) may thus be termed reference toe position value @TR. For the particular tumbling mill whose internal state is represented by the display 210S illustrated by FIGS. 19A and 19B, the reference toe position corresponds to an angular value $\Phi_{TR}$ of about 47 degrees, as can be seen in FIGS. 19A and 19B.

Whereas the first thirty-one (31) detected toe positions are indicated as empty circles, a thereafter following sequence of toe positions are indicated as shaded circles, one of the shaded circles being indicated as 550(p) in FIG. 19A. The shaded circles in FIG. 19A represent higher filling degrees of the mill shell 20 than the filling degrees indicated by empty circles. The full, black, circles in FIG. 19A represent higher filling degrees of the mill shell 20 than the filling degrees indicated by shaded circles. Hence, it is noted that an initial, lowest detected, filling degree appears to be represented by a comparatively small radius, i.e. a low peak amplitude value Sp, at an initial polar angle $\Phi$(1).

With reference to FIG. 19A, a gradually increasing detected toe position FI(r), and in a corresponding manner a gradually increasing filling degree of the mill shell 20, renders an image of a spiral arm that whirls outwards in a counter-clockwise direction, as indicated by a curved arrow 560A in FIG. 19A, starting from the first internal status indicator object 550(1).

In this manner, the current internal status of the tumbling mill 20 may be represented and visualized such that it intuitively makes sense to an operator 230 of the mill system 5. It is to be noted that, whereas the display of a single internal status indicator object 550, as shown in FIG. 17, represents a current internal status, or a latest detected internal status of the mill 10, the display of a temporal progression of internal status indicator objects ranging from an initial status 550(1) via intermediate states, such as 550(p) and 550(r−1) to 550(r), as shown in FIG. 19A, represents a current internal status 550(r) as well as a history of several earlier internal states 550(p), 550(p+1), 550(r−1), of the mill 10.

In other words, a gradually increasing polar angle FI(r) in combination with a gradually increasing radius value $S_P(r)$ renders an image of a spiral arm that whirls outwards, as indicated by a curved arrow 560A in FIG. 19A, starting from the first internal status indicator object 550(1). The "angular length" of the spiral arm, from the initial polar angle Φ(1) of the first internal status indicator object 550(1) up to the current, or latest detected, toe position FI(r), appears to be indicative of an absolute toe position 205 (see e.g. FIG. 2 and FIG. 14). In this connection, it is noted that 360 degrees in the polar coordinate system 520 of FIG. 19A corresponds to 100% of the distance between the leading edges of two adjacent protrustions, such as 312C and 312D in FIG. 2.

An Example of Variable Speed Phase Status Parameter Extractor

As mentioned above, the analysis of the measurements data is further complicated if the tumbling mill shell 20 rotates at a variable rotational speed $f_{ROT}$. In fact, it appears as though even very small variations in rotational speed of the mill shell may have a large adverse effect on detected signal quality in terms of smearing. Hence, a very accurate detection of the rotational speed $f_{ROT}$ of the mill shell 20 appears to be of essence, and an accurate compensation for any speed variations appears to also be of essence.

With reference to FIG. 15, the shell speed detector 500 may deliver a signal indicating when the speed of rotation varies, as discussed in connection with FIG. 9. Referring again to FIG. 15, the signals S(j) and P(j) as well as the speed value $f_{ROT}(j)$ may be delivered to a speed variation compensatory decimator 470. The speed variation compensatory decimator 470 may also be referred to as a fractional decimator. The decimator 470 is configured to decimate the digital measurement signal $S_{MD}$ based on the received speed value $f_{ROT}(j)$. According to an example, the decimator 470 is configured to decimate the digital measurement signal $S_{MD}$ by a variable decimation factor D, the variable decimation factor D being adjusted during a measuring session based on the variable speed value $f_{ROT}(j)$. Hence, the compensatory decimator 470 is configured to generate a decimated digital vibration signal $S_{MDR}$ such that the number of sample values per revolution of said rotating shell is kept at a constant value, or at a substantially constant value, when said rotational speed varies. According to some embodiments, the number of sample values per revolution of said rotating shell is considered to be a substantially constant value when the number of sample values per revolution varies less than 5%. According to a preferred embodiment, the number of sample values per revolution of said rotating shell is considered to be a substantially constant value when the number of sample values per revolution varies less than 1%. According to a most preferred embodiment, the number of sample values per revolution of said rotating shell is considered to be a substantially constant value when the number of sample values per revolution varies by less than 0.2%.

Thus, the FIG. 15 embodiment includes the fractional decimator 470 for decimating the sampling rate by a decimation factor D=N/U, wherein both U and N are positive integers. Hence, the fractional decimator 470 advantageously enables the decimation of the sampling rate by a fractional number. Hence, the speed variation compensatory decimator 470 may operate to decimate the signals S(j) and P(j) and $f_{ROT}(j)$ by a fractional number D=N/U. According to an embodiment the values for U and N may be selected to be in the range from 2 to 2000. According to an embodiment the values for U and N may be selected to be in the range from 500 to 1500. According to yet another embodiment the values for U and N may be selected to be in the range from 900 to 1100. In this context it is noted that the background of the term "fraction" is as follows: A fraction (from Latin fractus, "broken") represents a part of a whole or, more generally, any number of equal parts. In positive common fractions, the numerator and denominator are natural numbers. The numerator represents a number of equal parts, and the denominator indicates how many of those parts make up a unit or a whole. A common fraction is a numeral which represents a rational number. That same number can also be represented as a decimal, a percent, or with a negative exponent. For example, 0.01, 1%, and 10-2 are all equal to the fraction 1/100. Hence, the fractional number D=N/U may be regarded as an inverted fraction.

Thus, the resulting signal $S_{MDR}$, which is delivered by fractional decimator 470, has a sample rate of $$f_{SR}=f_S/D=f_S*U/N$$

where $f_S$ is the sample rate of the signal $S_{RED}$ received by fractional decimator 470.

The fractional value U/N is dependent on a rate control signal received on an input port 490. The rate control signal may be a signal indicative of the speed of rotation $f_{ROT}$ of the rotating shell.

The variable decimator value D for the decimator may be set to D=$f_S/f_{SR}$, wherein $f_S$ is the initial sample rate of the A/D converter, and $f_{SR}$ is a set point value indicating a number of samples per revolution in the decimated digital vibration signal $S_{MDR}$. For example, when there are twelve (12) protrusions in the mill shell to be monitored, the set point value $f_{SR}$ may be set to 768 samples per revolution, i.e. the number of samples per revolution is set to $f_{SR}$ in the decimated digital vibration signal $S_{MDR}$. The compensatory decimator 470 is configured to generate a position signal P(q) at a regular interval of the decimated digital vibration signal $S_{MDR}$, the regular interval being dependent on the set point value $f_{SR}$. For example, when $f_{SR}$ is set to 768 samples per revolution, a position signal P(q) may be delivered once with every 768 sample of the decimated vibration signal S(q).

Hence, the sampling frequency $f_{SR}$, also referred to as $f_{SR2}$, for the output data values R(q) is lower than input sampling frequency $f_S$ by a factor D. The factor D can be set to an arbitrary number larger than 1, and it may be a fractional number, as discussed elsewhere in this disclosure. According to preferred embodiments the factor D is settable to values between 1.0 to 20.0. In a preferred embodiment the factor D is a fractional number settable to a value between about 1.3 and about 3.0. The factor D may be obtained by setting the integers U and N to suitable values. The factor D equals N divided by U:

$$D=N/U$$

According to an embodiment, the integers U and N are settable to large integers in order to enable the factor D=N/U to follow speed variations with a minimum of inaccuracy. Selection of variables U and N to be integers larger than 1000 renders an advantageously high accuracy in adapting the output sample frequency to tracking changes in the rotational speed of the shell 20. So, for example, setting N to 500 and U to 1001 renders D=2,002.

The variable D is set to a suitable value at the beginning of a measurement and that value is associated with a certain speed of rotation of a rotating part to be monitored. Thereafter, during measuring session, the fractional value D is automatically adjusted in response to the speed of rotation of the rotating part to be monitored so that the output signal $S_{MDR}$ provides a substantially constant number of sample values per revolution of the rotating shell.

Figure 20:
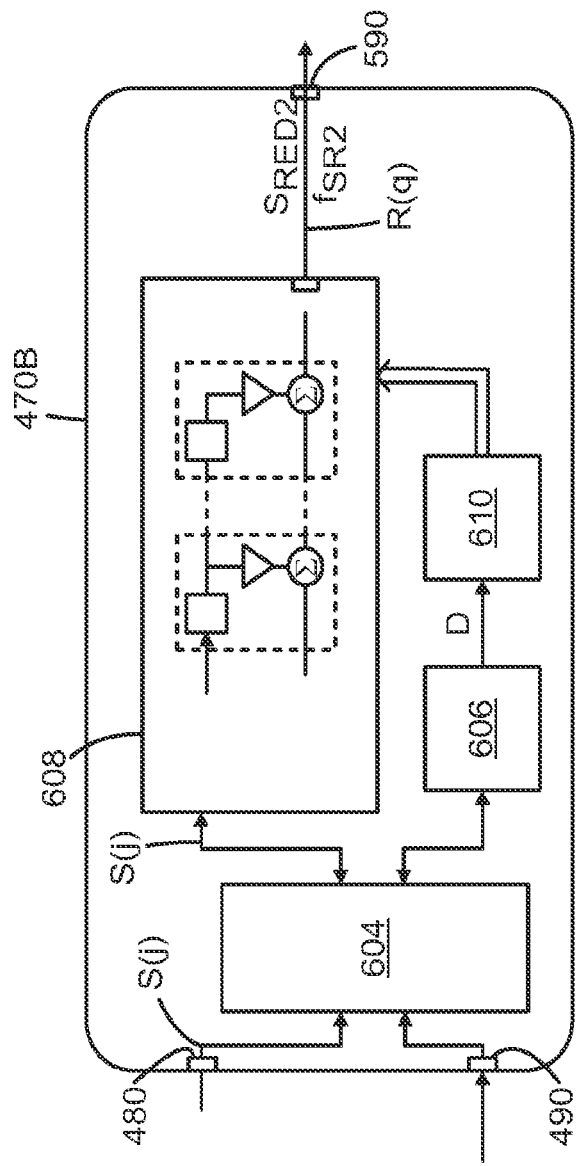
FIG. 20 is a block diagram of an example of compensatory decimator.

FIG. 20 is a block diagram of an example of compensatory decimator 470. This compensatory decimator example is denoted 470B.

Compensatory decimator 470B may include a memory 604 adapted to receive and store the data values S(j) as well as information indicative of the corresponding speed of rotation $f_{ROT}$ of the monitored rotating mill shell. Hence the memory 604 may store each data value S(j) so that it is associated with a value indicative of the speed of rotation $f_{ROT}(j)$ of the monitored mill shell at time of detection of the sensor signal $S_{EA}$ value corresponding to the data value S(j). The provision of data values S(j) associated with corresponding speed of rotation values $f_{ROT}(j)$ is described with reference to FIGS. 7-13 above.

Compensatory decimator 470B receives the signal $S_{MD}$, having a sampling frequency $f_{SR1}$, as a sequence of data values S(j), and it delivers an output signal $S_{MDR}$, having a reduced sampling frequency $f_{SR}$, as another sequence of data values R(q) on its output 590.

Compensatory decimator 470B may include a memory 604 adapted to receive and store the data values S(j) as well as information indicative of the corresponding speed of rotation $f_{ROT}$ of the monitored rotating mill shell. Memory 604 may store data values S(j) in blocks so that each block is associated with a value indicative of a relevant speed of rotation of the monitored mill shell, as described below in connection with FIG. 21.

Compensatory decimator 470B may also include a compensatory decimation variable generator 606, which is adapted to generate a compensatory value D. The compensatory value D may be a floating number. Hence, the compensatory number can be controlled to a floating number value in response to a received speed value $f_{ROT}$ so that the floating number value is indicative of the speed value $f_{ROT}$ with a certain inaccuracy. When implemented by a suitably programmed DSP, as mentioned above, the inaccuracy of floating number value may depend on the ability of the DSP to generate floating number values.

Moreover, compensatory decimator 470B may also include a FIR filter 608. In this connection, the acronyme FIR stands for Finite Impulse Response. The FIR filter 608 is a low pass FIR filter having a certain low pass cut off frequency adapted for decimation by a factor $D_{MAX}$. The factor $D_{MAX}$ may be set to a suitable value, e.g. 20,000. Moreover, compensatory decimator 470B may also include a filter parameter generator 610.

Operation of compensatory decimator 470B is described with reference to FIGS. 21 and 22 below.

Figure 21:
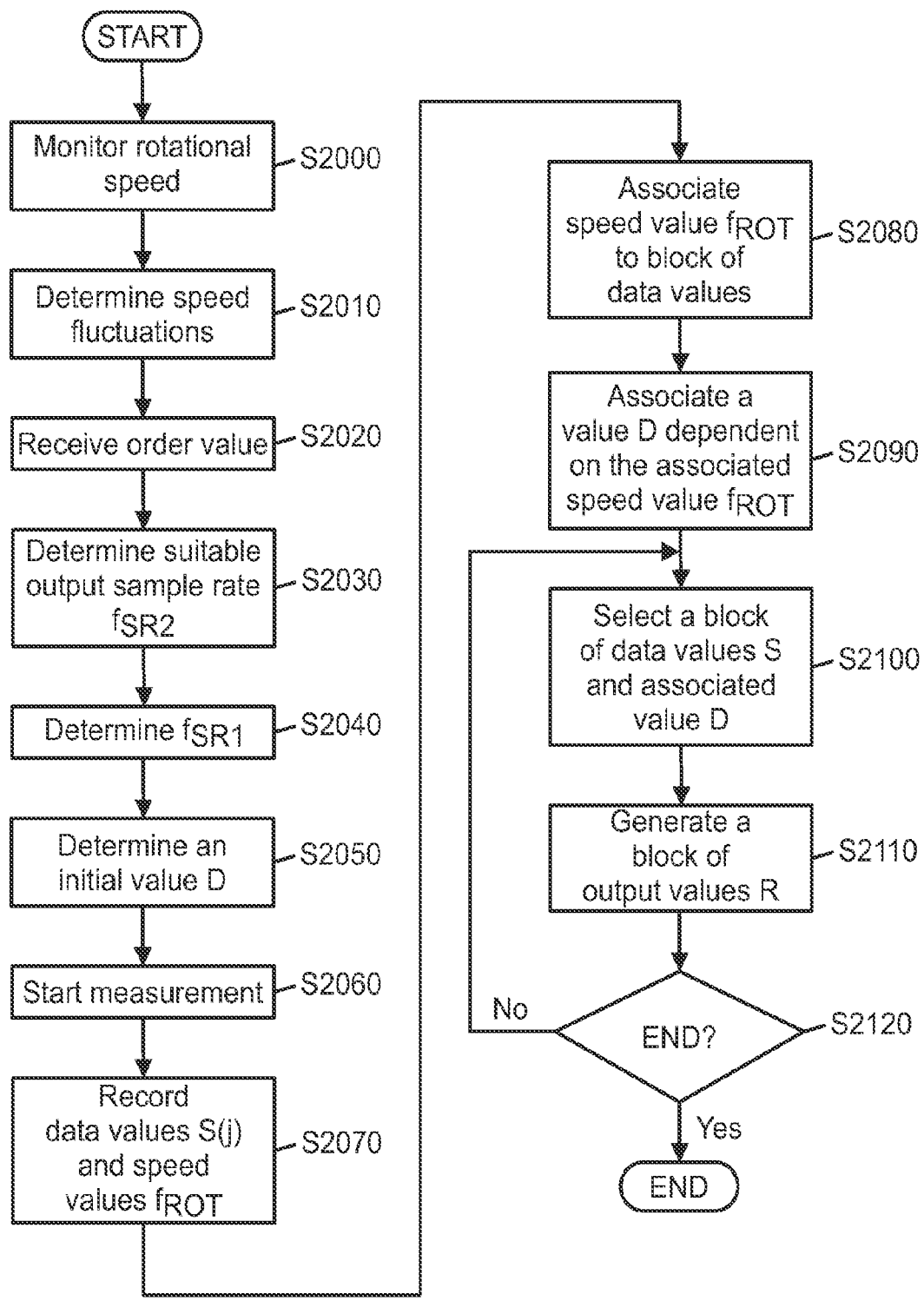
FIG. 21 is a flow chart illustrating an embodiment of a method of operating the compensatory decimator of FIG. 20.

FIG. 21 is a flow chart illustrating an embodiment of a method of operating the compensatory decimator 470B of FIG. 20.

In a first step S2000, the speed of rotation $f_{ROT}$ of the mill shell to be monitored is recorded in memory 604 (FIGS. 20 & 21), and this may be done at substantially the same time as measurement of vibrations begin. According to another example the speed of rotation of the mill shell to be monitored is surveyed for a period of time. The highest detected speed $f_{ROTmax}$ and the lowest detected speed $f_{ROTmin}$ may be recorded, e.g. in memory 604 (FIGS. 20 & 21).

In step S2010, the recorded speed values are analysed, for the purpose of establishing whether the speed of rotation varies.

In step S2020, the user interface 210, 210S displays the recorded speed value $f_{ROT}$ or speed values $f_{ROTmin}$, $f_{ROTmax}$, and requests a user to enter a desired order value Oi. As mentioned above, the mill shell rotation frequency $f_{ROT}$ is often referred to as "order 1". The interesting signals may occur about ten times per mill shell revolution (Order 10). Moreover, it may be interesting to analyse overtones of some signals, so it may be interesting to measure up to order 100, or order 500, or even higher. Hence, a user may enter an order number Oi using user interface 210, 210S.

In step S2030, a suitable output sample rate $f_{SR}$ is determined. The output sample rate $f_{SR}$ may also be referred to as $f_{SR2}$ in this disclosure. According to an embodiment output sample rate $f_{SR}$ is set to $f_{SR}=C*Oi*f_{ROTmin}$ wherein C is a constant having a value higher than 2.0

Oi is a number indicative of the relation between the speed of rotation of the monitored mill shell and the repetition frequency of the signal to be analysed.

$f_{ROTmin}$ is a lowest speed of rotation of the monitored mill shell to expected during a forthcoming measurement session. According to an embodiment the value $f_{ROTmin}$ is a lowest speed of rotation detected in step S2020, as described above.

The constant C may be selected to a value of 2.00 (two) or higher in view of the sampling theorem. According to embodiments of the present disclosure the Constant C may be preset to a value between 2.40 and 2.70.

According to an embodiment the factor C is advantageously selected such that 100*C/2 renders an integer. According to an embodiment the factor C may be set to 2.56. Selecting C to 2.56 renders 100*C=256=2 raised to 8.

In step S2050, a compensatory decimation variable value D is determined. When the speed of rotation of the mill shell to be monitored varies, the compensatory decimation variable value D will vary in dependence on momentary detected speed value.

According to an embodiment, a maximum compensatory decimation variable value $D_{MAX}$ is set to a value of $D_{MAX}=f_{ROTmax}/f_{ROTmin}$, and a minimum compensatory decimation variable value $D_{MIN}$ is set to 1.0. Thereafter a momentary real time measurement of the actual speed value $f_{ROT}$ is made and a momentary compensatory value D is set accordingly.

$f_{ROT}$ is value indicative of a measured speed of rotation of the rotating mill shell to be monitored In step S2060, the actual measurement is started, and a desired total duration of the measurement may be determined. The total duration of the measurement may be determined in dependence on a desired number of revolutions X of the monitored mill shell.

When measurement is started, a digital signal $S_{MD}$ is delivered to input 480 of the compensatory decimator. In the following the signal $S_{MD}$ is discussed in terms of a signal having sample values S(j), where j is an integer.

In step S2070, record data values S(j) in memory 604, and associate each vibration data value S(j) with a speed of rotation value $f_{ROT}(j)$.

In a subsequent step S2080, analyze the recorded speed of rotation values, and divide the recorded data values S(j) into blocks of data dependent on the speed of rotation values. In this manner a number of blocks of block of data values S(j) may be generated, each block of data values S(j) being associated with a speed of rotation value. The speed of rotation value indicates the speed of rotation of the monitored mill shell, when this particular block data values S(j) was recorded. The individual blocks of data may be of mutually different size, i.e. individual blocks may hold mutually different numbers of data values S(j).

If, for example, the monitored rotating mill shell first rotated at a first speed $f_{ROT1}$ during a first time period, and it thereafter changed speed to rotate at a second speed $f_{ROT2}$ during a second, shorter, time period, the recorded data values S(j) may be divided into two blocks of data, the first block of data values being associated with the first speed value $f_{ROT1}$, and the second block of data values being associated with the second speed value $f_{ROT2}$. In this case the second block of data would contain fewer data values than the first block of data since the second time period was shorter.

According to an embodiment, when all the recorded data values S(j) have been divided into blocks, and all blocks have been associated with a speed of rotation value, then the method proceeds to execute step S2090.

In step S2090, select a first block of data values S(j), and determine a compensatory decimation value D corresponding to the associated speed of rotation value $f_{ROT}$. Associate this compensatory decimation value D with the first block of data values S(j). According to an embodiment, when all blocks have been associated with a corresponding compensatory decimation value D, then the method proceeds to execute step S2100. Hence, the value of the compensatory decimation value D is adapted in dependence on the speed $f_{ROT}$.

In step S2100, select a block of data values S(j) and the associated compensatory decimation value D, as described in step S2090 above.

In step S2110, generate a block of output values R in response to the selected block of input values S and the associated compensatory decimation value D. This may be done as described with reference to FIG. 22.

In step S2120, Check if there is any remaining input data values to be processed. If there is another block of input data values to be processed, then repeat step S2100. If there is no remaining block of input data values to be processed then the measurement session is completed.

Figure 22A:
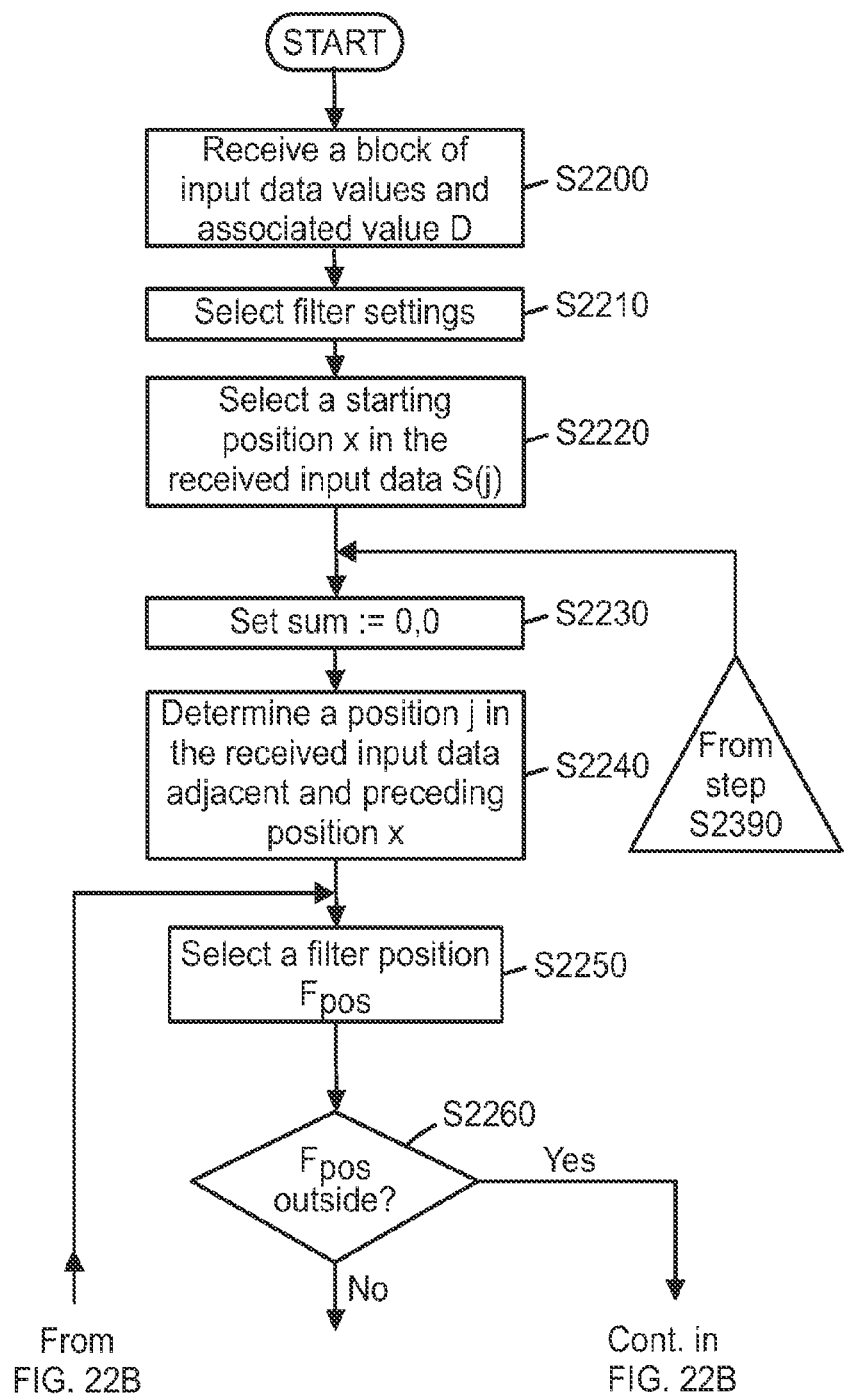
FIGS. 22A, 22B and 22C illustrate a flow chart of an embodiment of a method of operating the compensatory decimator of FIG. 20.
Figure 22B:
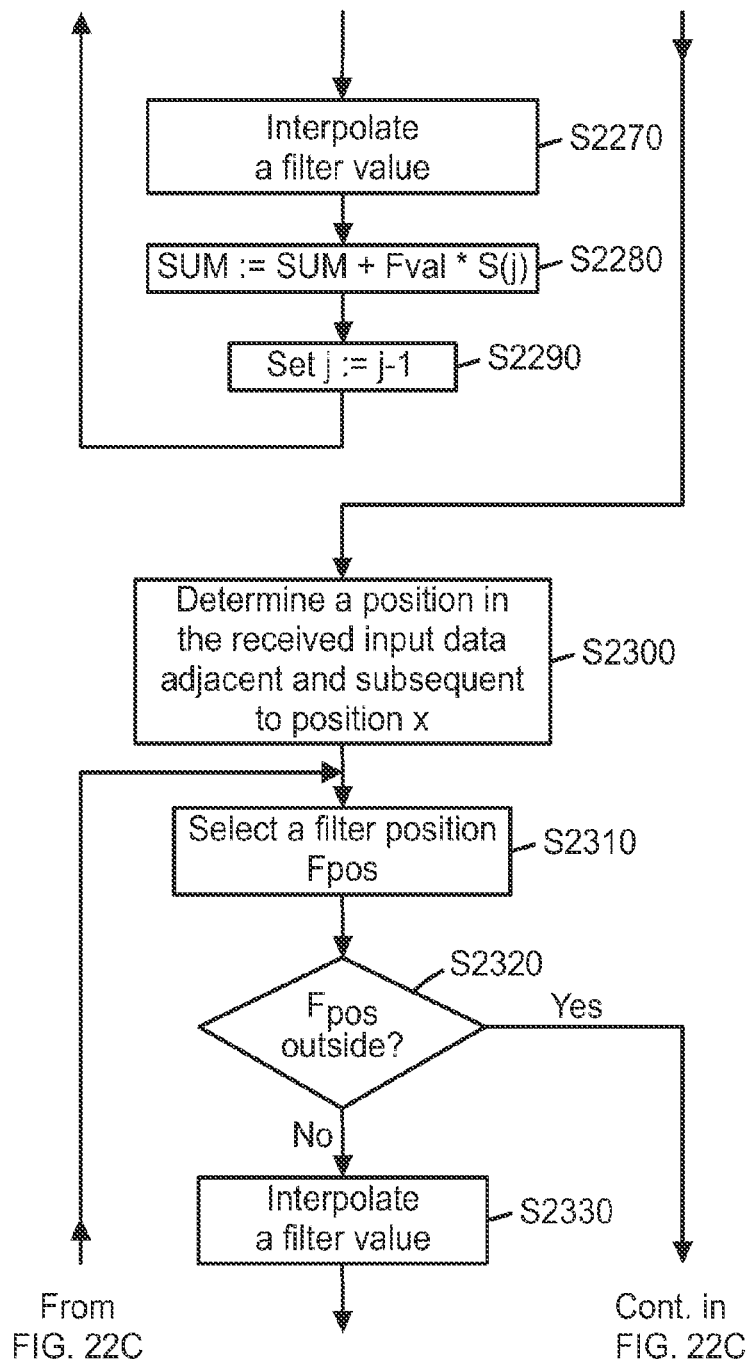
Figure 22C:
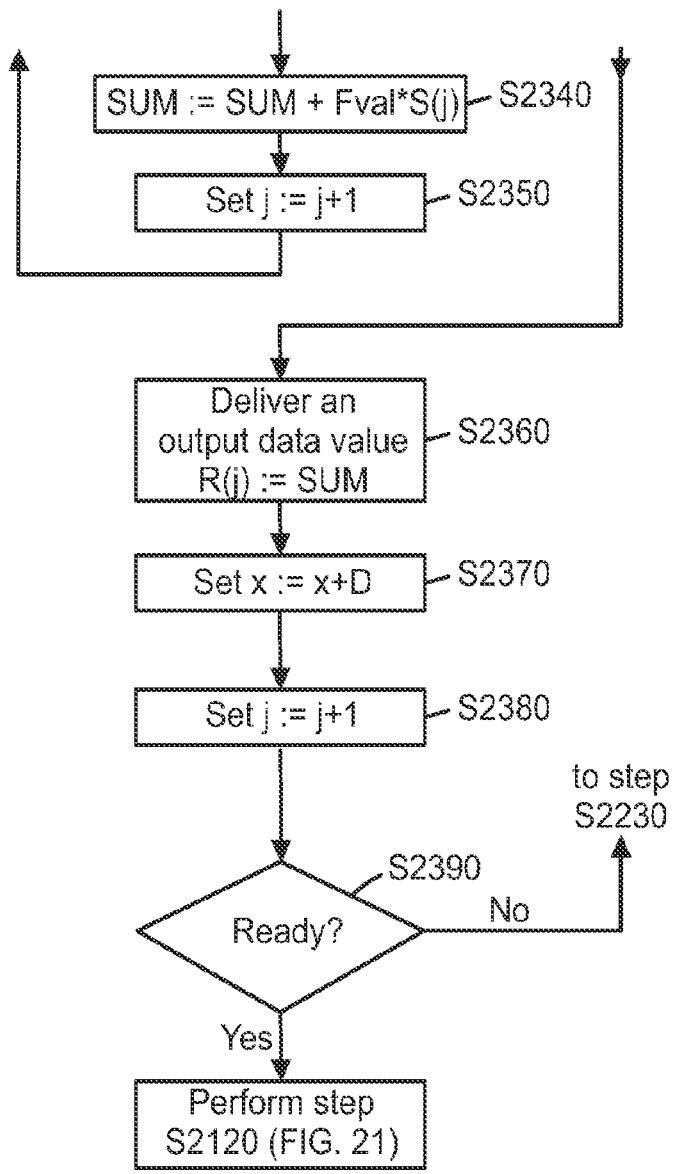

FIGS. 22A, 22B and 22C illustrate a flow chart of an embodiment of a method of operating the compensatory decimator 470B of FIG. 20.

In a step S2200, receive a block of input data values S(j) and an associated specific compensatory decimation value D. According to an embodiment, the received data is as described in step S2100 for FIG. 21 above. The input data values S(j) in the received block of input data values S are all associated with the specific compensatory decimation value D.

In steps S2210 to S2390 the FIR-filter 608 (See FIG. 20) is adapted for the specific compensatory decimation value D as received in step S2200, and a set of corresponding output signal values R(q) are generated. This is described more specifically below.

In a step S2210, filter settings suitable for the specific compensatory decimation value D are selected. As mentioned in connection with FIG. 20 above, the FIR filter 608 is a low pass FIR filter having a certain low pass cut off frequency adapted for decimation by a factor $D_{MAX}$. The factor $D_{MAX}$ may be set to a suitable value, e.g. 20.

A filter ratio value $F_R$ is set to a value dependent on factor $D_{MAX}$ and the specific compensatory decimation value D as received in step S2200. Step S2210 may be performed by filter parameter generator 610 (FIG. 20).

In a step S2220, select a starting position value x in the received input data block s(j). It is to be noted that the starting position value x does not need to be an integer. The FIR filter 608 has a length $F_{LENGTH}$ and the starting position value x will then be selected in dependence of the filter length $F_{LENGTH}$ and the filter ratio value FR. The filter ratio value FR is as set in step S2210 above. According to an embodiment, the starting position value x may be set to x:=$F_{LENGTH}$/$F_R$.

In a step S2230 a filter sum value SUM is prepared, and set to an initial value, such as e.g. SUM:=0.0

In a step S2240 a position j in the received input data adjacent and preceding position x is selected. The position j may be selected as the integer portion of x.

In a step S2250 select a position Fpos in the FIR filter that corresponds to the selected position j in the received input data. The position Fpos may be a compensatory number. The filter position Fpos, in relation to the middle position of the filter, may be determined to be Fpos=[(x−j)*$F_R$]

wherein $F_R$ is the filter ratio value.

In step S2260, check if the determined filter position value Fpos is outside of allowable limit values, i.e. points at a position outside of the filter. If that happens, then proceed with step S2300 below. Otherwise proceed with step S2270.

In a step S2270, a filter value is calculated by means of interpolation. It is noted that adjacent filter coefficient values in a FIR low pass filter generally have similar numerical values. Hence, an interpolation value will be advantageously accurate. First an integer position value IFpos is calculated:

IFpos:=Integer portion of Fpos

The filter value Fval for the position Fpos will be:

Fval=*A*(IFpos)+[*A*(IFpos+1)−*A*(IFpos)]*[Fpos−IFpos]

wherein A(IFpos) and A(IFpos+1) are values in a reference filter, and the filter position Fpos is a position between these values.

In a step S2280, calculate an update of the filter sum value SUM in response to signal position j:

SUM:=SUM+Fval*S(j)

In a step S2290 move to another signal position:

Set j:=j−1

Thereafter, go to step S2250.

In a step 2300, a position j in the received input data adjacent and subsequent to position x is selected. This position j may be selected as the integer portion of x. plus 1 (one), i.e j:=1+Integer portion of x In a step S2310 select a position in the FIR filter that corresponds to the selected position j in the received input data. The position Fpos may may be a compensatory number. The filter position Fpos, in relation to the middle position of the filter, may be determined to be Fpos=[(j−x)*$FR$]

wherein $F_R$ is the filter ratio value.

In step S2320, check if the determined filter position value Fpos is outside of allowable limit values, i.e. points at a position outside of the filter. If that happens, then proceed with step S2360 below. Otherwise proceed with step S2330.

In a step S2330, a filter value is calculated by means of interpolation. It is noted that adjacent filter coefficient values in a FIR low pass filter generally have similar numerical values. Hence, an interpolation value will be advantageously accurate. First an integer position value IFpos is calculated:

IFpos:=Integer portion of Fpos

The filter value for the position Fpos will be:

Fval(Fpos)=$A$(IFpos)+[$A$(IFpos+1)−$A$(IFpos)]*[Fpos−IFpos]

wherein A(IFpos) and A(IFpos+1) are values in a reference filter, and the filter position Fpos is a position between these values.

In a step S2340, calculate an update of the filter sum value SUM in response to signal position j:

SUM:=SUM+Fval*$S(j)$

In a step S2350 move to another signal position:

Set $j$:=$j$+1

Thereafter, go to step S2310.

In a step S2360, deliver an output data value R(j). The output data value R(j) may be delivered to a memory so that consecutive output data values are stored in consecutive memory positions. The numerical value of output data value R(j) is:

$R(j)$:=SUM

In a step S2370, update position value x:

$x$:=$x$+$D$

In a step S2380, update position value j $j$:=$j$+1

In a step S2390, check if desired number of output data values have been generated. If the desired number of output data values have not been generated, then go to step S2230. If the desired number of output data values have been generated, then go to step S2120 in the method described in relation to FIG. 21.

In effect, step S2390 is designed to ensure that a block of output signal values R(q), corresponding to the block of input data values S received in step S2200, is generated, and that when output signal values R corresponding to the input data values S have been generated, then step S2120 in FIG. 21 should be executed.

The method described with reference to FIG. 22 may be implemented as a computer program subroutine, and the steps S2100 and S2110 may be implemented as a main program.

Figure 23:
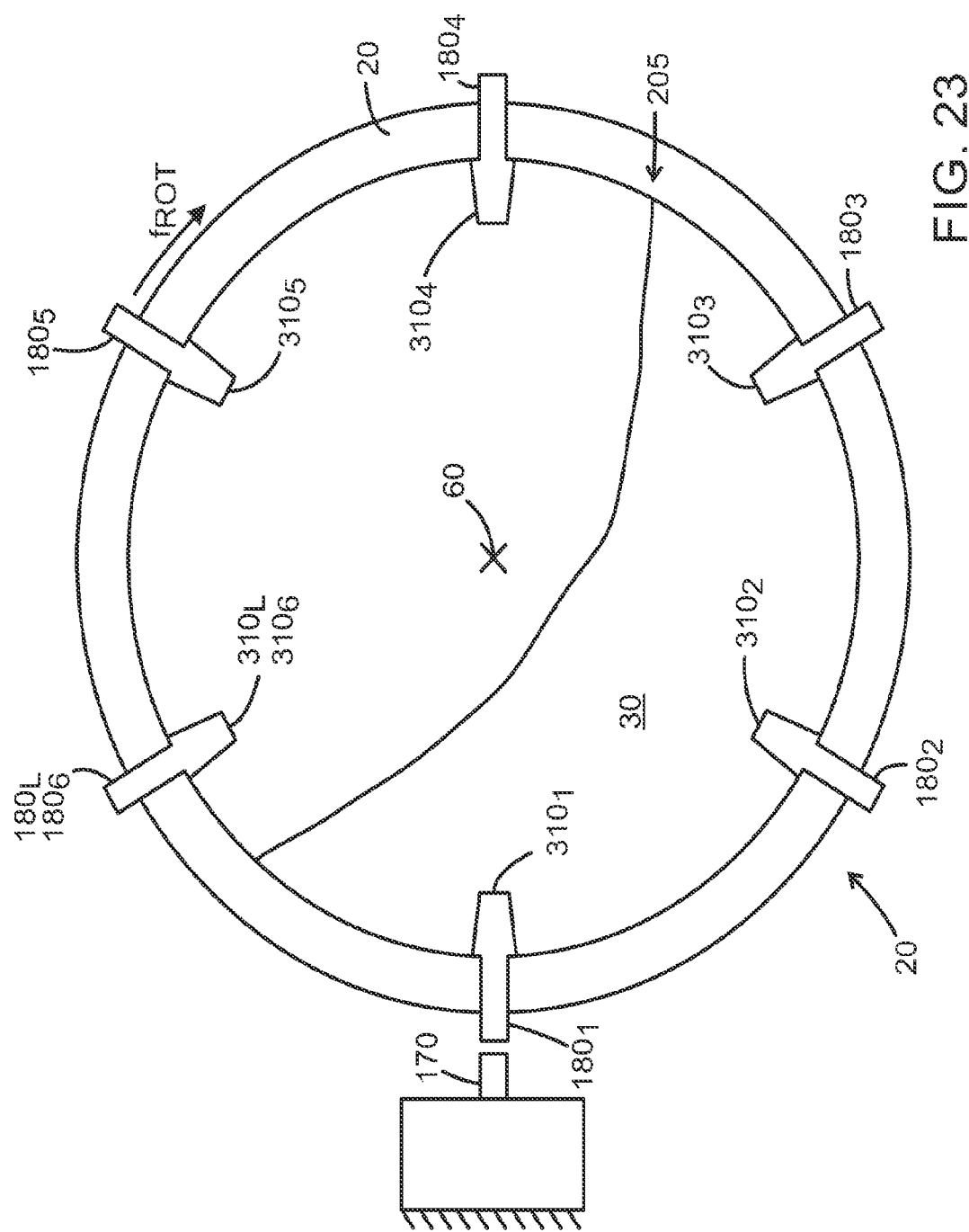
FIG. 23 shows another example of a cross-sectional view of the mid-portion of a rotating mill shell during operation.

FIG. 23 shows another example of a cross-sectional view of the mid-portion 98 of a rotating mill shell 20 during operation. This view could be taken e.g. along line A-A of FIG. 1. According to the example of FIG. 23, the tumbling mill shell 20 has six protrusions 310 configured to engage the charge material 30 as the shell rotates about the axis 60, i.e. the number L=6. For the purpose of clarity, the protrusions in the example of FIG. 23 have been invidually referenced as 3101, 3102, 3103, 3104, 3105, and 3106.

A position sensor 170 is provided to generate the position signal Ep dependent on the rotational position of the shell 20. As mentioned above, the shell 20 is rotatable around the axis of rotation 60, and thus the position sensor 170, being mounted in an immobile manner, may generate a position signal Ep having a sequence of shell position signal values $P_S$ for indicating momentary rotational positions of the shell 20. As shown in FIG. 23 a number of position markers 180 may be provided on an outer surface of the shell 20 such that, when the shell 20 rotates around the axis of rotation 60, several position markers 180 pass by the position sensor 170 during one revolution of the shell 20, each marker 180 thereby causing the position sensor 170 to generate a revolution marker signal value $P_S$. According to an embodiment, there are L position markers 180 provided on the shell 20 such that, when the shell 20 rotates around the axis of rotation 60, the position markers 1801 . . . 180L consequtively pass by the position sensor 170, thereby causing the position sensor 170 to generate L revolution marker signal values $P_S$ during one revolution of the shell 20. According to the embodiment shown in FIG. 23, there are six protrusions 310, i.e. L=6, and there are six position markers 1801, 1802, 1803, 1804, 1805, and 1806.

It is believed to be important that the placement, in terms of angular positions, of the position markers 180 mirrors the the placement, in terms of angular positions, of the protrusions 310 on the internal surface 22 of shell 20.

In the embodiment of FIG. 23 the L position markers 180 are positioned in a mutually equidistant manner on the perimeter of the shell 20, thereby causing the position sensor 170 to generate a marker signal $P_S$ every 360/L degrees during a revolution of the shell 20. In this context it is noted that, in the embodiment of FIG. 23, the L protrusions 3101, 3102, 3103, 3104, 3105, and 310L are positioned in a mutually equidistant manner on the internal surface 22 of shell 20. It is believed that the mutually equidistant positions of the protrusions 310 and the mutually equidistant positions of the position markers 180 is of importance for some embodiments of this disclosure. This is believed to be of importance for some embodiments of this disclosure since the position markers 180 cause the generation of position reference signal values, and the protrusions 310, when engaging material in the charge of a rotating mill, cause the generation of a signal event, such as e.g. an amplitude peak value, in the vibration signal (See references $S_{EA}$, $S_{MD}$, Se(i), S(j), S(q) e.g. in FIGS. 1 and 15). Moreover, the temporal duration between the occurrence of a position reference signal value and the occurrence of a signal event in the vibration signal, caused by a protrusion 310 engaging material in the charge of the rotating mill shell may be indicative of an internal state of the operating mill, as discussed elsewhere in this disclosure. For example, the temporal duration between the occurrence of a position reference signal value and the occurrence of a signal event in the vibration signal, caused by a protrusion 310 engaging material in the charge of the rotating mill shell may be indicative of an internal state, such as e.g. the position of the toe 205.

However, the actual placing of the position markers 180 in relation to the positions of the protrusions 310 is believed to be of less importance. Thus, whereas FIG. 23 illustrate the position markers 180 being placed at the same angular positions as the protrusions 310, it is to be noted that the position markers 180 may well be displaced in terms of angular positions. However, if the position markers 180 are displaced in terms of angular positions, it is believed to be of importance that all of the position markers 180 are equally displaced so as to maintain the mutually equidistant position of the position markers 180. More particularly, it is believed to be important that the placement, in terms of angular positions, of the position markers 180 mirrors the placement, in terms of angular positions, of the protrusions 310 on the internal surface 22 of shell 20.

As noted above, in connection with FIGS. 19A and 19B, it has been observed that when starting up a tumbling mill from an empty state, the initial internal status indicator object appears at an initial polar angle Φ(1) that represents a very first detected toe position 205 of the mill. Based on experimental measurements, it appears as though the initial polar angle Φ(1) may be used as a reference toe position value. Hence, the initial polar angle Φ(1) may thus be termed reference toe position value $\Phi_{TR}$. For the particular tumbling mill whose internal state is represented by the display 210S illustrated by FIGS. 19A and 19B, the reference toe position corresponds to an angular value $\Phi_{TR}$ of about 47 degrees, as can be seen in FIGS. 19A and 19B. With reference to FIGS. 2 and 14, it is believed that the angular value of the reference toe position value ØTR would be changed to a numerically different angular value if the position marker 180 is physically moved to a different placement, in terms of angular position.

The set-up of the rotating mill shell 20, as illustrated in FIG. 23 may be used in combination with the status parameter extractors 450 as exemplified in this disclosure. With reference to FIG. 15, the set-up of the rotating mill shell 20, as illustrated in FIG. 23 may be used for generating the marker signal P(i) which is delivered to shell speed value generator 500. Thus, the shell speed value generator 500 will receive a marker signal P(i) having a position indicator signal value every 360/L degrees during a revolution of the shell 20. Thus, the Fast Fourier Transformer 510 will receive a marker signal value P(j)=1, from the speed value generator 500, every 360/L degrees during a revolution of the shell 20 when the rotational speed $f_{ROT}$ is constant. Alternatively, the Fast Fourier Transformer 510 will receive a marker signal value P(q)=1, from the decimator 470, 470B, every 360/L degrees during a revolution of the shell 20 when the rotational speed $f_{ROT}$ varies.

Moreover, the speed value generator 500 will be able to generate even more accurate speed values $f_{ROT}(j)$ when it receives a marker signal P(i) having a position indicator signal value, e.g. P(i)=1, every 360/L degrees during a revolution of the shell 20.

As for appropriate settings of the FFT 510 when it receives a marker signal value P(j)=1 every 360/L degrees during a revolution of the shell 20, this means that the fundamental frequency will be the repetition frequency $f_R$.

As noted above in relation to FIG. 2, the vibration signal $S_{EA}$, $S_{MD}$, S(j), S(q) will exhibit a signal signature $S_{FIMP}$ indicative of the impact of a protrusion with the toe portion 205, and when there are L protrusions 310 in the shell 20 (See FIG. 23 in conjunction with eq. 2 below) then that signal signature $S_{FIMP}$ will be repeated L times per revolution of the shell 20.

Again, reference is made to the Fourier series (See Equation 2 below):

$$n=\infty$$
$$F(t)=\Sigma C_n \sin(n\omega t+\Phi n) \quad \text{(Eq. 2)}$$
$$n=0$$

wherein
n=0 the average value of the signal during a period of time (it may be zero, but need not be zero)
n=1 corresponds to the fundamental frequency of the signal F(t).
n=2 corresponds to the first harmonic partial of the signal F(t).
ω=the angular frequency of interest i.e. ($2*\pi*f_R$)
$f_R$=a frequency of interest, expressed as periods per second t-time
$\Phi_n$=phase angle for the n:th partial
$C_n$=Amplitude for the n:th partial In this embodiment it is noted that the fundamental frequency will be one per protrusion 310 when the FFT 510 receives a marker signal value P(j)=1 every 360/L degrees during a revolution of the shell 20.

As noted above, the settings of the FFT 510 should be done with a consideration of the reference signal. As noted above, the position signal P(j), P(q) (see FIG. 15) may be used as a reference signal for the digital measurement signal S(j),S(q).

According to some embodiments, when the FFT analyzer is configured to receive a reference signal, i.e. the position signal P(j), P(q), once every 360/L degrees during a revolution of the shell 20 and L is the number of protrusions 310 in the shell 20, then the setting of the FFT analyzer should fulfill the following criteria:

The integer value Oi is set to unity, i.e. to equal 1, and the settable variables Y, and Z are selected such that the mathematical expression Oi*Z/Y becomes a positive integer. Differently expressed: When integer value Oi is set to equal 1, then settable variables Y and Z should be set to integer values so as to render the variable X a positive integer,
wherein X=Oi*Z/Y Using the above setting, i.e. integer value Oi is set to equal unity, and with reference to FIG. 15 and equation 2 above, the FFT 510 may deliver the amplitude value $C_n$ for n=1, i.e. $C_1$=Sp(r). The FFT 510 may also deliver phase angle for the fundamental frequency (n=1), i.e. Ø1=FI(r).

With reference to FIG. 15 in conjunction with FIG. 1 and equation 2 above, the status values Sp(r)=$C_1$ and FI(r)=$\Phi_1$ may be delivered to the Human Computer Interface (HCI) 210 for providing a visual indication of the analysis result. As mentioned above, the analysis result displayed may include information indicative of an internal state of the tumbling mill process for enabling the operator 230 to control the tumbling mill.

With reference to FIGS. 16, 17, 18, 19A, and 19B, the example illustrations of visual indications of analysis results are valid for the set-up of the rotating mill shell 20, as illustrated in FIG. 23, whereby the FFT 510 will receive a marker signal P(i), P(j), P(q) having a position indicator signal value every 360/L degrees, wherein L is the number of protrusions 310 in the shell 20.

Whereas the above discussion in relation to settings of the FFT 510 refers to the Fourier series and equations 1 and 2 for the purpose of conveying an intuitive understanding of the background for the settings of an FFT transformer 510, it is noted that the use of digital signal processing may involve the discrete Fourier transform (See Equation 3 below):

$$F(n) = \sum_{k=0}^{N-1} f(k)e^{-j2\pi nk/N}(n = 0 \ldots 1:N-1) \quad \text{Equation 3}$$

Thus, according to embodiments of this disclosure the above discrete Fourier transform (DFT) may be comprised in signal processing for generating data indicative of the internal state of a tumbling mill, such as that discussed in connection with embodiments of the status parameter extractor 450. In this connection, reference is made to e.g. FIGS. 3, 4, 5, 15 and/or 24. In view of the above discussion on the subject of FFT and the Fourier series, the discrete Fourier transform will not be discussed in further detail, as the skilled reader of this disclosure is well acquainted with it.

Whereas FIG. 23 illustrates that a number of position markers 180 may be provided on an outer surface of the shell 20, each marker 180 thereby causing the position sensor 170 to generate a revolution marker signal value $P_S$, it is noted that such a position signal may alternatively be generated by an encoder 170 which is mechanically coupled to the rotating mill shell 20. Thus, the position sensor 170 may be embodied by an encoder 170 which is mechanically coupled to the rotating mill shell 20 such that the encoder generates e.g. one marker signal $P_S$ per protrusion 310 in the rotating shell 20 during rotation of the mill shell 20.

In summary, as regards appropriate settings of the FFT 510 and the above equations 1 and 2, it is noted that the phase angle for the n:th partial, i.e. On, may be indicative of the relative position of the toe 205. In particular, the phase angle for the n:th partial, i.e. $\Phi_n$, may be indicative of the position of the toe 205, expressed as a part of the distance between two adjacent protrusions 310 in a rotating shell 20. With reference to table 6 above and FIG. 14, the total distance between two adjacent protrusions may be regarded as 360 degrees, and value of the phase angle for the n:th partial, i.e. On, divided by 360 may be indicative of a percentage of the total distance between the two adjacent protrusions. This can be seen e.g. by comparing col. #2 in table 5 and table 6 above. As mentioned above, $\Phi_n$=phase angle for the n:th partial, and $C_n$=Amplitude for the n:th partial. As discussed above, considering the number L of protrusions in the rotating shell 20 and the number of reference signals being generated and, as a consequence thereof, the order Oi of a signal of interest, the FFT 510 may be set so as to deliver a phase angle for the n:th partial, $\Phi_n$, and an amplitude for the n:th partial, $C_n$, so that the phase angle for the n:th partial, i.e. $\Phi_n$, may be indicative of the relative position of the toe 205. Moreover, as noted above, the FFT 510 may be set so as to render the variable X a positive integer, wherein $$X = Oi * Z/Y$$

and wherein
Oi is set to a integer value,
Y is set to a integer value,
Z is set to a integer value.

Figure 24:
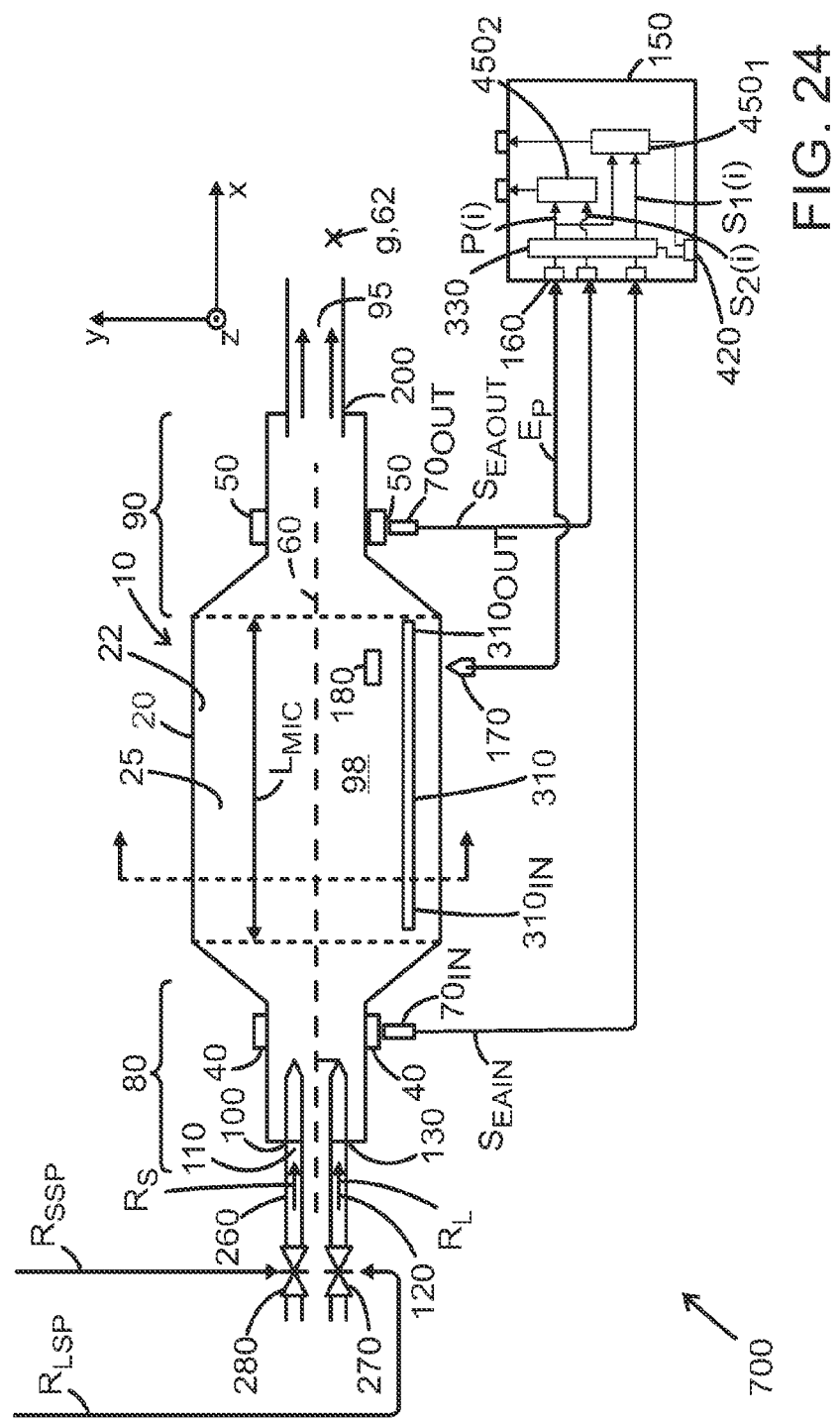
FIG. 24 shows a somewhat diagrammatic and schematic top view of another system including a tumbling mill.

FIG. 24 shows a somewhat diagrammatic and schematic top view of another system 700 including a tumbling mill 10. The tumbling mill 10 may be an autogenous (AG) mill, for example. Alternatively, the tumbling mill 10 may be a semi-autogenous (SAG) mill. Another example tumbling mill 10 is a ball mill 10. The tumbling mill 10 includes a shell 20 having an internal shell surface 22 that forms a chamber 25 for grinding material. The tumbling mill system 700 of FIG. 24 may be configured as described in any of the other embodiments described in this disclosure, e.g. in relation to FIGS. 1-23 above. However, whereas the tumbling mill system of FIG. 1 was described to have a vibration sensor 70 by the input side of the mill, it is noted that the tumbling mill system 700 of FIG. 24 may be configured to have a first vibration sensor $70_{IN}$ for producing a first measuring signal $S_{EAIN}$ as well as
a second vibration sensor $70_{OUT}$ for producing a second measuring signal $S_{EAOUT}$.

The signal treatment of the first measuring signal $S_{EAIN}$ generated by the first vibration sensor $70_{IN}$ may be as described in relation to the signal $S_{EA}$ in any of the other embodiments described in this disclosure, e.g. in relation to FIGS. 1-23 above. Likewise, the signal treatment of the second measuring signal $S_{EAOUT}$ generated by the second vibration sensor $70_{OUT}$ may be as described in relation to the signal $S_{EA}$ in any of the other embodiments described in this disclosure, e.g. in relation to FIGS. 1-23 above. Thus, a difference as compared the above described embodiments is that in the system 700 there will be provided data indicative of the internal state of the input side of the tumbling mill, based on the first measuring signal $S_{EAIN}$ as well as data indicative of the internal state of the output side of the tumbling mill, based on the second measuring signal $S_{EAOUT}$. Accordingly, the tumbling mill system 700 of FIG. 24 may be configured as described in any of the the above described embodiments of this disclosure as regards the provision of a position signal or reference signal.

The analysis apparatus 150 shown in FIG. 24 may comprise a first status parameter extractor 4501 as well as a second status parameter extractor 4502. The status parameter extractors 4501 and 4502 may operate as described in any of the above described embodiments, e.g. with reference to FIG. 5 and or 15. Thus first status parameter extractor 4501 may be configured to generate parameters $S_{P1}(r)$, $R_{T1}(r)$, $f_{ROT}(r)$, $dS_{P1}(r)$, and $dR_{T1}(r)$.

Similarly the second status parameter extractor 4502 may be configured to generate parameters $S_{P2}(r)$, $R_{T2}(r)$, $f_{ROT}(r)$, $dS_{P2}(r)$, and $dR_{T2}(r)$. However, the rotational speed $f_{ROT}(r)$ of the shell will be the same, of course, and thus it may suffice if one of the status parameter extractors delivers the rotational speed value $f_{ROT}(r)$.

With reference to FIG. 24, there is shown a cartesian co-ordinate system having three mutually perpendicular axes X, Y and Z. It is to be understood that, during operation of the mill 10, the material 30 travels in the positive direction of the X axis from the input side 80 of the mill to the output side 90.

The tumbling mill system 700 of FIG. 24 advantageously provides parameters indicative of the internal state of the input side of the tumbling mill: $S_{P1}(r)$, $R_{T1}(r)$, $dS_{P1}(r)$, and $dR_{T1}(r)$, as well as parameters indicative of the internal state of the output side of the tumbling mill: $S_{P2}(r)$, $R_{T2}(r)$, $dS_{P2}(r)$, and $dR_{T2}(r)$.

A comparison of an input side parameter with the corresponding output side parameter can advantageously add yet another dimension to the understanding of internal state of the mill 10. For example, the relation between $R_{T2}(r)$ and $R_{T1}(r)$ indicates whether
the toe position is the same at input and output side, or
the toe position is higher at the input side, indicated when $R_{T1}(r) > R_{T2}(r)$; or
the toe position is higher at the output side, indicated when $R_{T2}(r) > R_{T1}(r)$.

The toe position being higher at the output side may be indicative of an incipient disorder. For example, when the outflow of output material 95 is decreased, perhaps due to a blockage, while the inflow of solid material 110 continues at an unreduced pace, there will be an increased risk of overload that may lead to a decreased efficiency of the grinding process in the tumbling mill. Accordingly, tumbling mill system 700 of FIG. 24 may advantageously enable an early indication of an incipient disorder. Thus, based on a comparison of an input side parameter with the corresponding output side parameter the tumbling mill system 700 may enable adjustments of control parameters so as to avoid e.g. disorders such as overload of the mill.

With reference to FIG. 24 it is noted that the vibration sensor $70_{OUT}$ is attached to a non-rotating portion of the body of mill structure 10, and the vibration sensor $70_{OUT}$ is positioned so as to primarily detect vibrations in the horizontal direction Y (see the cartesian co-ordinate system having three mutually perpendicular axes X, Y and Z, wherein Y is a horizontal direction). Likewise, the vibration sensor $70_{IN}$ is attached to a non-rotating portion of the body of mill structure 10, and the vibration sensor $70_{IN}$ is positioned so as to primarily detect vibrations in the horizontal direction Y. Experimental measurements appear to indicate that an improved vibration signal quality is obtained when a vibration sensor is configured to primarily detect vibrations in a horizontal direction Y, as compared to a vibration signal quality obtained when a vibration sensor is configured to primarily detect vibrations in a vertical direction Z. As noted above, e.g. in connection with FIG. 2, the interaction of a protrusion 310 with the toe 205 of the charge, forcing material in the toe of the charge to accelerate in the direction of movement of the protrusion 310, as illustrated in FIG. 2, causes a mechanical vibration $V_{IMP}$. The impact of the protrusion 310C against the mass of material in the toe portion 205 causes a mass of toe portion material to accelerate in the direction $A_{ACC}$ of movement of the protrusion 310C, this acceleration causing a force $F_{IMP}$ against the leading edge surface of the protrusion 310C. Since the mass of solid material in charge 30 of the mill is in the magnitude of metric tons, this impact force $F_{IMP}$ is of of a significant magnitude. However, since the mill structure will typically rest on a very hard floor surface that tends to mitigate vibrations in the vertical direction, it appears as though the detection of vibrations in a horizontal direction Y renders an improved vibration signal quality.

Figure 25:
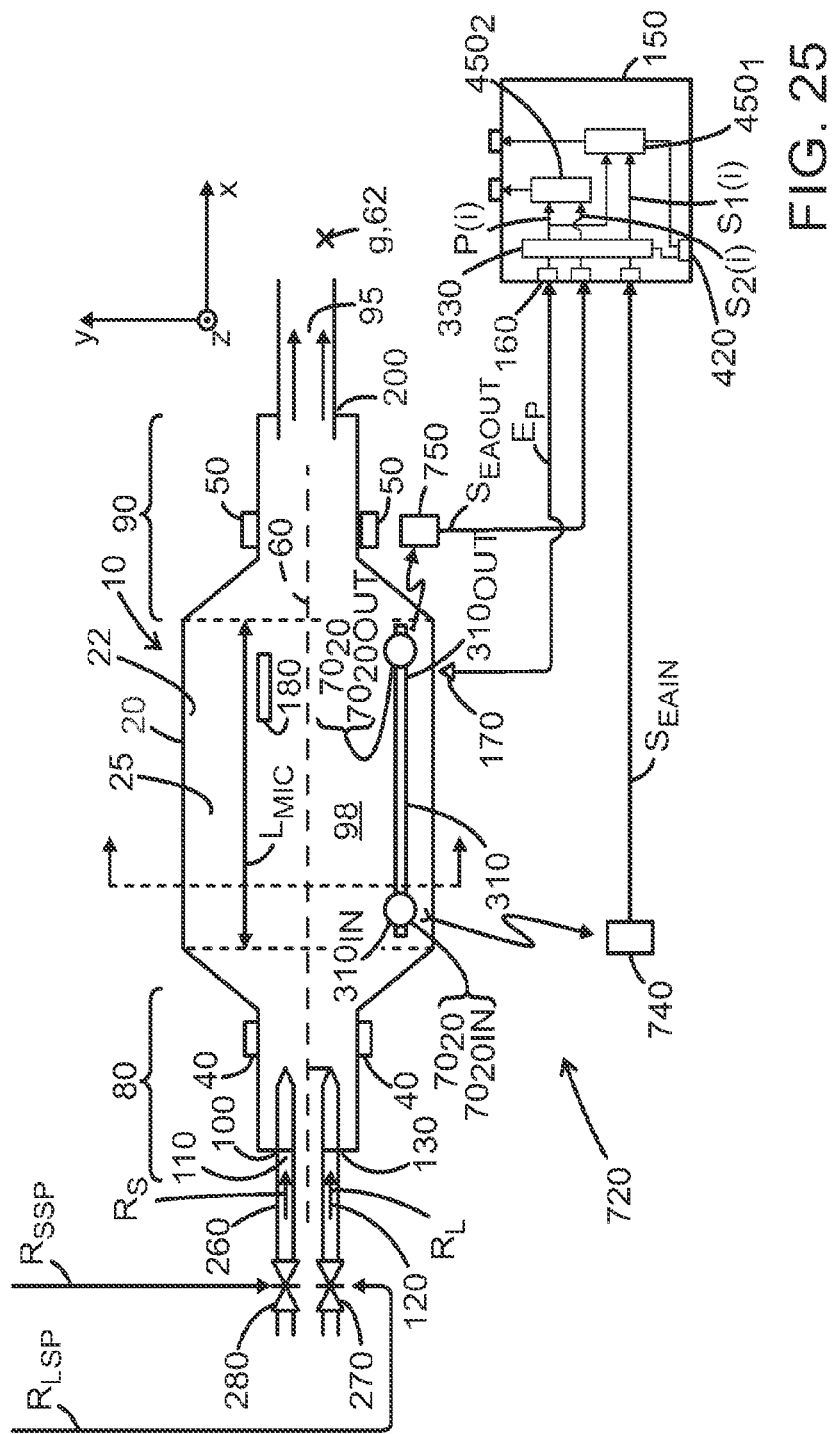
FIG. 25 shows a somewhat diagrammatic and schematic top view of yet another embodiment of a system including a tumbling mill.

FIG. 25 shows a somewhat diagrammatic and schematic top view of yet another embodiment of a system 720 including a tumbling mill 10.

The tumbling mill system 720 of FIG. 25 may be configured as described in connection with FIG. 24. However, whereas the tumbling mill system 700 of FIG. 24 was described to have a vibration sensor $70_{OUT}$ attached to a non-rotating portion of the body of mill structure 10, and a vibration sensor $70_{IN}$ attached to another non-rotating portion of the body of mill structure 10, the tumbling mill system 720 of FIG. 25 differs in that it provides a vibration sensor $70_{20}$ that is attached to the rotating shell 20 of the mill structure 10. The provision of a vibration sensor $70_{20}$ directly on the rotating shell 20 will render high vibration amplitudes, in particular when the vibration sensor $70_{20}$ is positioned on the outside of the shell directly on the opposite side of the shell wall from a projection 310, as illustrated in FIG. 25.

The tumbling mill system 720 of FIG. 25 may optionally comprise
- a first vibration sensor $70_{20IN}$ for producing a first measuring signal $S_{EAIN}$ as well as
- a second vibration sensor $70_{20OUT}$ for producing a second measuring signal $S_{EAOUT}$. As shown in FIG. 25, the first vibration sensor $70_{20IN}$ may be firmly attached to the outer surface of the shell 20 at a position which is closer to the input side 80 than it is to the output side 90. Moreover, the second vibration sensor $70_{20OUT}$ may be firmly attached to the outer surface of the shell 20 at a position which is closer to the output side 90 than it is to the input side 80.

The first vibration sensor $70_{20IN}$ and the second vibration sensor $70_{20OUT}$ may be equipped to communicate in a wireless manner with the apparatus 150, e.g. via transceiver units 740 and 750, respectively. A sensor $70_{20}$, $70_{20IN}$, $70_{20OUT}$ on the the outer surface of the shell 20 may be supplied with power via a battery, or alternatively by means of an inductive device (not shown) attached to outer surface of the rotating shell 20 that operates as a generator by interaction with one or several permanent magnets that are immobile. In this manner, when the shell 20 rotates, it will repeatedly cause the inductive device to to pass through the magnetic fields of the immobile one or several permanent magnets, thereby inducing electric current that may be used as power for the sensor $70_{20}$, $70_{20IN}$, $70_{20OUT}$.

The tumbling mill system 720 of FIG. 25 may also advantageously provide parameters indicative of the internal state of the input side of the tumbling mill $S_{P1}(r)$, $R_{T1}(r)$, $dS_{P1}(r)$, and $dR_{T1}(r)$, as well as parameters indicative of the internal state of the output side of the tumbling mill: $S_{P2}(r)$, $R_{T2}(r)$, $dS_{P2}(r)$, and $dR_{T2}(r)$. Hence, the skilled reader of this disclosure directly and unambiguously derives that the tumbling mill system 720 of FIG. 25 may advantageously enable an early indication of an incipient disorder in a manner substantially similar to that of the tumbling mill system 700 of FIG. 24. In particular, the tumbling mill system 720 of FIG. 25 may advantageously enable a comparison of an input side parameter with the corresponding output side parameter in the manner described above in relation to the tumbling mill system 700. Thus also the the tumbling mill system 720 of FIG. 25 may advantageously enable adjustments of control parameters so as to avoid e.g. disorders such as an overload of the mill.

Figure 26:
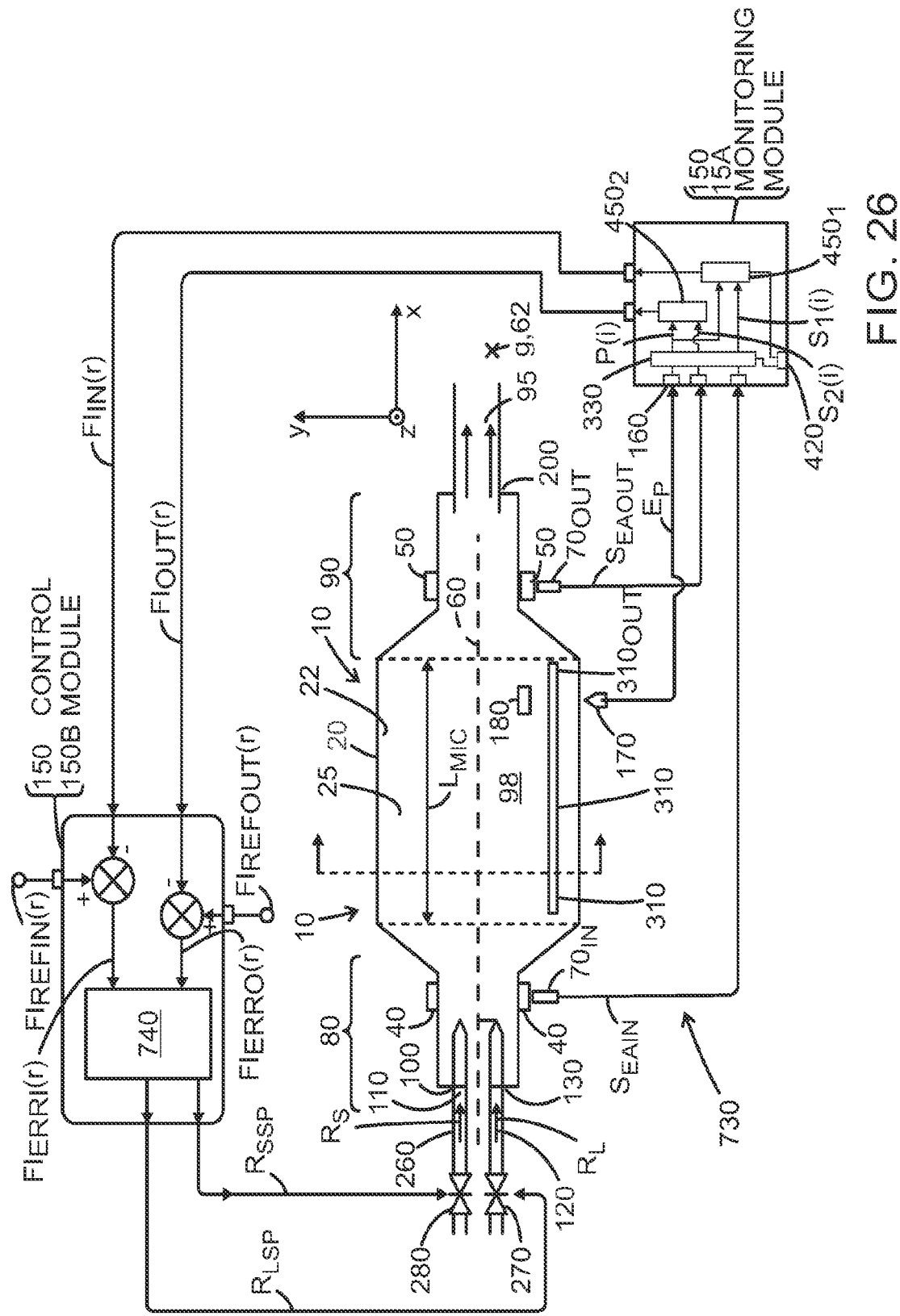
FIG. 26 shows a somewhat diagrammatic and schematic top view of yet another embodiment of a system including a tumbling mill.

FIG. 26 shows a somewhat diagrammatic and schematic top view of yet another embodiment of a system 730 including a tumbling mill 10. The tumbling mill 10 may be an autogenous (AG) mill, for example. Alternatively, the tumbling mill 10 may be a semi-autogenous (SAG) mill. Another example tumbling mill 10 is a ball mill 10. The tumbling mill 10 includes a shell 20 having an internal shell surface 22 that forms a chamber 25 for grinding material. The tumbling mill system 730 of FIG. 26 may include the parts, and be configured, as described in any of the other embodiments described in this disclosure, e.g. in relation to FIGS. 1-25 above. In particular, the apparatus 150, shown in FIG. 26 may be configured as described in any of the other embodiments described in this disclosure, e.g. in relation to FIGS. 1-25 above.

However, in the embodiment of the system 730 illustrated in FIG. 26, the apparatus 150 includes a monitoring module 150A as well as a control module 150B. Although the drawing illustrates the apparatus 150 as two boxes, it is to be understood that the apparatus 150 may well be provided as a single entity 150 including a monitoring module 150A as well as a control module 150B, as indicated by the unifying reference 150.

The system 730 is configured to control an internal state of in a tumbling mill 10 having a shell 20 that rotates around an axis 60 at a speed of rotation $f_{ROT}$ for grinding a charge of material 30 by tumbling the material in the rotating shell.

The; said shell 20 has an internal shell surface 22 including a first number L of protrusions 310 configured to engage material as the shell 20 rotates about the axis 60. The system 730 may comprise a device 170, 180 for generating a position signal.

The device 170, 180 may include the position sensor 170 and the marker 180 as described elsewhere in this disclosure. The position signal is $E_P$, P(i), P(j), P(q) indicative of a rotational position of said rotating shell 20, said position signal including a time sequence of position signal sample values P(i), P(j), P(q).

A sensor 70, $70_{IN}$, $70_{OUT}$, 330 is provided and it is configured to generate a vibration signal $S_{EA}$, $S_{MD}$, Se(i), S(j), S(q) dependent on mechanical vibrations $V_{IMP}$ emanating from rotation of said shell. The vibration signal $S_{EA}$, Se(i), S(j), S(q) may include a time sequence of vibration sample values Se(i), S(j), S(q).

The apparatus 150 of the system 730 may comprise a monitoring module 150A and a control module 150B. The monitoring module 150A comprises a status parameter extractor 450, 4501, 4502 configured to detect a first occurrence of a first reference position signal value in said time sequence of position signal sample values P(i), P(j), P(q) (See tables 2, 3 and 4 above, wherein column #2 illustrates the position signal having values 1; 1C).

The status parameter extractor 450 may be configured to detect a second occurrence of a second reference position signal value 1; 1C; 100% in said time sequence of position signal sample values P(i), P(j), P(q)). The status parameter extractor 450 may also be configured to detect an occurrence of an event signature $S_P(r)$; Sp in said time sequence of vibration sample values Se(i), S(j), S(q). The event may be the impacy of a protrusion 310 into the toe poerion of the charge, causing an impact vibration that may cause a vibration signal signature, as discussed elsewhere in this disclosure. The status parameter extractor 450 may be configured to generate data indicative of a first temporal relation $R_T(r)$; $T_D$; FI(r) between
the event signature occurrence, and
the first and second occurrences.

As mentioned above, the system 730 includes a control module 150B configured to receive data indicative of an internal state of the mill 10 from the mill monitoring module 150, 150A. The data indicative of an internal state can include any of the information generated or delivered by the status parameter extractor 450, as described in relation to any of the FIGS. 1-25 in this disclosure. With reference to FIG. 26, the control module 150B includes a regulator 740 for controlling an angular toe position FI(r), $A_{TOE}$ (See FIG. 26 in conjunction with FIG. 2) based on
a toe position reference value $FI_{REF}(r)$ (See FIG. 26),
said first temporal relation $R_T(r)$; $T_D$; FI(r) (See FIGS. 3-26), and
a toe position error value $FI_{ERR}(r)$ (see FIG. 26).

The toe position error value ($FI_{ERR}(r)$) depends on said toe position reference value $FI_{REF}(r)$, and said first temporal relation $R_T(r)$; $T_D$; FI(r) (See FIGS. 3-26). The toe position reference value $FI_{REF}(r)$ may be generated by manual input (not shown in FIG. 26, but it may be done as discussed e.g. in connection with FIG. 1 above.

As shown in FIG. 26, the said toe position error value ($FI_{ERR}(r)$) may depend on a difference between said toe position reference value $FI_{REF}(r)$), and the first temporal relation $R_T(r)$; $T_D$; FI(r).

The regulator 740 may be configured to control the solid material feed rate set point $R_{SSP}$ in dependence on the toe position reference value $FI_{REF}(r)$. The solid material feed rate $R_S$, discussed in connection with FIG. 1, depends on the solid material feed rate set point $R_{SSP}$ (See FIG. 26). As mentioned in connection with FIG. 1, the solid material feed rate $R_S$ is an amount of solid material per time unit that is fed into the input 100 of said tumbling mill 10.

The regulator may also be configured to control a liquid feed rate set point $R_{LSP}$ in dependence on said toe position reference value $FI_{REF}(r)$. The liquid feed rate $R_L$ may depend on said liquid feed rate set point $R_{LSP}$. As mentioned in connection with FIG. 1, the liquid feed rate $R_L$ may be an amount of liquid per time unit that is being fed into an input 130 of the tumbling mill 10. The first temporal relation $R_T(r)$; $T_D$; FI(r) is indicative of a proportion of a distance between two adjacent of said protrusions 310 in the mill shell. The first temporal relation $R_T(r)$; $T_D$; FI(r) is indicative of a toe position 205, $A_{TOE}(r)$ (See FIG. 2 in conjunction with FIG. 26).

The event signature may be indicative of an impact force $F_{IMP}$ generated when a projection 310 on an internal shell surface 22 of the rotating shell 20 interacts with a toe portion 205 of the charge material 30.

The status parameter extractor 450 may be configured to generate said first temporal relation $R_T(r)$; $T_D$; FI(r)) as a phase angle (FI(r).

The status parameter extractor 450 may be configured to generate said event signature as an amplitude value $S_P(r)$; Sp; $C_L(r)$; $C_1(r)$.

The status parameter extractor 450 may comprise a Fourier Transformer 510 (see FIG. 15) configured to generate said first temporal relation $R_T(r)$; $T_D$; FI(r).

As discussed in connection with table 5, the status parameter extractor 450 may be configured to count a total number of samples $N_B$ from the first occurrence to the second occurrence. Moreover, the status parameter extractor 450 may be configured to count another number of samples $N_P$ from the first occurrence to the occurrence of the event, and said status parameter extractor 450 may be configured to generate said first temporal relation $R_T(r)$; $T_D$; FI(r) based on said another number and said total number.

The status parameter extractor 450 may be configured to count a total number of samples $N_B$ from the first occurrence to the second occurrence, and the status parameter extractor 450 may be configured to count another number of samples $N_P$ from the first occurrence to the occurrence of the event. Moreover, the status parameter extractor 450 may be configured to generate said first temporal relation $R_T(r)$; $T_D$; FI(r) based on a relation between said another number and said total number, wherein said relation between said another number and said total number may be indicative of a toe position 205.

Various examples are disclosed below.

An example 1 relates to a system 5 for grinding material, the system comprising:
a tumbling mill having a shell that rotates around an axis( ) at a speed of rotation ($f_{ROT}$) for grinding material by tumbling a charge of the material in the rotating shell; wherein said shell has an internal shell surface, said internal shell surface including at least one protrusion configured to engage material within the shell;
a vibration sensor configured to generate an analogue measurement signal ($S_{EA}$) dependent on mechanical vibrations ($V_{IMP}$) emanating from rotation of said shell;
a position sensor configured to generate a position signal indicative of a rotational position of said rotating shell;
a signal recorder adapted to record
a time sequence of measurement sample values (Se(i), S(j)) of said digital measurement data signal ($S_{MD}$, $S_{ENV}$, $S_{MD}$), and
a time sequence of said position signal values (P(i)), and
time information (i, dt; j)
such that
an individual measurement data value (S(j)) is associated with data indicative of time of occurrence of the individual measurement data value (S(j)), and such that
an individual position signal value (P(i)) is associated with data indicative of time of occurrence of the individual position signal value (P(i));
a signal processor adapted to detect the occurrence of an amplitude peak value in said recorded time sequence of measurement sample values (Se(i), S(j));

said signal processor being adapted to generate data indicative of a temporal duration between said position signal value occurrence and said amplitude peak value occurrence.

2. The system of example 1, wherein
said signal processor is configured to generate a shell charge data set, said shell charge data set being indicative of an internal charge state in said shell; said shell charge data set comprising said amplitude peak value and said temporal duration.

3. The system according any preceding example, wherein said shell charge data set being indicative of a speed of rotation of said said rotating mill shell.

4. The system according any preceding example, wherein the rotating shell is configured to hold a charge of material exceeding 500 kg during operation of the tumbling mill.

5. An electronic tumbling mill monitoring system for generating and displaying information relating to an internal state of a grinding process in a tumbling mill (10) having a shell that rotates around an axis (60) at a speed of rotation ($f_{ROT}$) for grinding charge material (30) by tumbling the charge material in the rotating shell, the tumbling mill monitoring system comprising:
a status parameter extractor (450) for generating a
a first internal status indicator data structure (550, $S_{P1}$, $T_{D1}$), indicative of said internal state of said grinding process, said first internal status indicator data structure (550, $S_{P1}$, $T_{D1}$) including a first impact force indicator value ($S_{P1}$) and a first temporal indicator value ($T_{D1}$);
said first impact force indicator value ($S_{P1}$) being indicative of an impact force ($F_{IMP}$) generated when a projection on an internal shell surface of the rotating shell interacts with a toe portion of the charge material, and
said first temporal indicator value ($T_{D1}$) being indicative of a temporal duration ($T_{D1}$) between occurrence of said impact force ($F_{IMP}$) and occurrence of a rotational reference position of said rotating shell.

6. The tumbling mill monitoring system according to example 5, wherein said status parameter extractor (450) further generates
a second internal status indicator data structure ($S_{P2}$, $T_{D2}$), indicative of said internal state of said grinding process, said second internal status indicator data structure (550, $S_{P1}$, $T_{D1}$) including a second impact force indicator value ($S_{P2}$) and a second temporal indicator value ($T_{D2}$)
said second impact force indicator value ($S_{P2}$) being indicative of an impact force ($F_{IMP}$) generated when a projection on an internal shell surface of the rotating shell interacts with a toe portion of the charge material, and
said second temporal indicator value ($T_{D2}$) being indicative of a temporal duration ($T_{D1}$) between occurrence of said impact force ($F_{IMP}$) and occurrence of a rotational reference position of said rotating shell; wherein
said first internal status indicator data structure ($S_{P1}$, $T_{D1}$) is indicative of said internal state of said grinding process at a first point in time, and
said second internal status indicator data structure ($S_{P2}$, $T_{D2}$) is indicative of said internal state of said grinding process at a second point in time.

7. The tumbling mill monitoring system according to example 6, wherein said first internal status indicator data structure ($S_{P1}$, $T_{D1}$) in conjunction with said internal status indicator data structure ($S_{P2}$, $T_{D2}$) is indicative of a temporal progression of said internal state of said grinding process.

8. The tumbling mill monitoring system according to any preceding example, wherein
said status parameter extractor (450) includes
a shell speed detector (500) configured to generate a value indicative of a tumbling mill shell speed of rotation ($f_{ROT}(j)$) based on a digital position signal (P(i)), said shell speed detector (500) being configured to associate said value indicative of a tumbling mill shell speed of rotation ($f_{ROT}(i)$) with a point of time (i).

9. The tumbling mill monitoring system according to any preceding example, wherein
said shell speed detector (500) is configured to associate said first impact force indicator value ($S_{P1}$; S(i)) with said value indicative of a tumbling mill shell speed of rotation ($f_{ROT}(j)$).

10. The tumbling mill monitoring system according to any preceding example, wherein
said status parameter extractor (450) is configured to maintain a synchronized temporal relation between said first impact force indicator value ($S_{P1}$; S(i); S(j)) and
said value indicative of a tumbling mill shell speed of rotation ($f_{ROT}(i)$; $f_{ROT}(j)$).

11. In an electronic tumbling mill monitoring system for generating and displaying information relating to a grinding process in a tumbling mill having a shell that rotates around an axis (60) at a speed of rotation ($F_{ROT}$) for grinding charge material (30) by tumbling the charge material in the rotating shell; wherein said shell has an internal shell surface, said internal shell surface including at least one projection configured to engage material as the shell rotates about the axis (60),
a computer implemented method of representing an internal state of said grinding process in said tumbling mill on a screen display, the method comprising:
displaying on said screen display
a polar coordinate system, said polar coordinate system having
a reference point (O), and
a reference direction (0,360); and
a first internal status indicator object ($S_{P1}$, $T_{D1}$), indicative of said internal state of said grinding process, at a first radius ($S_{P1}$) from said reference point (O) and at a first polar angle ($T_{D1}$) in relation to said reference direction (0,360),
said first radius ($S_{P1}$) being indicative of an impact force ($F_{IMP}$) generated when a projection on an internal shell surface of the rotating shell interacts with the charge material, and
said first polar angle ($T_{D1}$) being indicative of a temporal duration ($T_{D1}$) between occurrence of said impact force ($F_{IMP}$) and occurrence of a rotational reference position of said rotating shell.

12. The method according to example 11, wherein the method further comprises displaying on said screen display
a second internal indicator object ($S_{P2}$, $T_{D2}$) at a second radius ($S_{P2}$) from said reference point (O) and at a second polar angle ($T_{D1}$) in relation to said reference direction (0,360),
said second radius ($S_{P2}$) being indicative of an impact force ($S_P$; $F_{IMP}$) generated when a projection on an internal shell surface of the rotating shell interacts with the charge material, and said second polar angle ($T_{D1}$) being indicative of a temporal duration ($T_{D1}$) between occurrence of said impact force ($F_{IMP}$) and occurrence of a rotational reference position of said rotating shell;

wherein said first internal indicator object ($S_{P1}$, $T_{D1}$) is indicative of said internal state of said grinding process at a first point in time, and said second internal indicator object ($S_{P1}$, $T_{D1}$) is indicative of said internal state of said grinding process at a second point in time.

13. The method according to example 12, wherein a simultaneous displaying on said screen display of said first internal state point ($S_{P1}$, $T_{D1}$) and said second internal state point ($S_{P1}$, $T_{D1}$) is indicative of a temporal progression of said internal state of said grinding process.

14. An electronic tumbling mill monitoring system for generating and displaying information relating to an internal state of a grinding process in a tumbling mill (10) having a shell that rotates around an axis (60) at a speed of rotation ($f_{ROT}$) for grinding charge material (30) by tumbling the charge material in the rotating shell, the tumbling mill monitoring system comprising:

a status parameter extractor (450) for generating a first internal status indicator data structure (550, $S_{P1}$, $T_{D1}$), indicative of said internal state of said grinding process, said first internal status indicator data structure (550, $S_{P1}$, $T_{D1}$) including a first impact force indicator value ($S_{P1}$) and a first temporal indicator value (P; $T_{D1}$);

said first impact force indicator value ($S_{P1}$) being indicative of an impact force ($F_{IMP}$) generated when a projection on an internal shell surface of the rotating shell interacts with a toe portion of the charge material, and said first temporal indicator value ($T_{D1}$) being indicative of a temporal duration ($T_{D1}$) between occurrence of said impact force ($F_{IMP}$) and occurrence of a rotational reference position of said rotating shell; wherein said status parameter extractor (450) includes a shell speed detector (500) configured to generate a value indicative of a tumbling mill shell speed of rotation ($f_{ROT}$(j)) based on a digital position signal (P(i)), said shell speed detector (500) being configured to associate said value indicative of a tumbling mill shell speed of rotation ($f_{ROT}$(i)) with a point of time (i).

15. The tumbling mill monitoring system according to any preceding example, wherein said shell speed detector (500) is configured to associate said first impact force indicator value ($S_{P1}$; S(j)) with said value indicative of the tumbling mill shell speed of rotation ($f_{ROT}$(j)) so that said speed of rotation ($f_{ROT}$(j)) value indicates said tumbling mill shell speed of rotation ($f_{ROT}$(j)) at the point of time (j) of occurrence of said impact force ($F_{IMP}$).

16. The tumbling mill monitoring system according to any preceding example, wherein said status parameter extractor (450) is configured to generate a temporal progression of vibration signal values (S(i)) and a temporal progression of rotational reference position signals;

said status parameter extractor (450) further comprising a speed variation compensatory decimator (470); the decimator (470) being configured to decimate the temporal progression of vibration signal values (S(i); $S_{MD}$) based on the speed value ($f_{ROT}$(j)) so as to generate a decimated vibration signal ($S_{MDR}$) comprising a decimated temporal progression of vibration signal values (R(q); Sp(r)).

17. The tumbling mill monitoring system according to any preceding example, wherein said status parameter extractor (450) further comprises a fast Fourier transformer (510) configured to generate said first impact force indicator value ($S_{P1}$) and said first temporal indicator value ($T_{D1}$) based on said decimated vibration signal ($S_{MDR}$).

18. The system according to any preceding example, wherein said material includes pieces of said material, said material pieces comprising a mineral.

19. The system according to any preceding example, wherein said tumbling mill (10) operates to perform dry grinding.

20. The system according to any preceding example, wherein said tumbling mill (10) operates to perform dry grinding of particles of a hard substance into a powder including cement.

21. A method for generating information relating to an internal state of a tumbling mill (10) having a shell (20) that rotates around an axis (60) at a speed of rotation ($f_{ROT}$) for grinding a charge of material (30) by tumbling the material in the rotating shell; said shell (20) having an internal shell surface (22) including a first number (L) of protrusions (310) configured to engage material as the shell (20) rotates about the axis (60), the method comprising generating a position signal (E, P, P(i), P(j), P(q)) indicative of a rotational position of said rotating shell (20), said position signal including a time sequence of position signal sample values (P(i), P(j), P(q));

detecting a first occurrence of a first reference position signal value (1; 1C, 0%) in said time sequence of position signal sample values (P(i), P(j), P(q));

detecting a second occurrence of a second reference position signal value (1; 1C; 100%) in said time sequence of position signal sample values (P(i), P(j), P(q));

generating a vibration signal ($S_{EA}$, Se(i), S(j), S(q)) dependent on mechanical vibrations ($V_{IMP}$) emanating from rotation of said shell, said vibration signal ($S_{EA}$, Se(i), S(j), S(q)) including a time sequence of vibration sample values (Se(i), S(j), S(q));

detecting a third occurrence of an event signature ($S_P(r)$; Sp) in said time sequence of vibration sample values (Se(i), S(j), S(q));

generating data indicative of a first temporal relation ($R_T(r)$; $T_D$; FI(r)) between said third occurrence i.e. said event signature occurrence, and said first and second occurrences.

22. The method according to any preceding example, wherein:

said first temporal relation ($R_T(r)$; $T_D$; FI(r)) is indicative of a proportion of a distance between two adjacent of said protrusions (310).

23. The method according to any preceding example, wherein:
Said first temporal relation ($R_T(r)$; $T_D$; FI(r)) is indicative of a relative toe position (205).

24. The method according to any preceding example, wherein:
said event signature is indicative of an impact force ($F_{IMP}$) generated when a projection (310) on an internal shell surface (22) of the rotating shell (20) interacts with a toe portion (205) of the charge material (30).

25. The method according to any preceding example, further comprising:
generating said first temporal relation ($R_T(r)$; $T_D$; FI(r)) as a phase angle (FI(r)).

26. The method according to any preceding example, further comprising:
generating said event signature as an amplitude value ($S_P(r)$; Sp; $C_L(r)$; $C_I(r)$).

27. The method according to any preceding example, wherein:
Said first temporal relation ($R_T(r)$; $T_D$; FI(r)) is generated by a Fourier Transformation.

28. The method according to any preceding example, further comprising:
Counting a total number of samples ($N_B$) from the first occurrence to the second occurrence, and
Counting another number of samples ($N_P$) from the first occurrence to the third occurrence, and
generating said first temporal relation ($R_T(r)$; $T_D$; FI(r)) based on said another number and said total number.

29. The method according to any preceding example, further comprising:
Counting a total number of samples ($N_B$) from the first occurrence to the second occurrence, and
Counting another number of samples ($N_P$) from the first occurrence to the third occurrence, and
generating said first temporal relation ($R_T(r)$; $T_D$; FI(r)) based on a relation between said another number and said total number.

30. The method according to example 29, wherein:
Said relation between said another number and said total number is indicative of a relative toe position (205).

31. The method according to example 29 or 30, wherein:
Said relation between said another number and said total number is indicative of a position of a toe (205) of said charge (30) expressed as a portion of a distance between two of said protrusions (310), said two protrusions (310A, 310B) being mutually adjacent on said internal shell surface (22).

32. The method according to any preceding example, further comprising:
generating said reference position signal value (1; 1C, 0%) at least one time per revolution of said rotating shell (20).

33. The method according to example 32, further comprising:
generating said reference position signal value (1; 1C, 0%) a second number of times per revolution of said rotating shell (20); said second number being equal to said first number (L).

34. The method according to example 32, further comprising:
generating said reference position signal value (1; 1C, 0%) a second number of times per revolution of said rotating shell (20); said second number being lower than said first number (L).

35. The method according to any preceding example, further comprising:
generating said reference position signal value (PS; 1; 1C, 0%) based on detection of a rotating position marker (180), wherein the rotation of said rotating position marker (180) is indicative of the rotation of said rotating shell (20).

36. The method according to example 32, wherein
said reference position signal value (1; 1C, 0%) being generated at least one time per revolution of said rotating shell (20) is based on detection of a rotating position marker (180), wherein the rotation of said rotating position marker (180) is indicative of the rotation of said rotating shell (20).

37. The method according to example 36, wherein
at least one of
said first reference position signal value (1; 1C, 0%) and
said second reference position signal value (1; 1C; 100%) is generated by calculation based on said first number (L).

38. The method according to example 36, wherein
at least one of
said first reference position signal value (1; 1C, 0%) and
said second reference position signal value (1; 1C; 100%) is generated at an angular position; wherein a full revolution of said shell is virtually or mathematically divided into a third number of mutually equal parts.

39. The method according to example 38, wherein
Said third number is equal to said first number; and wherein said mutually equal parts correspond to a first number of equal distances between said protrusions (310).

40. The method according to any preceding example, wherein:
Said protrusions are mutually substantially equidistant.

41. The method according to any preceding example, further comprising:
recording said time sequence of vibration sample values (Se(i), S(j), S(q));
detecting the occurrence of said event signature in said recorded time sequence of vibration sample values (Se(i), S(j), S(q)).

42. The method according to any preceding example, wherein:
Said event signature is an amplitude peak value.

43. The method according to any preceding example, further comprising:
associating an individual vibration sample value (Se(i), S(j), S(q)) with an individual position signal sample value (P(i), P(j), P(q)).

44. The method according to any preceding example, further comprising:
generating data indicative of a momentary rotational speed value based on a second temporal relation ($R_T(r)$; $T_D$; FI(r)) between
said first occurrence of said first reference position signal value (1; 1C, 0%)
and said second occurrence of said second reference position signal value (1; 1C; 100%);
said momentary rotational speed value ($f_{ROT}$) being indicative of said speed of rotation ($f_{ROT}$).

45. The method according to any preceding example, further comprising:
recording, in a memory, said time sequence of position signal sample values (P(i), P(j), P(q)); and
recording, in said memory, said time sequence of vibration sample values (Se(i), S(j), S(q)); wherein
said step of detecting the occurrence of a reference position signal value (1; 1C) involves
detecting the occurrence of said reference position signal value (1; 1C) in said recorded time sequence of position signal sample values (P(i), P(j), P(q)).

46. The method according to any preceding example, wherein:
Said first temporal relation ($R_T(r)$; $T_D$; FI(r)) is indicative of a first internal state of said tumbling mill.

47. The method according to any preceding example, wherein:
Said first temporal relation ($R_T(r)$; $T_D$; FI(r)) is indicative of a first internal state of said tumbling mill.

48. The method according to any preceding example or according to example 39, further comprising:
Generating data indicative of an absolute toe position value based on said relative toe position value.

49. The method according to any preceding example, wherein:
said event signature is a peak amplitude value.

50. The method according to any preceding example, wherein:
Said speed of rotation ($f_{ROT}$) is a variable speed of rotation ($f_{ROT}$).

51. A system for grinding material, the system comprising:
a tumbling mill having a shell that rotates around an axis ( ) at a speed of rotation ($f_{ROT}$) for grinding material by tumbling a charge of the material in the rotating shell; wherein said shell has an internal shell surface, said internal shell surface including a first number of protrusions configured to engage material within the shell, said protrusions being arranged at equal mutual distances on said internal shell surface; said first number being at least two;
a vibration sensor configured to generate an analogue measurement signal ($S_{EA}$) dependent on mechanical vibrations ($V_{IMP}$) emanating from rotation of said shell;
a position sensor configured to generate a position signal indicative of a rotational position of said rotating shell;
a signal recorder adapted to record
a time sequence of measurement sample values (Se(i), S(j)) of said digital measurement data signal ($S_{MD}$, $S_{ENV}$, $S_{MD}$), and
a time sequence of said position signal values (P(i)), and
time information (i, dt; j)
such that
an individual measurement data value (S(j)) is associated with data indicative of time of occurrence of the individual measurement data value (S(j)), and such that
an individual position signal value (P(i)) is associated with data indicative of time of occurrence of the individual position signal value (P(i));
a signal processor adapted to detect the occurrence of an amplitude peak value in said recorded time sequence of measurement sample values (Se(i), S(j));
said signal processor being adapted to generate
a second number of reference position signals per revolution of said shell, said second number of reference position signals being generated at equal angular distances based on said position signal; said second number being equal to said first number; and
data indicative of a temporal duration between said reference position signal value occurrence and said amplitude peak value occurrence.

The invention claimed is:

1. A system for controlling an internal state of a tumbling mill having a shell that rotates around an axis at a speed of rotation for grinding a charge of material by tumbling the material in the rotating shell; said shell having an internal shell surface including a first number of protrusions configured to engage material as the shell rotates about the axis, the system comprising
a device for generating a position signal indicative of a rotational position of said rotating shell, said position signal including a time sequence of position signal sample values;
a sensor configured to generate a vibration signal dependent on mechanical vibrations emanating from rotation of said shell, said vibration signal including a time sequence of vibration sample values;
a status parameter extractor configured to detect a first occurrence of a first reference position signal value in said time sequence of position signal sample values;
said status parameter extractor being configured to detect a second occurrence of a second reference position signal value in said time sequence of position signal sample values;
said status parameter extractor being configured to detect a third occurrence of an event signature in said time sequence of vibration sample values;
said status parameter extractor being configured to generate data indicative of a first temporal relation between
said third occurrence i.e. said event signature occurrence, and
said first and second occurrences; and
a regulator for controlling an angular toe position based on
a toe position reference value,
said first temporal relation, and
a toe position error value, wherein said toe position error value depends on
said toe position reference value, and
said first temporal relation.

2. The system according to claim 1, wherein said toe position error value depends on a difference between said toe position reference value, and said first temporal relation.

3. The system according to claim 1, wherein
said regulator is configured to control a solid material feed rate set point in dependence on said toe position reference value, and wherein a solid material feed rate depends on said solid material feed rate set point, said solid material feed rate being an amount of solid material per time unit that is being fed into an input of said tumbling mill.

4. The system according to claim 1, wherein
said regulator is configured to control a liquid feed rate set point in dependence on said toe position reference value, and wherein
a liquid feed rate depends on said liquid feed rate set point, said liquid feed rate being an amount of liquid per time unit that is being fed into an input of said tumbling mill.

5. The system according to claim 1, wherein
said first temporal relation is indicative of a proportion of a distance between two adjacent of said protrusions.

6. The system according to claim 1, wherein
said first temporal relation is indicative of a toe position.
7. The system according to claim 1, wherein
said event signature is indicative of an impact force generated when a projection on an internal shell surface of the rotating shell interacts with a toe portion of the charge material.
8. The system according to claim 1, wherein
said status parameter extractor is configured to generate said first temporal relation as a phase angle.
9. The system according to claim 1, wherein
said status parameter extractor is configured to generate said event signature as an amplitude value.
10. The system according to claim 1, wherein said status parameter extractor comprises a Fourier Transformer configured to generate said first temporal relation.
11. The system according to claim 1, wherein
said status parameter extractor is configured to count a total number of samples from the first occurrence to the second occurrence, and
said status parameter extractor is configured to count another number of samples from the first occurrence to the third occurrence, and
said status parameter extractor is configured to generate said first temporal relation based on said another number and said total number.
12. The system according to claim 1, wherein
said status parameter extractor is configured to count a total number of samples from the first occurrence to the second occurrence, and
said status parameter extractor is configured to count another number of samples from the first occurrence to the third occurrence, and
said status parameter extractor is configured to generate said first temporal relation based on a relation between said another number and said total number, wherein:
said relation between said another number and said total number is indicative of a toe position.
13. The system according to claim 1, wherein said first number is higher than one.
14. The system according to claim 1, wherein
said device is configured to generate a certain number of reference position signal values per revolution of the rotating shell, said certain number being equal to said first number.
15. A method for controlling an internal state of a tumbling mill having a shell that rotates around an axis at a speed of rotation for grinding a charge of material by tumbling the material in the rotating shell; said shell having an internal shell surface including a first number of protrusions configured to engage material as the shell rotates about the axis, the method comprising:
receiving a position signal indicative of a rotational position of said rotating shell, said position signal including a time sequence of position signal sample values;
receiving a vibration signal dependent on mechanical vibrations emanating from rotation of said shell, said vibration signal including a time sequence of vibration sample values;
detecting a first occurrence of a first reference position signal value in said time sequence of position signal sample values;
detecting a second occurrence of a second reference position signal value in said time sequence of position signal sample values;
detecting a third occurrence of an event signature in said time sequence of vibration sample values;
generating data indicative of a first temporal relation between a first temporal duration and another temporal duration; wherein
said another temporal duration is indicative of time between said first occurrence and said second occurrence; and
said first temporal duration is indicative of time between said first occurrence and said third occurrence, or
said first temporal duration is indicative of time between said third occurrence and said second occurrence; and
controlling, by a regulator, an angular toe position based on a toe position reference value, said first temporal relation, and a toe position error value, wherein said toe position error value depends on said toe position reference value, and said first temporal relation.
16. The method according to claim 15, wherein
said toe position error value depends on a difference between
said toe position reference value, and
said first temporal relation.
17. The method according to claim 15, wherein
said controlling includes control of a solid material feed rate set point in dependence on said toe position reference value, and wherein a solid material feed rate depends on said solid material feed rate set point, said solid material feed rate being an amount of solid material per time unit that is being fed into an input of the tumbling mill.
18. The method according to claim 15, wherein said controlling includes control of a liquid feed rate set point in dependence on said toe position reference value, and wherein a liquid feed rate depends on said liquid feed rate set point, said liquid feed rate being an amount of liquid per time unit that is being fed into an input of said tumbling mill.
19. The method according to claim 15, wherein said event signature is indicative of an impact force generated when a projection on an internal shell surface of the rotating shell interacts with a toe portion of the charge material.
20. The method according to claim 15, wherein said first number is higher than one.
21. The method according to claim 15, further comprising
generating a certain number of reference position signal values per revolution of the rotating shell, said certain number being equal to said first number.
22. A non-transitory computer-readable medium storing instructions that, when executed by one or more hardware processors, cause the one or more hardware processors to perform the method according to claim 15.
23. An apparatus comprising the non-transitory computer-readable medium according to claim 22.

* * * * *